US012643969B2

(12) United States Patent
Azoulay et al.

(10) Patent No.: US 12,643,969 B2
(45) Date of Patent: Jun. 2, 2026

(54) POST-POLYMERIZATION AND POLYMERIC MATERIAL MODIFICATION THROUGH GOLD CATALYSIS AND POLYMERIC MATERIALS

(71) Applicants: Jason D. Azoulay, Atlanta, GA (US); Eric R. King, Waltham, MA (US); Samuel Hunt, Hattiesburg, MS (US)

(72) Inventors: Jason D. Azoulay, Atlanta, GA (US); Eric R. King, Waltham, MA (US); Samuel Hunt, Hattiesburg, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 736 days.

(21) Appl. No.: 18/246,884

(22) PCT Filed: Oct. 25, 2021

(86) PCT No.: PCT/US2021/056405
§ 371 (c)(1),
(2) Date: Mar. 28, 2023

(87) PCT Pub. No.: WO2022/087516
PCT Pub. Date: Apr. 28, 2022

(65) Prior Publication Data

US 2023/0374178 A1 Nov. 23, 2023

Related U.S. Application Data

(60) Provisional application No. 63/105,047, filed on Oct. 23, 2020.

(51) Int. Cl.
*C08F 222/10* (2006.01)
*C08F 2/04* (2006.01)
(Continued)

(52) U.S. Cl.
CPC .............. *C08F 222/10* (2013.01); *C08F 2/04* (2013.01); *C08F 4/44* (2013.01); *C08F 4/58* (2013.01); *C08F 2410/04* (2013.01)

(58) Field of Classification Search
CPC .. C08F 222/10; C08F 2/04; C08F 4/44; C08F 4/58; C08F 2410/04; C08F 8/00; C08F 112/08; C08G 65/4056; C08G 75/23
See application file for complete search history.

(56) References Cited

U.S. PATENT DOCUMENTS 2,366,007 A 12/1944 D'Alelio
6,284,850 B1 9/2001 Percec
(Continued)

FOREIGN PATENT DOCUMENTS

RU 2536043 C1 12/2014
WO 2009137810 A2 11/2009

OTHER PUBLICATIONS

King et al., Gold catalyzed post polymerization modification of commodity aromatic polymers, JACS Au 2021, 1, 1342-1347 (Year: 2021).*
(Continued)

*Primary Examiner* — Alicia Bland
(74) *Attorney, Agent, or Firm* — Mendelsohn Dunleavy, P.C.; Kevin J. Dunleavy

(57) ABSTRACT

The system provides new methods and processes for the reaction of polymeric/oligomeric substrates with reactants comprising alkyne/alkene and/or protic nucleophilic moieties to afford functionalized polymeric/oligomeric products through the utilization of homogenous and/or heterogenous gold catalysis. More specifically, the system provides routes for reaction of polymeric/oligomeric substrates comprising varying degrees of aromatic character with alkyne/alkene bearing molecules to afford a functionalized polymeric/oligomeric product. The system additionally provides path-
(Continued)

ways wherein the inverse methodology is realized, providing functionalized materials from the reaction of polymeric substrates bearing alkyne/alkene moieties with aromatic and/or protic nucleophilic reagents. Furthermore, in a tangential methodology, the system affords functionalized polymeric materials from the reaction of polymeric substrates bearing protic nucleophilic substituents with alkyne/alkene containing molecules. The system provides pathways for the facile modification of commodity polymer materials in order to produce value-added materials utilizing current polymer infrastructure, commodity polymer feedstocks, and post-consumer plastic waste.

23 Claims, 23 Drawing Sheets

(51) Int. Cl.

| | |
|---|---|
| ***C08F 4/44*** | (2006.01) |
| ***C08F 4/58*** | (2006.01) |

(56) References Cited

U.S. PATENT DOCUMENTS

| | | | | |
|---|---|---|---|---|
| 9,988,471 | B2 | 6/2018 | Canich et al. | |
| 2019/0055337 | A1* | 2/2019 | Mays | C08F 8/46 |
| 2019/0085119 | A1* | 3/2019 | Azoulay | C08G 61/10 |
| 2020/0016581 | A1 | 1/2020 | Gaffney | |
| 2020/0032060 | A1 | 1/2020 | Flanagan et al. | |
| 2020/0095371 | A1 | 3/2020 | Tropp et al. | |
| 2020/0238269 | A1 | 7/2020 | Delferro et al. | |

OTHER PUBLICATIONS

King et al., Gold catalyzed C—H functionalization polycondensation for the synthesis of aromatic polymers, Angew Chem Int Ed 2020 59, 21971-21975 (Year: 2020).*

International Search Report and Written Opinion for corresponding International application No. PCT/US2021/056405; dated Feb. 14, 2022 (14 pages).

Abatti, Guilherme Pazini, et al. "Tuning the thermal and mechanical properties of PSU by post-polymerization Friedel-Crafts acylation." European Polymer Journal 142 Article 110111 (2021): 1-9.

Chen, Jiazhen, et al. "Early Transition Metal Catalysis for Olefin-Polar Monomer Copolymerization." Angewandte Chemie International Edition. 59.35 (2020): 14726-14735.

Coustet, Marcos E., et al. "Functionalization of styrenic polymer through acylation and grafting under microwave energy." Polymer Journal 43.3 (2011): 265-271.

Fahs, G. B., et al. "Blocky Sulfonation of Syndiotactic Polystyrene: A Facile Route toward Tailored lonomer Architecture via Postpolymerization Functionalization in the Gel State." Macromolecules 2017, 50.6 (2017): 2387-2396.

Farral, M., et al. "Bromination and lithiation: two important steps in the functionalization of polystyrene resins." The Journal of Organic Chemistry 41.24 (1976): 3877-3882.

Fowkes, F. M. "Attractive Forces at Interfaces, Industrial & Engineering Chemistry 56.12 (1964): 40-52.".

Gao, Yong, et al. "Synthesis and characterization of benzoylated syndiotactic polystyrene." Journal of Polymer Research 14 (2007): 291-296.

Hashimoto, Takuya, et al. "Direct functionalization of polystyrenes by platinum (II)-catalyzed hydroarylation. A new methodology for utilization of polymers." Chemistry Letters 37.9 (2008): 910-911.

Hiorns, Roger C., et al. "A Brief Guide to Polymer Nomenclature." Technical Report Version 1.1, Internatonal Union of Pure and Applied Chemistry 84.10 (2012): 2167-2169.

Huang, R. Y. M., et al. "Sulfonation of Poly(ether ether ketone) (PEEK): Kinetic Study and Characterization." Journal of Applied Polymer Science 2001, 82.11 (2001): 2651-2660.

Janata, M., et al. "Selective Grafting of Block Copolymers. 2. Multimetalated (Co)polymers as Initiators for Grafting Process. Model Metalation Studies." Macromolecules 34.6 (2001): 1593-1599.

Jo, T. S., et al. "Highly Efficient Incorporation of Functional Groups into Aromatic Main-Chain Polymer Using Iridium- Catalyzed C-H Activation and Suzuki-Miyaura Reaction." Journal of the American Chemical Society 131.5 (2009): 1656-1657.

King, Eric R., et al. "Gold-catalyzed post-polymerization modification of commodity aromatic polymers." JACS Au 1.9 (2021): 1342-1347.

Lewis, Sally E., et al. "Upcycling aromatic polymers through C—H fluoroalkylation." Chemical Science 10.25 (2019): 6270-6277.

Li, Juan, et al. "Functionalization of syndiotactic polystyrene with succinic anhydride in the presence of aluminum chloride." European Polymer Journal 41.4 (2005): 823-829.

Mahkam, Mehrdad, et al . . . "Modification of styrene polymer by attaching suitable groups as side chain." e-Polymers 9.1 Article 145 (2009): 1-7.

Owens, Daniel K., et al. "Estimation of the Surface Free Energy of Polymers." Journal of Applied Polymer Science 13.8 (1969): 1741-1747.

Pan, Shuaijun, et al. "Coatings super-repellent to ultralow surface tension liquids." Nature Materials 17.11 (2018): 1040-1047.

Park, Eun Joo, et al. "Versatile functionalization of aromatic polysulfones via thiol-ene click chemistry." Journal of Polymer Science Part A: Polymer Chemistry 54.19 (2016): 3237-3243.

Parvole, J., et al. "Polysulfones Grafted with Poly(vinylphosphonic acid) for Highly Proton Conducting Fuel Cell Membranes in the Hydrated and Nominally Dry State." Macromolecules 2008, 41.11 (2008): 3893-3903.

Petreus, Oana, et al. "Synthesis and characterization of phosphorus-containing polysulfone." Polymer Engineering & Science 50.1 (2010): 48-56.

Reetz, Manfred T., et al. "Gold-Catalyzed Hydroarylation of Alkynes." European Journal of Organic Chemistry 2003.18 (2003): 3485-3496.

Sawada, Hideo, et al. "Synthesis of aromatic compounds containing perfluoro-oxa-alkyl groups." Journal of Fluorine Chemistry 51.1 (1991): 117-129.

Shi, Zhangjie, et al. "Efficient Functionalization of Aromatic C—H Bonds Catalyzed by Gold (III) under Mild and Solvent-Free Conditions." The Journal of Organic Chemistry 69.11 (2004): 3669-3671.

Shin, J., et al. "Controlled Functionalization of Crystalline Polystyrenes via Activation of Aromatic C—H Bonds." Macromolecules 2007, 40.24 (2007): 8600-8608.

Tierney, Neena K., et al. "Matched Random Ionomers: Carboxylate vs Sulfonate." Macromolecules 37.26 (2004): 10205-10207.

Tizpar, Salamat, et al. "Grafting of poly (methyl methacrylate) or polyacrylonitrile onto polystyrene using ATRP technique." Journal of Applied Polymer Science 100.4 (2006): 2619-2627.

Williamson, Jill B., et al. "C—H functionalization of commodity polymers." Angewandte Chemie International Edition 58.26 (2019): 8654-8668.

* cited by examiner

POST-POLYMERIZATION AND POLYMERIC MATERIAL MODIFICATION THROUGH GOLD CATALYSIS AND POLYMERIC MATERIALS

CROSS REFERENCE TO RELATED APPLICATIONS

This application claims the benefit of U.S. Provisional Application No. 63/105,047, filed on Oct. 23, 2020, the disclosure of which is found on page 7 to line 5 of p. 34, on page 141 to line 6 of page 177 and the figures and descriptions of the figures of this U.S. provisional application are hereby incorporated by reference in their entirety herein.

STATEMENT OF GOVERNMENT SUPPORT

This invention was made with government support under grant/contract OIA-1632825 awarded by the National Science Foundation. The Government has certain rights in the invention.

BACKGROUND

Aromatic polymers—those that contain planar, rigid aromatic, or pseudoaromatic heterocycles—display robust chemical, mechanical, and thermal properties. This enables their broad utility in commodity, specialty, and high-performance applications such as packaging, textiles, transportation, electronics, construction, healthcare, energy, and many others. Polystyrene (PS) and polyethylene terephthalate (PET) are two of the most widely utilized aromatic polymers with an annual global production exceeding 25 and 33 million metric tons, respectively. Fully aromatic engineering thermoplastics such as polysulfone (PSU) find use in high-performance applications. The direct modification of high-volume aromatic polymers would have far-reaching implications toward expanding their utility and enabling new functionality. However, the chemical stability and physical properties that make these plastics valuable also make their chemical conversion to new products a grand challenge.

The most widely applied methods for the post-polymerization modification (PPM) of aromatic units within these polymers are Friedel-Crafts alkylations and acylations. Other reactions have been applied such as halomethylation, perfluoroalkylation, alkyl-Li metalation, potassium superbase metalation, sulfonation, and Ir-catalyzed borylation. These approaches enable the synthesis of reactive polymer precursors and the installation of functionality that dramatically improves adhesion, chemical compatibility, mechanical properties, viscoelasticity, processability, and so on. This also enables the creation of value-added materials such as blend compatibilizers, flame retardants, ion-exchange resins, and catalyst supports. However, these chemistries are generally nonselective, necessitate multiple steps, require harsh conditions that result in deleterious side reactions, and yield products that require cumbersome purification. Thus, PPM strategies have largely relied on the utilization of functionalized monomers that do not interfere with the polymerization process and offer orthogonal and high yielding ("click-like") reactivity when embedded within the polymer. While the literature is replete with examples of such approaches, this strategy is largely incompatible with the centralized, high-volume syntheses of polymers that rely on commodity monomer feedstocks and established production processes that cannot accommodate specialty monomers.

Accordingly, there remains a need to develop practical and chemoselective approaches for the direct functionalization of these commodity materials.

The present invention starts from polymers that are virgin or waste and directly converts them into value added materials without causing any significant changes to the molecular weight of the polymer (i.e., the size of the polymer). This provides avenues for directly reutilizing the polymers by imparting improved properties and/or suitability for new uses using the present process, which the prior art does not provide within a single process step or at all. The transformation of the present invention is homogeneous in nature and is intended operation at temperatures of about 20° C. to, at most, 200° C. This makes the present process more attractive than the known high temperature methods that typically operate above 200° C. up to 400° C. Also, the present invention is different from, and novel over the prior art, by virtue of the use of gold-catalysis.

SUMMARY OF THE INVENTION

The products of the invention include polymeric materials containing a polymer selected from polymers of the formulae (1), (5), (9). (13) and (17):

(1)

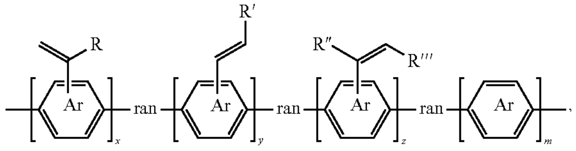

n is an integer greater than or equal to 1, or from about 5 to about 1,000,000; and wherein x, y, z, and m are each independently an integer greater than or equal to 0; and wherein x+y+z≥1, and x+y+z+m=n;

(5)

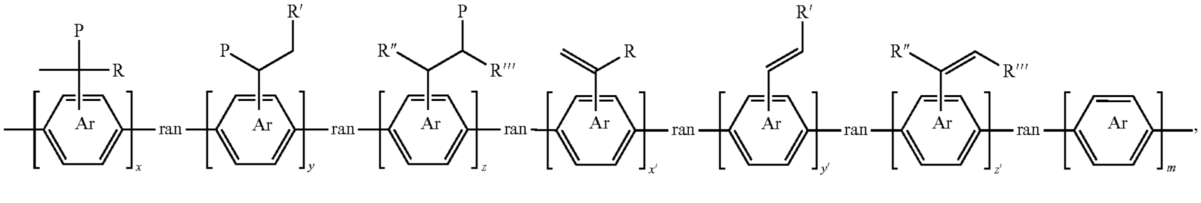

n is an integer greater than or equal to 1, or from about 5 to about 1,000,000; and wherein x, y, z, x', y', z', and m are each independently an integer greater than or equal to 0, or from about 5 to about 1,000,000, and wherein x+y+z+x'+y'+z'+m≥1, and x+y+z++x'+y'+z'+m=n:

(9)

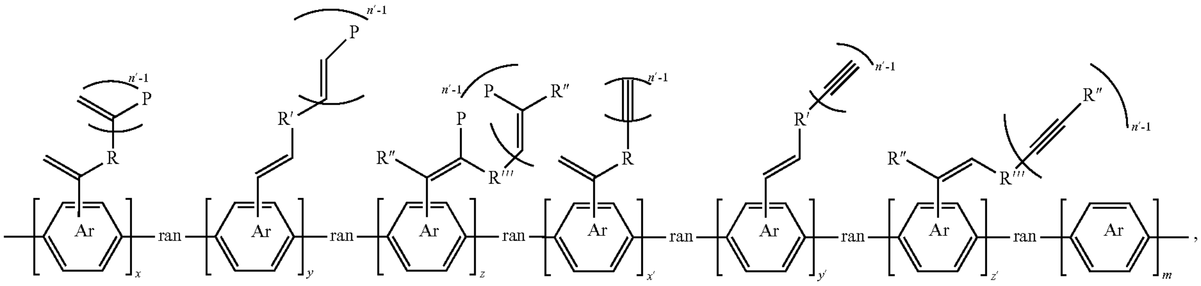

n is an integer greater than or equal to 1, or from about 5 to about 1,000,000; and wherein n' is greater than or equal to 1, or from about 2 to about 10; x, y, z, x', y', z', and m are each independently an integer greater than or equal to 0, or from about 5 to about 1,000,000, wherein x+y+z+x'+y'+z'+m≥1, and x+y+z++x'+y'+z'+m=n; and each of formula (4), (8) and (12):

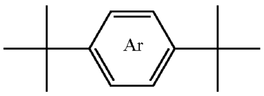

is a (hetero)aromatic polymeric substrate, R, R', R", and R''' are each independently selected from a substituted or unsubstituted hydrocarbyl group comprising from 1 to 20 carbon atoms, or an substituted or unsubstituted aryl group comprising from 6 to 20 carbon atoms, or a substituted or unsubstituted heteroaryl group comprising from 6 to 20 carbon atoms, or —H, —$SR^2$, —OH, —$OR^2$, —$NH_2$, —$NHR^2$, —$NR^2R^3$, —F, —Cl, —Br, —I, —CN, —$CF_3$, —$NO_2$, —COOH, —$COOR^2$, —CHO, —$COR^2$, —$CONH_2$, —$CONHR^2$, —$CONR^2R^3$, wherein $R^2$ and $R^3$ are each independently selected from a hydrocarbyl group comprising from 1 to 20 carbon atoms; and P is selected from an oligomeric or polymer chain which forms a branch from a backbone of the functionalized (hetero)aromatic polymeric material or a neighboring functionalized (hetero)aromatic polymeric material to form a crosslinked network, wherein P is limited to polymer chains comprising identical backbone connectivity to that of the polymers, namely, chains based on

as defined above, which are incorporated as pendant structures during the reaction.

(13)

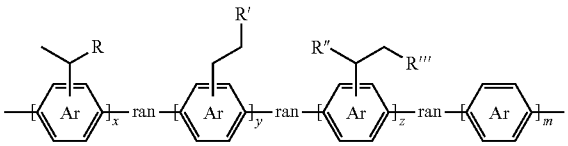

n is an integer greater than or equal to 1, or from about 5 to about 1,000,000; x, y, z, and m are an integer greater than or equal to 0, x+y+z≥1, and x+y+z+m=n; and (17)

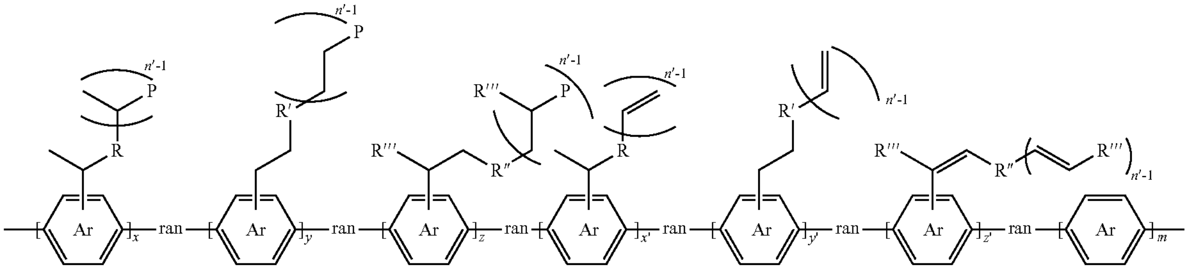

n is an integer greater than or equal to 1, or from about 5 to about 1,000,000; n' is greater than or equal to 2, or from about 2 to about 10; x, y, z, x', y', z', and m are each independently an integer greater than or equal to 0, or from about 5 to about 1,000,000, wherein x+y+z+x'+y'+z'+m≥1, and x+y+z++x'+y'+z'+m=n;

is a (hetero)aromatic polymeric substrate, R, R', R", and R''' are each independently selected from a substituted or unsubstituted hydrocarbyl group comprising from 1 to 20 carbon atoms, an substituted or unsubstituted aryl group comprising from 6 to 20 carbon atoms, a substituted or unsubstituted heteroaryl group comprising from 6 to 20 carbon atoms, —H, —$SR^2$, —OH, —$OR^2$, —$NH_2$, —$NHR^2$, —$NR^2R^3$, —F, —Cl, —Br, —I, —CN, —$CF_3$, —$NO_2$, —COOH, —$COOR^2$, —CHO, —$COR^2$, —$CONH_2$, —$CONHR^2$, and —$CONR^2R^3$, wherein $R^2$ and $R^3$ are each independently selected from a hydrocarbyl group comprising from 1 to 20 carbon atoms; and P is selected from an oligomeric or polymer chain which forms a branch from a backbone of the functionalized (hetero)aromatic polymeric material or a neighboring functionalized (hetero)aromatic polymeric material to form a crosslinked network, wherein P is limited to polymer chains comprising identical backbone connectivity to that of the polymers, namely, chains based on

as defined above, which are incorporated as pendant structures during the reaction.

The polymeric materials described above may include a material selected from an alkene functionalized (hetero) aromatic polymeric material, a hybrid functionalized (hetero)aromatic polymer, a geminal alkene functionalized (hetero)aromatic material, a vicinal alkene functionalized (hetero)aromatic material, and a 1,1,2-trisubstituted alkene functionalized (hetero)aromatic material.

The polymeric materials described above may be selected from a 1,1-disubstituted (geminal) alkene functionalized (hetero)aromatic polymeric material, a 1,2-substituted (vicinal) alkene functionalized (hetero)aromatic polymeric material, and a 1,1,2-trisubstituted alkene functionalized (hetero) aromatic polymeric material.

The polymeric materials described above may be an alkane functionalized (hetero)aromatic polymeric material.

The (hetero)aromatic polymeric substrate of any of the polymeric materials described above may include one or more heteroatoms selected from the group consisting of sulfur, nitrogen, oxygen, selenium, silicon and tellurium.

The polymeric materials described above may include one or more of homopolymers; random, statistical, alternating, block and graft copolymers; conjugated polymers; cyclic polymers; ladder polymers; supramolecular polymers; spiropolymers; polyelectrolytes; ionomers; vitrimers/dynamic networks; metal-organic frameworks (MOFs); covalent organic frameworks (COFs); coordination polymers; networks; composites; nanomaterials and any combination thereof.

The polymeric materials described above may include a polymer derived from a terminal alkyne and this terminal alkyne may include a propargylic moiety.

The polymeric materials described above may include a polymer having the formula:

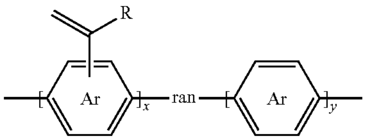

wherein x is an integer greater than or equal to 1 and x+y=n.

The polymeric materials described above may include a polymer having the formula:

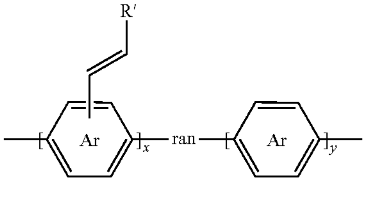

wherein x is an integer greater than or equal to 1 and x+y=n.

The polymeric materials described above may include a polymer having the formula:

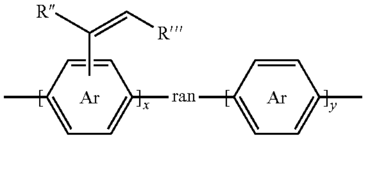

wherein x is an integer greater than or equal to 1 and x+y=n.

The polymeric materials described above may include a polymer having the formula:

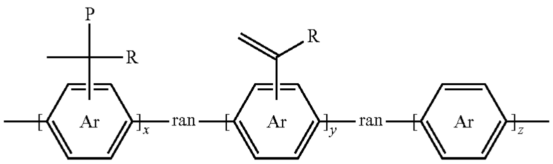

wherein x is an integer greater than or equal to 1 and x+y+z=n.

The polymeric materials described above may include a polymer having the formula:

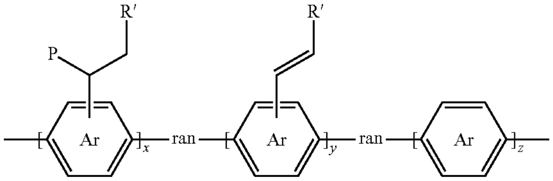

wherein x is an integer greater than or equal to 1 and x+y+z=n.

The polymeric materials described above may include a polymer having the formula:

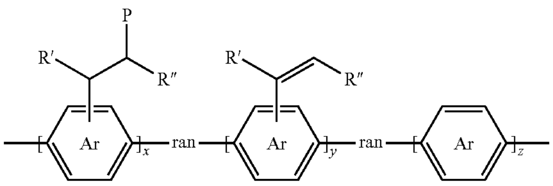

wherein x is an integer greater than or equal to 1 and x+y+z=n.

The polymeric materials described above may include a polymer having the formula:

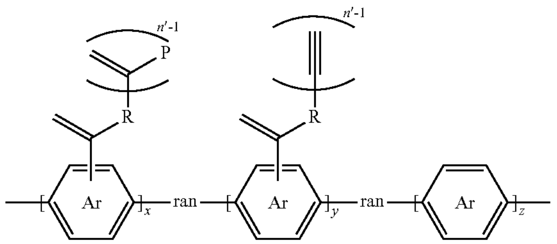

wherein x is an integer greater than or equal to 1, x+y+z=n and n'>1.

The polymeric materials described above may include a polymer having the formula:

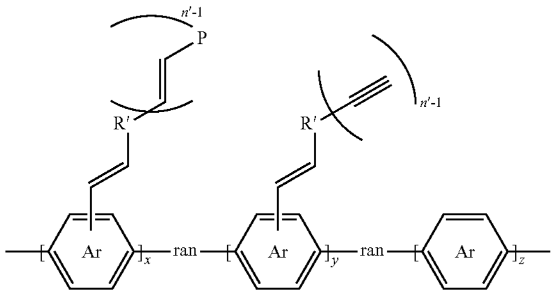

wherein x is an integer greater than or equal to 1, x+y+z=n and n'>1.

The polymeric materials described above may include a polymer having the formula:

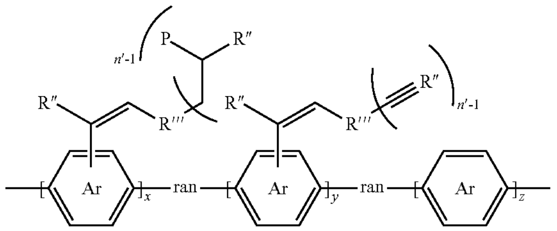

wherein x is an integer greater than or equal to 1, x+y+z=n and n'>1.

The polymeric materials described above may include a polymer having the formula:

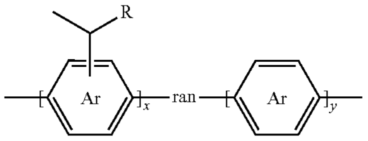

wherein x is an integer greater than or equal to 1 and x+y=n.

The polymeric materials described above may include a polymer having the formula:

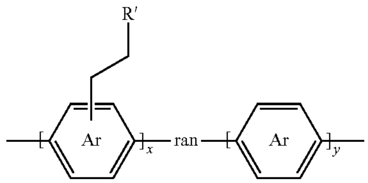

wherein x is an integer greater than or equal to 1 and x+y=n.

The polymeric materials described above may include a polymer having the formula:

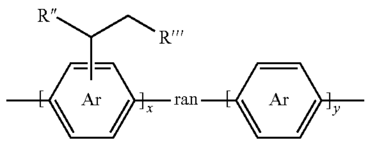

wherein x is an integer greater than or equal to 1 and x+y=n.

The polymeric materials described above may include a polymer having the formula:

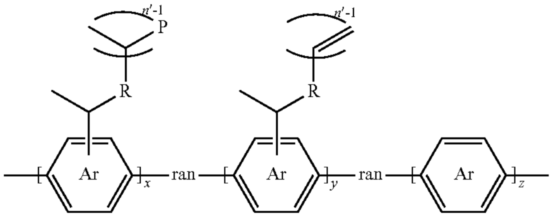

wherein x is an integer greater than or equal to 1, x+y+z=n, and n'>1.

The polymeric materials described above may include a polymer having the formula:

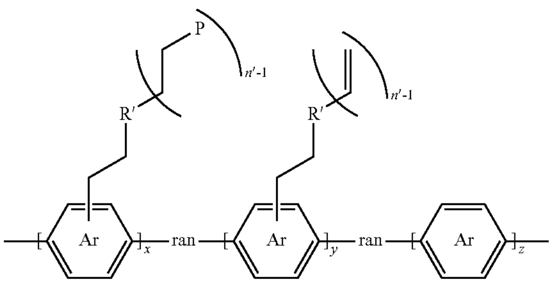

wherein x is an integer greater than or equal to 1, x+y+z=n, and n'>1.

The polymeric materials described above may include a polymer having the formula:

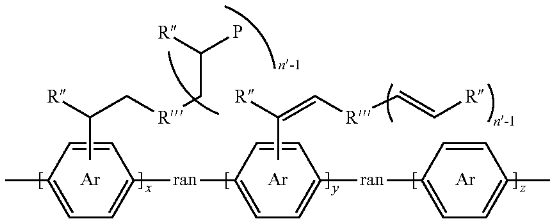

wherein x is an integer greater than or equal to 1, x+Y+z=n, and n'>1.

Also described herein is a method of preparing a functionalized (hetero)aromatic polymeric material, comprising a step of reacting one or more (hetero)aromatic polymeric substrates with:

a) one or more compounds comprising one or more alkyne moieties; or b) one or more compounds comprising one or more alkene moieties;

in the presence of one or more catalysts or initiators comprising gold, and the one or more catalysts or initiators are homogenous or heterogenous, to form a functionalized (hetero)aromatic polymeric material.

In the foregoing method, the one or more (hetero)aromatic polymeric substrates may be reacted with one or more compounds comprising one or more alkyne moieties to form an alkene functionalized (hetero)aromatic polymeric material.

In any of the foregoing methods the functionalized (hetero)aromatic polymeric material may be prepared by one or more of the following reaction schemes, selected from (1), (5), (9), (13) and (17):

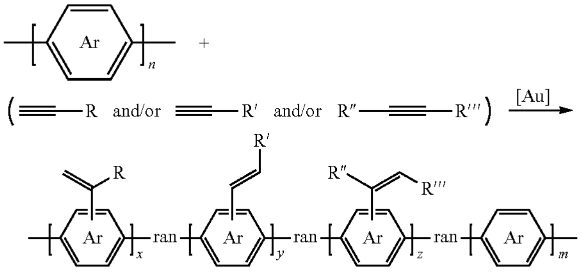

(1)

n is an integer greater than or equal to 1, or from about 5 to about 1,000,000; and wherein x, y, z, and m are each independently an integer greater than or equal to 0, wherein x+y+z≥1, and x+y+z+m=n;

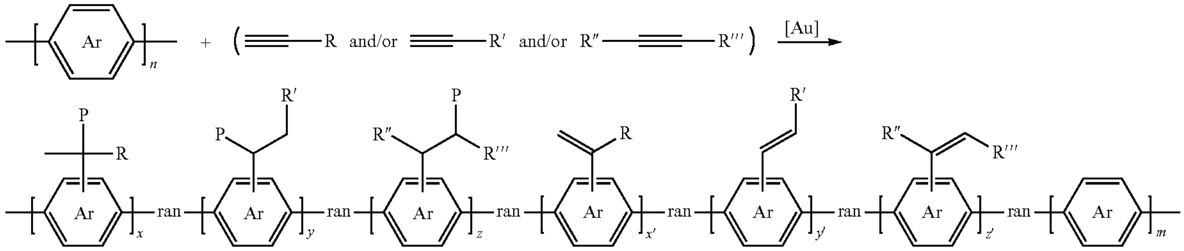

(5)

wherein n is an integer greater than or equal to 1, or from about 5 to about 1,000,000; x, y, z, x', y', z', and m are each independently an integer greater than or equal to 0, or from about 5 to about 1,000,000, wherein x+y+z+x'+y'+z'+m≥1, and x+y+z++x'+y'+z'+m=n;

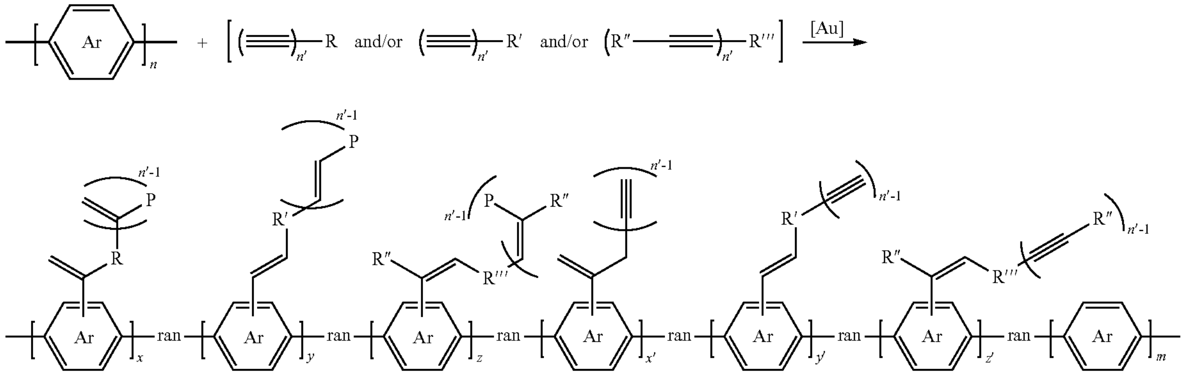

(9)

n is an integer greater than or equal to 1, or from about 5 to about 1,000,000; n' is greater than or equal to 2, or from about 2 to about 10; x, y, z, x', y', z', and m are each independently an integer greater than or equal to 0, or from about 5 to about 1,000,000, wherein x+y+z+x'+y'+z'+m≥1, and x+y+z++x'+y'+z'+m=n;

is a (hetero)aromatic polymeric substrate, R, R', R", and R'" are each independently selected from a substituted or unsubstituted hydrocarbyl group comprising from 1 to 20 carbon -continued

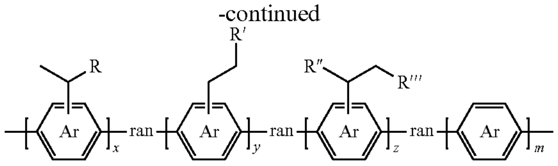

(13)

wherein "ran", R, R', R", and R'" are the same as previously defined. Furthermore, n is defined as an integer greater than or equal to 1; x, y, z, and m are defined as an integer greater than or equal to 0, x+y+z≥1, and x+y+z+m=n; and (17)

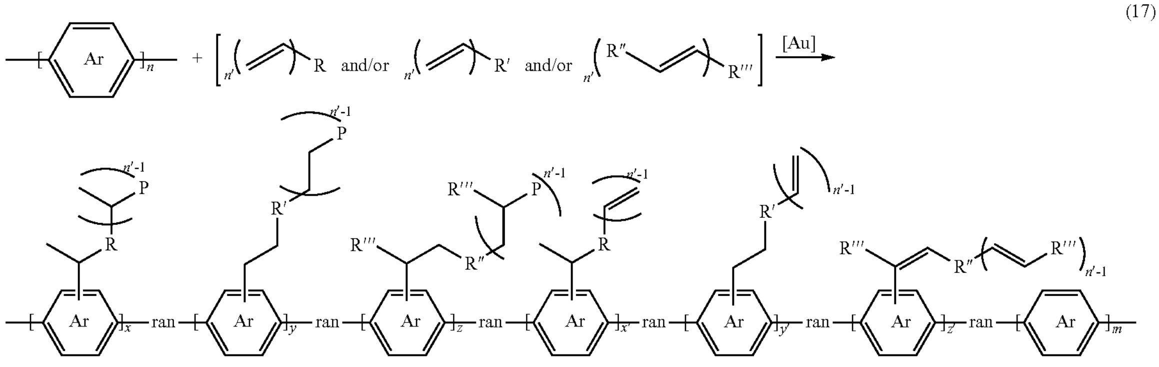

atoms, or an substituted or unsubstituted aryl group comprising from 6 to 20 carbon atoms, or a substituted or unsubstituted heteroaryl group comprising from 6 to 20 carbon atoms, or —H, $—SR^2$, —OH, $—OR^2$, $—NH_2$, $—NHR^2$, $—NR^2R^3$, —F, —Cl, —Br, —I, —CN, $—CF_3$, $—NO_2$, —COOH, $—COOR^2$, —CHO, $—COR^2$, $—CONH_2$, $—CONHR^2$, $—CONR^2R^3$, wherein $R^2$ and $R^3$ are each independently selected from a hydrocarbyl group comprising from 1 to 20 carbon atoms; and P is selected from an oligomeric or polymer chain which forms a branch from a backbone of the functionalized (hetero)aromatic polymeric material or a neighboring functionalized (hetero)aromatic polymeric material to form a crosslinked network, wherein P is limited to polymer chains comprising identical backbone connectivity to that of the polymers, namely, chains based on

as defined above, which are incorporated as pendant structures during the reaction;

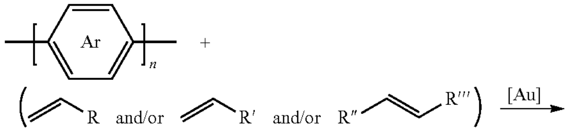

wherein "ran", P, R, R', R", and R'" are the same as previously defined. Furthermore, n is defined as an integer greater than or equal to 1; x, y, z, x', y', z' and m are defined as an integer greater than or equal to 0, x+y+z>0, x+y+z+x'+y'+z'+m=n, and n'>1.

In each of the foregoing methods, the one or more compounds comprising one or more alkyne moieties may be selected from a compound comprising:

a) at least one terminal alkyne moiety, preferably, the terminal alkyne moiety is selected from aliphatic terminal alkyne such as butyne, hexyne, octyne, decyne, any cycloaliphatic terminal alkyne such as cyclohexyne, cyclooctyne, 4-bromobut-1-yne, propargyl acetate, butyn-2-one, propargyl alcohol, propargyl amine, propargyl acetate, glycidyl propargyl ether, ethynyl ferrocene and methyl propiolate;

b) at least one internal alkyne moiety, preferably, the one or more compounds comprising one at least one internal alkyne moiety is selected from dimethyl acetylenedicarboxylate, dimethyl acetylenedicarboxylate, diphenylacetylene and 2-butyne-1,4-diol;

c) at least two or more terminal alkyne moieties, preferably, the one or more compounds comprising one at least two or more terminal alkyne moiety is selected from 1,4-diethynylbenzene, 1,3-diethynylbenzene, 1,3,5-triethynylbenzene, 1,9-decadiyne, propargyl ether, 1,6-heptadiyne, 4,7,10,13,16-pentaoxanonadeca-1,18-diyne and 5,6-dimethyl-5-decen-1,9-diyne; and d) at least two or more internal alkyne moieties, preferably, the one or more compounds comprising one at least two or more internal alkyne moiety is selected from 1,1,1,8,8,8-hexaphenyl-octa-3,5-diyne-2,7-diol and 1,1,6,6-tetrakis-(3-methoxy-phenyl)-hexa-2,4-diyne-1,6-diol.

In each of the foregoing methods, the one or more (hetero)aromatic polymeric substrates may be reacted with the one or more compounds comprising one or more alkyne moieties in an equivalent ratio of from about 0.1 to about 100.

In each of the foregoing methods, the one or more (hetero)aromatic polymeric substrates may be reacted with the one or more compounds comprising two or more alkyne moieties in an equivalent ratio of from about 0.1 to 100.

In each of the foregoing methods, the method may form a 1,1-disubstituted (geminal) alkene functionalized (hetero) aromatic polymeric material, or a 1,2-substituted (vicinal) alkene functionalized (hetero)aromatic material, or a 1,1,2-trisubstituted alkene functionalized (hetero)aromatic polymeric material.

In each of the foregoing methods, the one or more (hetero)aromatic polymeric substrates may be reacted with one or more compounds comprising one or more alkene moieties to form an alkane functionalized (hetero)aromatic polymeric material.

In each of the foregoing methods, the functionalized (hetero)aromatic polymeric material may be prepared by one or more of the following reactions (16) and (20):

(13)

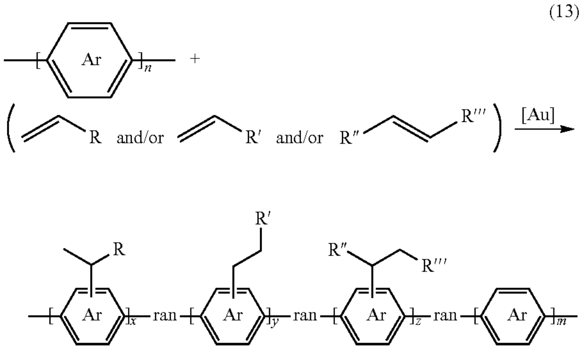

n is defined as an integer greater than or equal to 1, or from about 5 to about 1,000,000; x, y, z, and m are defined as an integer greater than or equal to 0, x+y+z≥1, and x+y+z+m=n;

is a (hetero)aromatic polymeric substrate, R, R', R", and R''' are each independently selected from a substituted or unsubstituted hydrocarbyl group comprising from 1 to 20 carbon atoms, an substituted or unsubstituted aryl group comprising from 6 to 20 carbon atoms, a substituted or unsubstituted heteroaryl group comprising from 6 to 20 carbon atoms, —H, —$SR^2$, —OH, —$OR^2$, —$NH_2$, —$NHR^2$, —$NR^2R^3$, —F, —Cl, —Br, —I, —CN, —$CF_3$, —$NO_2$, —COOH, —$COOR^2$, —CHO, —$COR^2$, —$CONH_2$, —$CONHR^2$, and —$CONR^2R^3$, wherein $R^2$ and $R^3$ are each independently selected from a hydrocarbyl group comprising from 1 to 20 carbon atoms; and P is selected from an oligomeric or polymer chain which forms a branch from a backbone of the functionalized (hetero)aromatic polymeric material or a neighboring functionalized (hetero)aromatic polymeric material to form a crosslinked network and P is selected from an oligomeric or polymer chain which forms a branch from a backbone of the functionalized (hetero)aromatic polymeric material or a neighboring functionalized (hetero) aromatic polymeric material to form a crosslinked network, wherein P is limited to polymer chains comprising identical backbone connectivity to that of the polymers, namely, chains based on

as defined above, which are incorporated as pendant structures during the reaction.

In each of the foregoing methods, the one or more compounds comprising one or more alkene moieties is selected from a compound comprising:

a) at least one terminal alkene moiety, preferably, the one or more compounds comprising one at least one terminal alkene moiety is selected from allyl alcohol, allyl bromide, allyl chloride, maleic anhydride, methyl acrylate, vinyl acetate and acrylic acid;

(17)

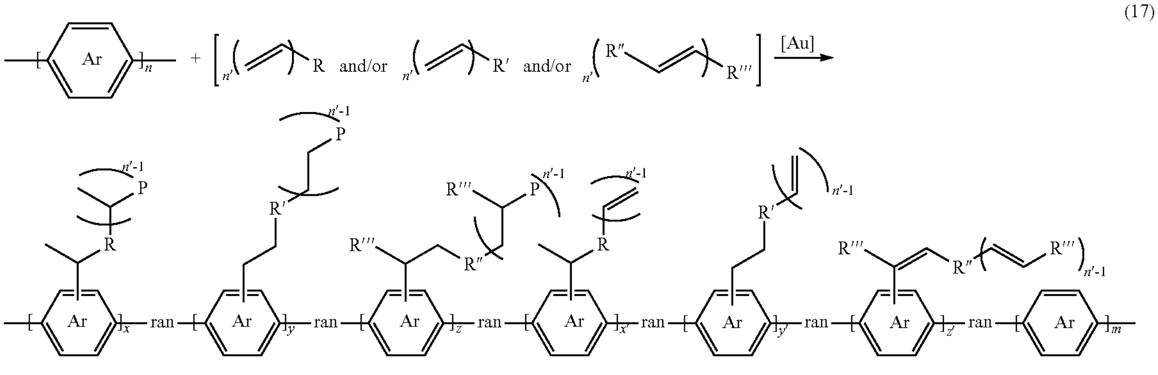

n is an integer greater than or equal to 1, or from about 5 to about 1,000,000; n' is greater than or equal to 2, or from about 2 to about 10; x, y, z, x', y', z', and m are each independently an integer greater than or equal to 0, or from about 5 to about 1,000,000, wherein x+y+z+x'+y'+z'+m≥1, and x+y+z++x'+y'+z'+m=n;

b) at least one internal alkene moiety, preferably, the one or more compounds comprising one at least one internal alkene moiety is selected from cis- and trans-substituted alkenes, 2-pentene, 2-butene, cyclohexene.

2,3-dimethyl-2-butene, fumaric acid, methyl oleate and dimethyl maleate; c) at least two or more terminal alkene moieties, preferably, the one or more compounds comprising one at least two or more terminal alkene moiety is selected from 1,3-butadiene, divinylbenzene, trivinylbenzene, 1,7-octadiene and cyclooctadiene;

d) at least two or more internal alkene moieties, preferably, the one or more compounds comprising one at least two or more internal alkene moiety is selected from cyclooctadiene, spiro[2.4]hepta-4,6-diene, furanoeudesma 1,3-diene, bicyclo[2.2.1]hepta-2,5-diene, (1S,4S)-2,5-diphenylbicyclo[2,2,2]octa-2,5-diene, cholesta-2,4-diene, pregna-1,4,16-triene-3,20-dione, bicyclo[4.2.1]nona-2,4,7-triene, and 4,8-dibromobicyclo[3.3.2]deca-2,6,9-triene.

In each of the foregoing methods, the method may form a methyl branched alkane functionalized (hetero)aromatic polymeric material, or an alkane functionalized (hetero) aromatic material, or a 1,1,2-trisubstituted alkane functionalized (hetero)aromatic polymeric material.

In each of the foregoing methods, the one or more (hetero)aromatic polymeric substrates may be selected from polystyrene, polysulfone, polyether ether ketone, polyethylene terephthalate (PET), polysulfone (PSU), polyether sulfone (PESU), poly(p-phenylene terephthalamide) (e.g., Kevlar®), poly(m-phenylene isophthalamide) (PMIA), polyether ether ketone (PEEK), polyether ketone (PEK) and polyphenylene sulfide (PPS).

In each of the foregoing methods, the one or more gold catalysts or gold initiators are homogenous, and optionally, are selected from chloro[tris(2,3-di-tert-butylphenyl)phosphite]gold(I); [1,3-bis(2,6-diisopropylphenyl)imidazole-2-ylidene] [bis(trifluoromethanesulfonyl)imide]gold(I); chloro [tri(o-tolyl)phosphine]gold(I); chloro[tris(2,3,4,5,6-pentafluorophenyl)phosphine]gold(I); and chloro[(1,1'-biphenyl-2-yl)di-tert-butylphosphine]gold(I).

In each of the foregoing methods, the functionalized (hetero)aromatic polymeric material may be further reacted in the presence of a co-catalyst, optionally selected from silver hexafluoroantimonate(V) ($AgSbF_6$), silver iodide (AgI), silver chloride (AgCl), silver bromide (AgBr), silver trifluoroacetate (AgTFA), silver acetate (AgOAc), silver p-toluenesulfonate (AgOTs), silver bis(trifluoromethanesulfonyl)imide ($AgNTf_2$), silver triflate (AgOTf), silver tetrafluoroborate ($AgBF_4$), potassium tris(triflyl)methide ($KCTf_3$), silver polyfluoroalkoxyaluminates such as $AgAl(OCH(CF_3)_2)_4$, $AgAl(OC(CH_3)(CF_3)_2)_4$, and $AgAl(OC(CF_3)_3)_4$, and sodium tetrakis[3,5-bis(trifluoromethyl)phenyl]borate (NaBARF).

In another aspect, the present invention relates to a functionalized (hetero)aromatic polymeric material prepared by any of the foregoing methods.

In a still further aspect, the present invention relates to a hybrid functionalized (hetero)aromatic polymeric material prepared by a combination of two or more of any of the foregoing methods.

DESCRIPTION OF EMBODIMENT(S)

Figure 1:
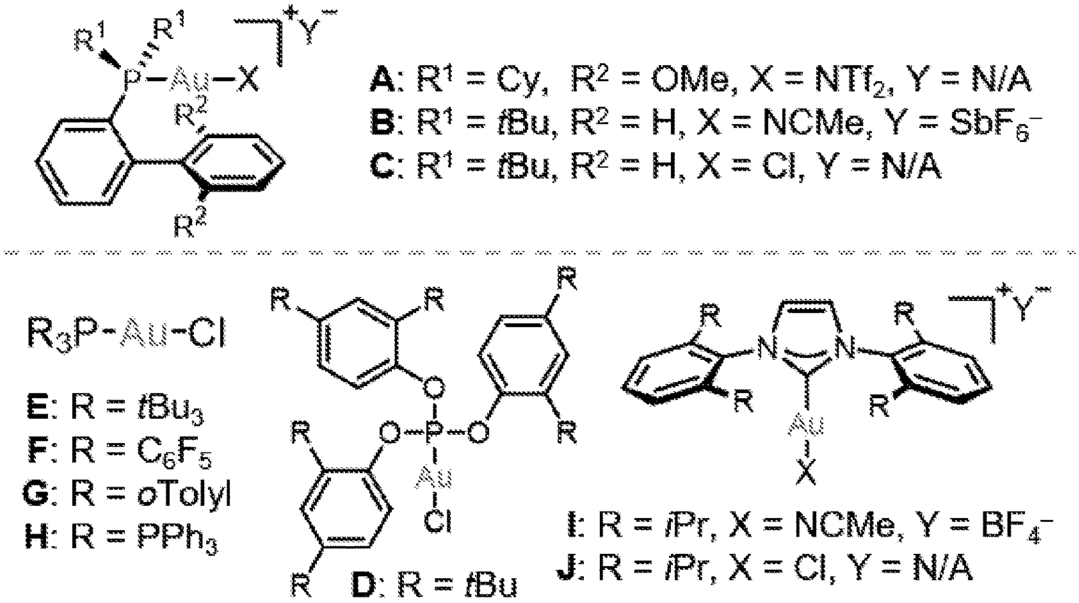
FIG. 1 shows structural depiction of the gold catalysts A-J.
Figure 2:
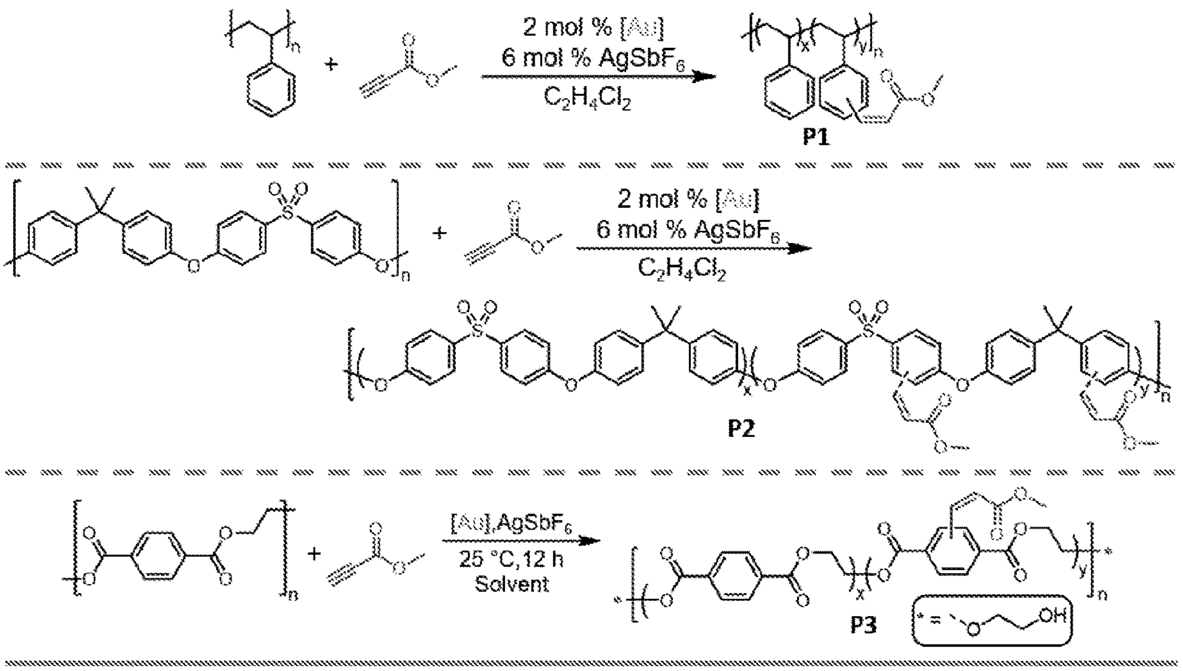
FIG. 2 shows a general procedure for gold-catalyzed post-polymerization modification (PPM) reactions.
Figure 3:
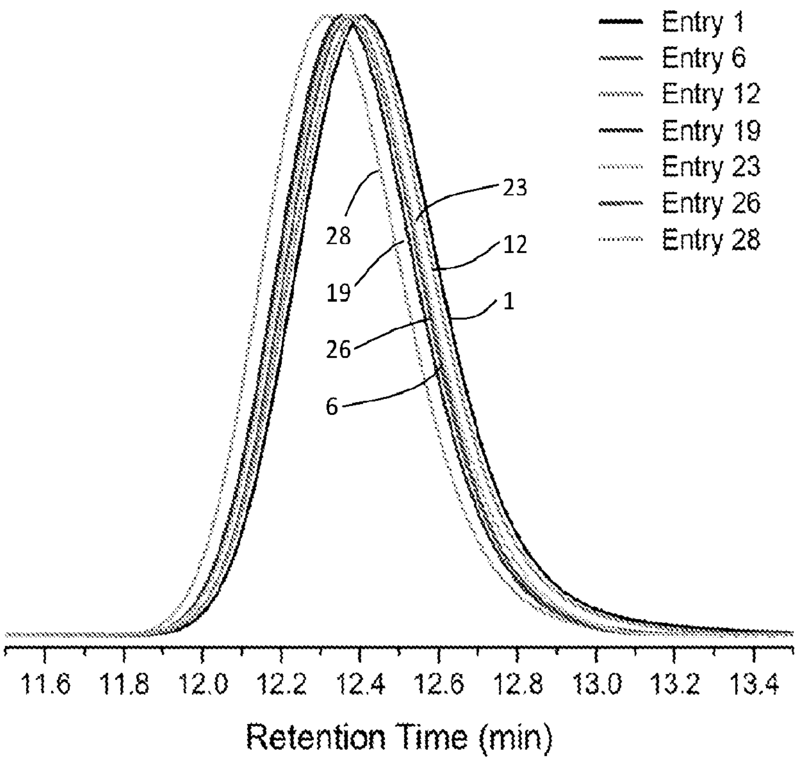
FIG. 3 shows representative GPC traces selected from the optimization of the Au-mediated PPM of PS.
Figure 4:
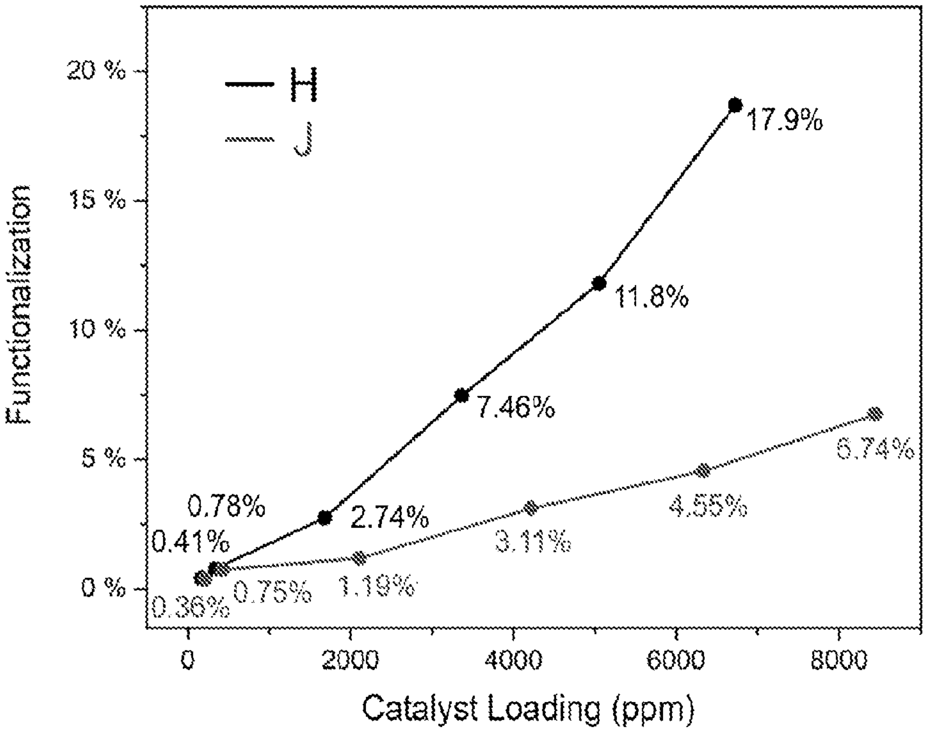
FIG. 4 shows the effect of catalyst loading on the degree of functionalization (%) for the following reaction conditions: PS (0.480 mmol), compound 1 (4.80 mmol), Au catalyst (2-0.05 mol %), AgSbF6 (6-0.15 mol %), 1,2-dichloroethane (DCE, 0.85 M).
Figure 5:
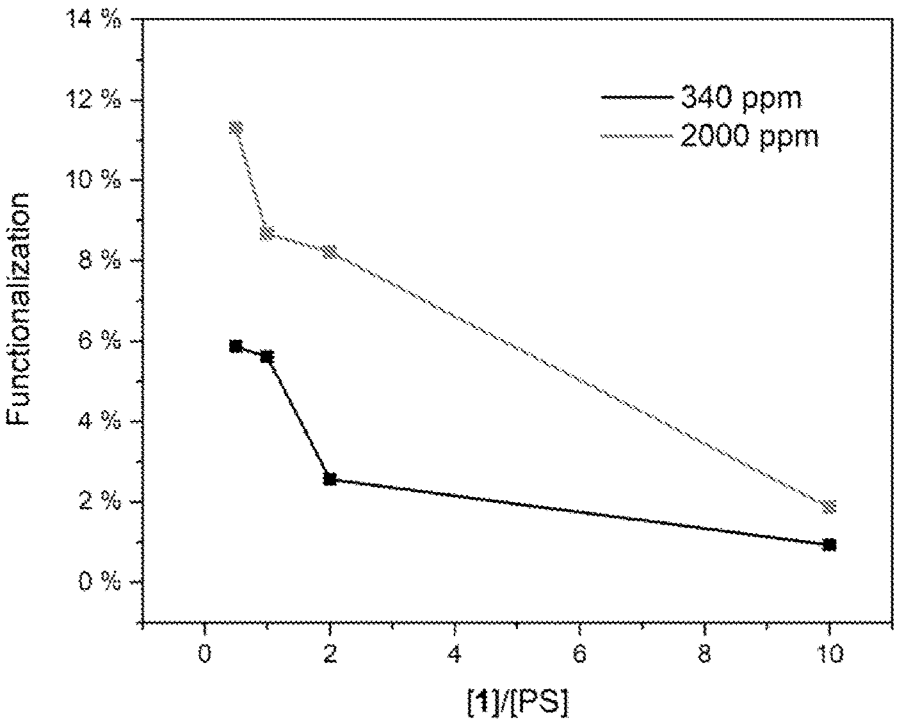
FIG. 5 shows the effect of [compound 1]/[PS] on the degree of functionalization (%) at reduced catalyst loadings of 2000 and 340 ppm.
Figure 6:
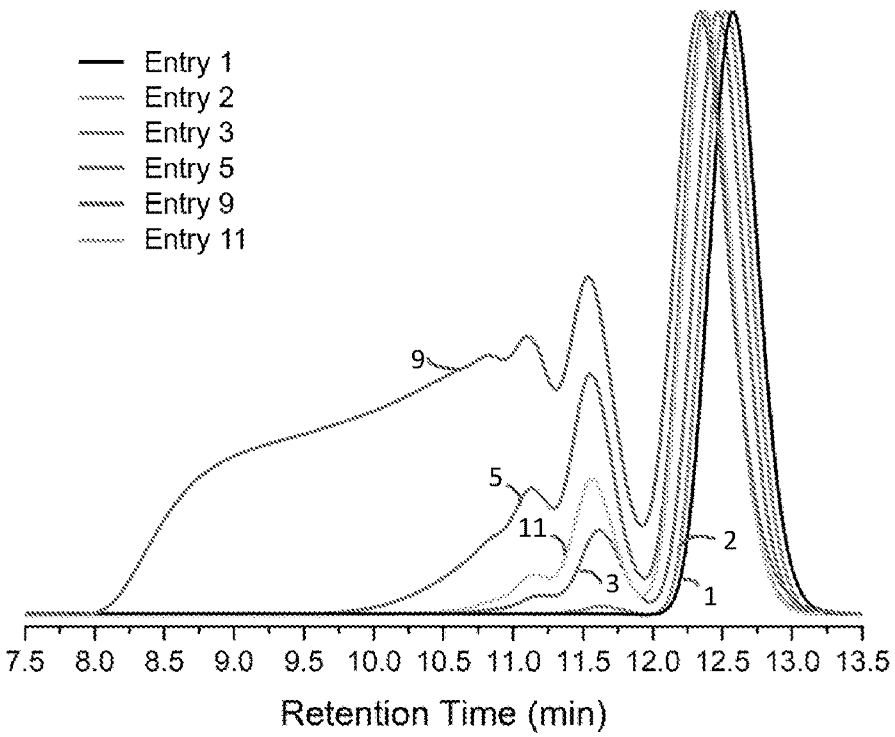
FIG. 6 shows representative GPC traces denoting high degrees of functionalization in addition to the appearance of higher molecular weight (lower retention time) peaks corresponding to branching through a competing double-hydroarylation pathway.
Figure 7:
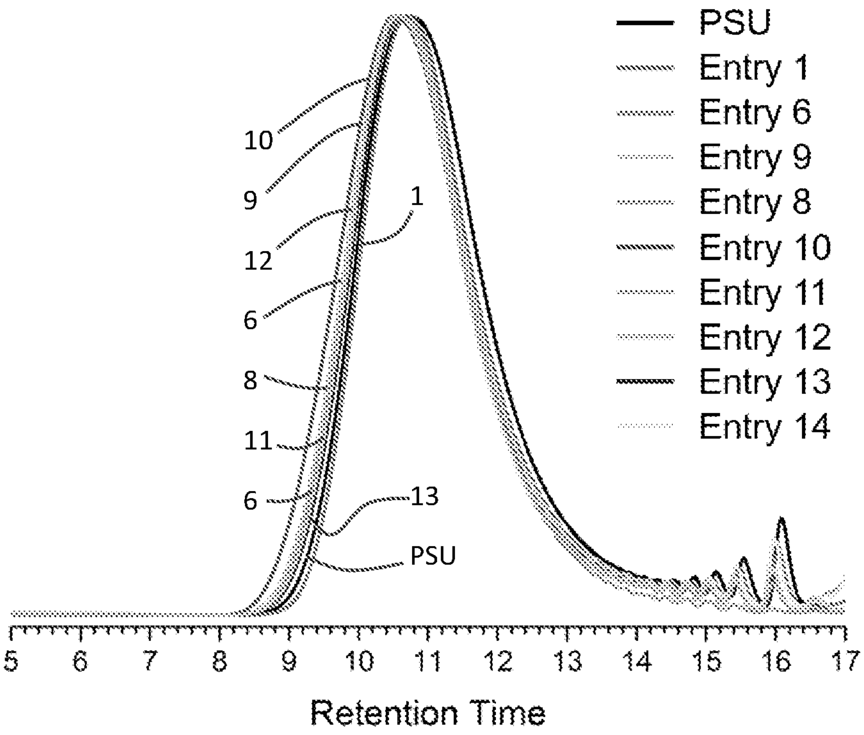
FIG. 7 shows representative GPC traces selected from the optimization of the Au-mediated PPM of PSU.
Figure 8:
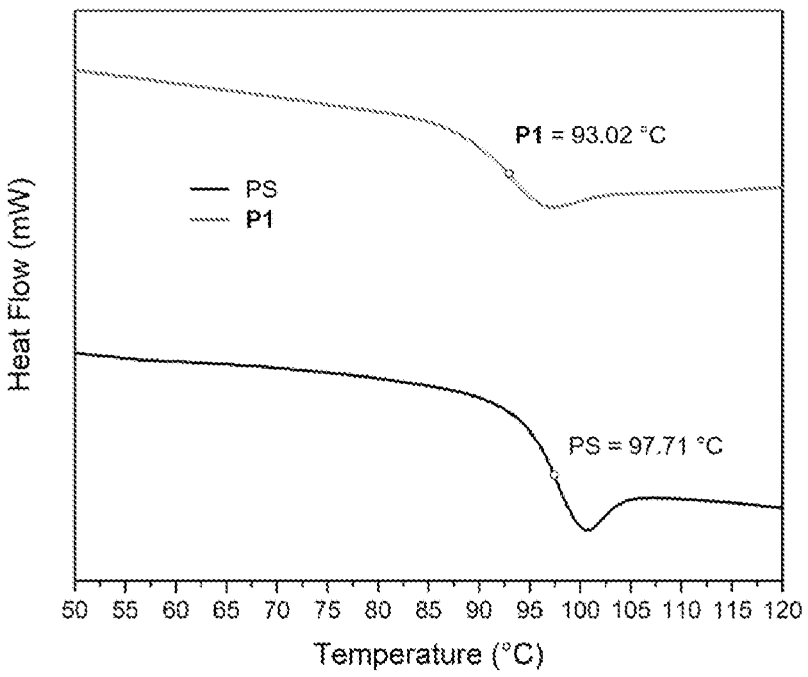
FIG. 8 shows DSC thermograms of P1 (14.8% functionality) and PS. Inset: glass transition of P1 and PS, highlighting change upon functionalization.
Figure 9:
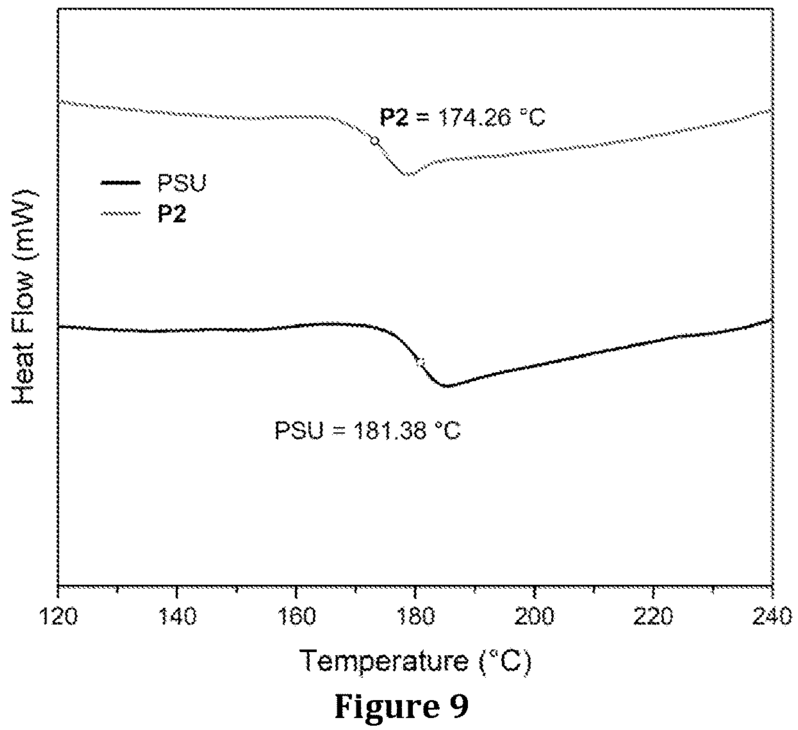
FIG. 9 shows DSC thermograms of compound P2 (9.72% functionality) and the PSU and indicates the glass transition temperatures of compound P2 and the PSU, highlighting the change that occurs upon functionalization.
Figure 10:
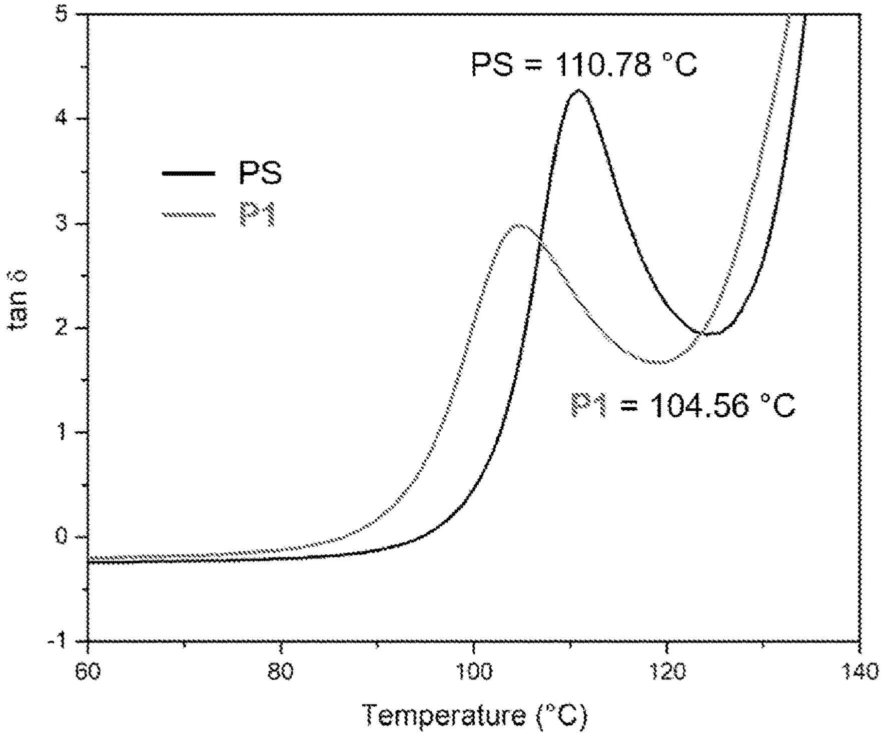
FIG. 10 shows a plot of tan S versus temperature for compound P1 (14.8% functionality) and PSU.
Figure 11:
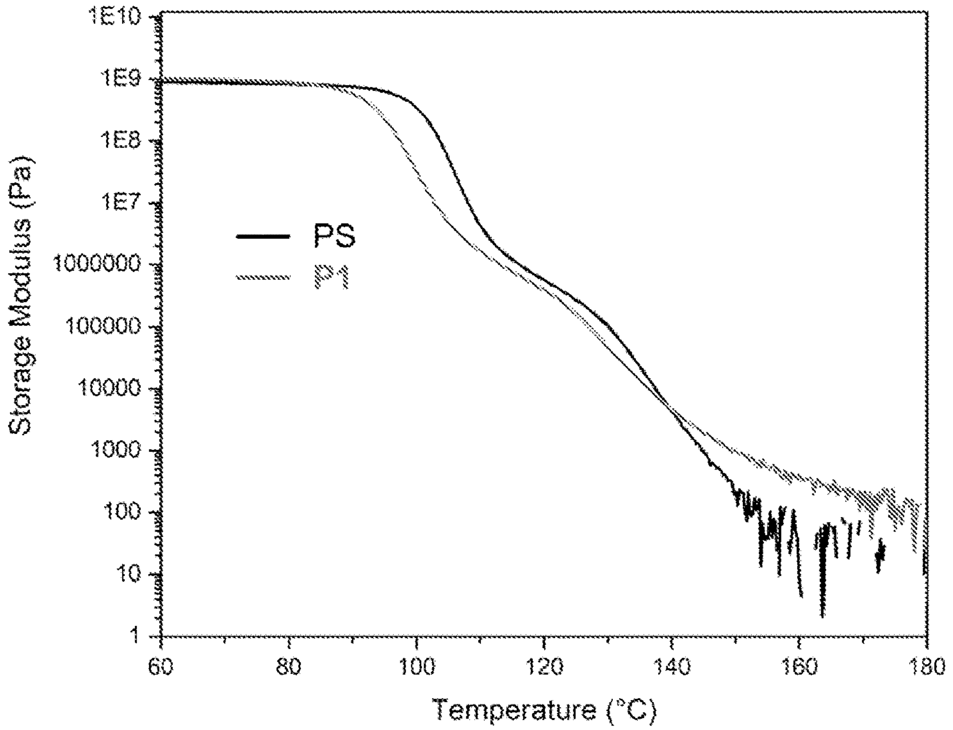
FIG. 11 shows a plot of storage modulus versus temperature for compound P1 (14.8% functionality) and the PS.
Figure 12:
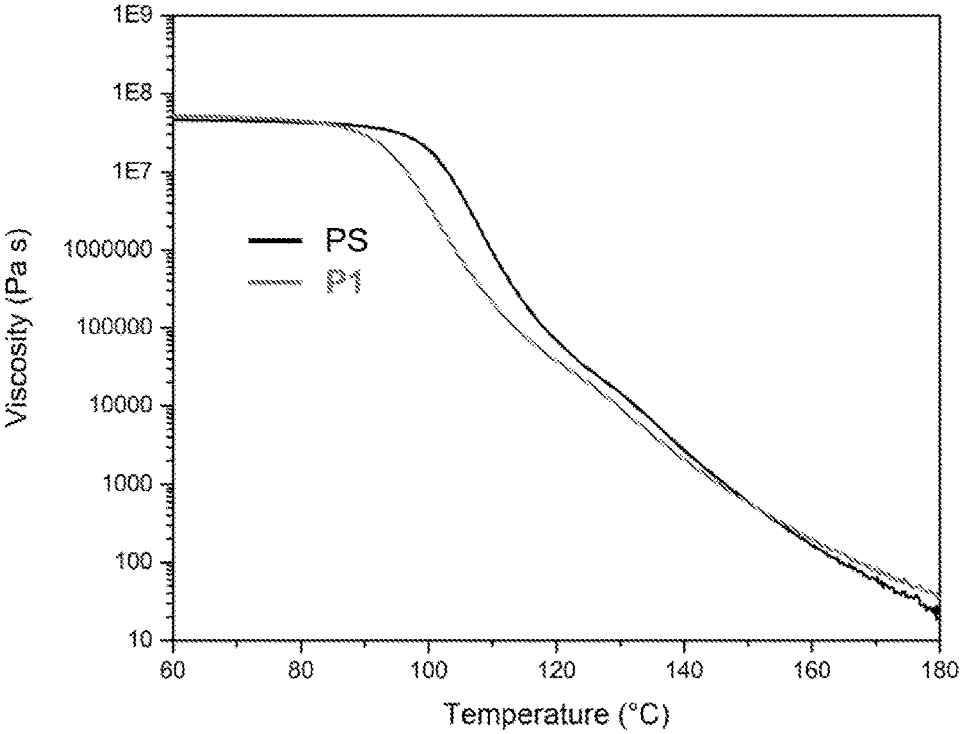
FIG. 12 shows a plot of complex viscosity versus temperature for compound P1 (14.8% functionality) and the PS.

Post polymerization and polymeric materials modification through gold (Au) catalysis is a system that provides new methods and processes for the reaction of polymeric/oligomeric substrates with reactants comprising alkynes/alkenes to afford functionalized polymeric/oligomeric products through the utilization of homogenous and/or heterogenous Au catalysts. More specifically, it provides routes for reaction of polymeric/oligomeric substrates comprising varying degrees of aromatic character, such as PS or PSU for example, with alkyne/alkene bearing molecules to afford a functionalized polymeric/oligomeric product. Overall, it provides novel structurally complex functionalized polymeric products derived from polymeric/oligomeric starting materials prepared under mild reaction conditions via intermolecular Au catalyzed reaction mechanisms, from which unique properties that are not present in the parent material are imparted in the products.

Post polymerization and polymeric materials modification through Au catalysis overcomes several major long-standing issues associated with the process of PPM of polymeric substrates and commodity polymeric materials: 1) the outlined methodology overcomes the need for high reaction temperatures, harsh reagents, and long reaction times prototypically employed in the PPM of commodity polymeric materials; 2) the methodology circumvents the necessity for custom monomer synthesis to afford reactive polymer precursors commonly employed in PPM protocols, this in turn allows for the utilization of existing infrastructure and commodity polymer feedstocks which are not applicable for conventional PPM approaches; 3) this methodology eliminates the need for multistep synthetic manipulations to functionalize a polymer, affording a functionalized polymeric product in a single synthetic step; 4) the unique reactivity/stability of the gold catalyst(s) obviates the need for rigorous exclusion of $H_2O/O_2$ that is required in many PPM methodologies, particularly transition metal mediated protocols; and 5) the high functionality tolerance of Au allows for the installation of functionalities in the products that are inaccessible to other PPM protocols. These advantages coupled with the unique reactivity/selectivity of Au allows for the highly efficient functionalization of polymeric substrates under facile reaction conditions. Moreover, the capability of the outlined methodology to functionalize commodity polymeric materials without prior chemical manipulation provides routes for the upcycling of post-consumer plastic waste into value-added materials. The methodology of the system has good potential for utilization in industrial polymer production, recycling, and plastic waste management; additionally, this PPM protocol has potential for use in any field and/or application that requires functionalized polymeric materials and/or networks.

Definitions

The following definitions are applicable for each embodiment disclosed in the text herein.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having a predominantly hydrocarbon character. Each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, heteroaryl groups such as pyridyl groups, furyl groups, imidazolyl groups and ether groups, arene groups, heteroarene groups, carbocyclic rings, heterocyclic rings, aldehyde groups, ketone group, ester groups, carboxylic acid groups, amide groups, anhydride groups, nitrile groups, imine groups, acid chloride groups, sulfide groups, sulfonic acid groups, sulfonyl groups, sulfinyl groups, alkene groups, azo groups, azido groups, thiocarbonyl groups, peroxy groups, and silane groups, and wherein no more than two non-hydrocarbon substituents are present for every ten carbon atoms in the hydrocarbyl group. See e.g. the IUPAC Purple book, page 313.

"Aromatic polymeric substrate" is intended to embrace an optionally substituted aromatic ring system(s) (Ar), such as phenyl or naphthyl, located pendant to, or within the backbone of a portion, or the entirety of, a polymeric structure. Applicable polymeric structures comprise homopolymers, copolymers (random, statistical, alternating, block, graft, etc.), conjugated polymers, cyclic polymers, ladder polymers, supramolecular polymers, spiropolymers, polyelectrolytes, ionomers, vitrimers/dynamic networks, metal-organic frameworks (MOFs) (MOFs), covalent organic frameworks (COFs), coordination polymers, networks, composites, nanomaterials (graphene, carbon nanotubes, etc.), and any conceivable polymeric structure, or combination of structures, comprised in part, or entirely, of aromatic moieties. Aromatic groups include, but are not limited to, monocyclic aromatic rings and polycyclic aromatic ring systems. In other embodiments, aromatic groups can be unsubstituted. In other embodiments, aromatic groups can be substituted.

As used herein, the term "(hetero)aromatic polymeric substrate" is used in its ordinary sense, which is well-known to those skilled in the art. Specifically, it refers to an optionally substituted aromatic ring system (Ar) comprising at least one constituent non-carbonaceous constituent atom (i.e., heteroatom), where heteroatoms include but are not limited to, oxygen, nitrogen, sulfur, selenium, phosphorus, etc. Applicable polymeric structures comprise homopolymers, copolymers (random, statistical, alternating, block, graft, etc.), conjugated polymers, cyclic polymers, ladder polymers, supramolecular polymers, spiropolymers, polyelectrolytes, ionomers, vitrimers/dynamic networks, metal-organic frameworks (MOFs) (MOFs), covalent organic frameworks (COFs), coordination polymers, networks, composites, nanomaterials (graphene, carbon nanotubes, etc.), and any conceivable polymeric structure, or combination of structures, comprised in part, or entirely, of heteroaromatic moieties. Heteroaromatic groups include, but are not limited to, monocyclic aromatic rings and polycyclic heteroaromatic ring systems. The heteroaromatic groups may be unsubstituted or substituted. Exemplary heteroaromatic groups include phenyl, thiophene, pyridine, furan, pyrrole, imidazole, fluorene and carbazole groups. Suitable examples of (hetero)aromatic polymeric substrates, or heteroaromatic groups may include polystyrene, polysulfone, polyether ether ketone, polyethylene terephthalate (PET), polysulfone (PSU), polyether sulfone (PESU), poly(p-phenylene terephthalamide) (e.g., Kevlar®), poly(m-phenylene isophthalamide) (PMIA), polyether ether ketone (PEEK), polyether ketone (PEK) and polyphenylene sulfide (PPS), and

indicates in the reaction schemes a (hetero)aromatic polymeric substrate.

The term "alkyne" or "alkyne moiety" as employed herein refers to a linear, branched, cyclic, (hetero)aromatic, polymeric, or a combination of linear and/or branched and/or cyclic and/or (hetero)aromatic and/or polymeric hydrocarbon chain(s) and/or ring(s) having at least one carbon-carbon triple bond. Suitable examples of a compound comprising one or more "alkyne moiety" may include any aliphatic terminal alkyne e.g., butyne, hexyne, octyne, decyne, etc., any cycloaliphatic terminal alkyne e.g., cyclohexyne, cyclooctyne, etc., 4-bromobut-1-yne, propargyl acetate, butyn-2-one, propargyl alcohol, propargyl amine, propargyl acetate, glycidyl propargyl ether, ethynyl ferrocene and methyl propiolate. Suitable examples of a compound comprising two or more "alkyne moieties" may include 1,4-diethynylbenzene, 1,3-diethynylbenzene, 1,3,5-triethynylbenzene, 1,9-decadiyne, propargyl ether, 1,6-heptadiyne, 4,7,10,13,16-pentaoxanonadeca-1,18-diyne and 5,6-dimethyl-5-decen-1,9-diyne.

The term "alkene" or "alkene moiety" as employed herein refers to any combination of linear, branched, cyclic, (hetero)aromatic, polymeric, or a combination of linear and/or branched and/or cyclic and/or (hetero)aromatic and/or polymeric hydrocarbon chain(s) and/or ring(s) having at least one carbon-carbon double bond. Suitable examples of a compound comprising one or more "alkene moiety" may include any aliphatic terminal alkene i.e., 1-butene, 1-hexene, 1-octene, 1-decene, etc., allyl alcohol, allyl bromide, allyl chloride, methyl acrylate, vinyl acetate and acrylic acid, among others or an internal alkene such as cis- and trans-substituted alkenes, 2-pentene, 2-butene, cyclohexene. 2,3-dimethyl-2-butene, fumaric acid, maleic anhydride, methyl oleate and dimethyl maleate. Suitable examples of compounds comprising two or more "alkene moieties" may include, for example, 1,3-butadiene, divinylbenzene, trivinylbenzene, 1,7-octadiene and cyclooctadiene. Suitable examples of compounds comprising two or more internal alkene moieties include cyclooctadiene, spiro[2.4]hepta-4,6-diene, furanoeudesma 1,3-diene, bicyclo[2.2.1]hepta-2,5-diene, (1S,4S)-2,5-diphenylbicyclo[2,2,2]octa-2,5-diene, cholesta-2,4-diene, pregna-1,4,16-triene-3,20-dione, bicyclo[4.2.1]nona-2,4,7-triene, and 4,8-dibromobicyclo[3.3.2]deca-2,6,9-triene.

The term "electron withdrawing functional group" refers to a group that reduces electron density in a molecule through the carbon atom it is bonded to via inductive or resonance effects. Exemplary electron-withdrawing groups include, for example, esters (e.g., —COOR), ketones (e.g., —COR), nitro groups (e.g., —$NO_2$), cyano groups (e.g., —CN), aldehyde groups (e.g., —CHO) and carboxylic acid groups (e.g., —COOH).

The term "electron donating functional group" refers to a group that has the net effect of increasing electron density in a molecule through the carbon atom it is bonded to via inductive or resonance effects. Exemplary electron donating groups include ether groups (e.g., —O—), hydroxyl groups (e.g., —OH), amine groups (e.g., —$NH_2$, —$NR_2$, etc.), arene groups (e.g., phenyl), and $C_1$-$C_{20}$ hydrocarbyl groups (e.g., —$CH_3$), wherein $R_1$ and $R_2$ are as defined elsewhere herein.

The term, "ran" is defined in IUPAC copolymer nomenclature as a polymer composition that "obeys Bernoullian statistics" and is truly random. The copolymer nomenclature is available here on page 264: https://iupac.org/what-we-do/books/purplebook/. Thus, the term, "ran" denotes a copolymer with no precisely defined repeating structure due to fabrication by a random functionalization mechanism.

In a first aspect, the present disclosure relates to a method of preparing:

a) an alkene functionalized (hetero)aromatic polymeric material comprising a step of reacting one or more (hetero)aromatic polymeric substrates with one or more compounds comprising an alkyne moiety to form the alkene functionalized (hetero)aromatic polymeric material; or b) an alkane functionalized (hetero)aromatic polymeric material comprising a step of reacting one or more (hetero)aromatic polymeric substrates with one or more compounds comprising one or more alkene moieties to form an alkane functionalized (hetero)aromatic polymeric material.

The method may include mixing one or more, or two or more, (hetero)aromatic polymeric substrate(s) with a) one or more, two or more, compounds comprising one or more alkyne moieties to form a mixture; or b) one or more, or two or more compounds comprising one or more alkene moieties. This mixture may be combined in the presence of a gold (Au) catalyst or initiator. Suitable Au catalysts include, for example, [bis(trifluoromethanesulfonyl)imidate](2-dicyclohexyl(2', 6'-dimethoxybiphenyl)phosphine)gold(I), (acetonitrile)[(2-biphenyl)di-tert-butylphosphine]gold(I) hexafluoroantimonate, chloro[(2-biphenyl)ditert-butylphosphine]gold(I), chloro(tri-tert-butylphosphine)gold (I), chloro[tris(2,3,4,5,6-pentafluorophenyl)phosphine]gold (I), (acetonitrile)[1,3-bis(2,6-diisopropylphenyl)imidazol-2-ylidene]gold(I) tetrafluoroborate and chloro[tri(ortho-tolyl) phosphine]gold(I). Preferred Au catalysts include, for example, chloro(triphenylphosphine)gold(I), chloro[1,3-bis (2,6-diisopropylphenyl)imidazol-2-ylidene]gold(1) and chloro[tris(2,4-di-tert-butylphenyl)phosphite]gold(I), all of which are shown in FIG. 1.

In addition, the mixture may be combined further in the presence of other cocatalysts, coinitiators, or coactivators derived from silver (Ag), copper (Cu), alkali salts, at least one acid, or combinations thereof. This may yield (hetero) aromatic polymeric material(s) comprising identical connectivity to the initial polymeric substrate(s) with the additional incorporation of pendant alkene structures and corresponding substituents imparted from the alkyne reactant(s) onto a portion, or pendant alkane structures and corresponding substituents imparted from the alkene reactant(s) onto a portion, or the entirety of, the (hetero)aromatic moieties contained within the (hetero)aromatic polymeric substrate structure. Exemplary cocatalysts include, for example, silver hexafluoroantimonate(V) ($AgSbF_6$), silver iodide (AgI), silver chloride (AgCl), silver bromide (AgBr), silver trifluoroacetate (AgTFA), silver acetate (AgOAc), silver p-toluenesulfonate (AgOTs), silver bis(trifluoromethanesulfonyl) imide ($AgNTf_2$), silver triflate (AgOTf), silver tetrafluoroborate ($AgBF_4$), potassium tris(triflyl)methide ($KCTf_3$), silver polyfluoroalkoxyaluminates such as $AgAl(OCH(CF_3)_2)_4$, $AgAl(OC(CH_3)(CF_3)_2)_4$, and $AgAl(OC(CF_3)_3)_4$, and sodium tetrakis[3,5-bis(trifluoromethyl)phenyl]borate (NaBARF).

The one or more compounds reacted with the (hetero) aromatic polymeric substrates may comprise one or more alkyne moieties, or the one or more compounds reacted with the (hetero)aromatic polymeric substrates may comprise one or more alkene moieties. The one or more (hetero)aromatic polymeric substrates is reacted with the one or more compounds comprising one or more alkyne moieties in an equivalent ratio of from about 0.1 to about 100. The one or more (hetero)aromatic polymeric substrates is reacted with the one or more compounds comprising two or more alkyne moieties in an equivalent ratio of from about 0.1 to 100.

In the foregoing methods, the one or more compounds comprising one or more alkyne moieties may include a terminal alkyne comprising an electron donating moiety to form a 1,1, —disubstituted (geminal) alkene functionalized (hetero)aromatic polymeric material, or may include a terminal alkyne comprising an electron withdrawing moiety to form a 1,2-substituted (vicinal) alkene functionalized (hetero)aromatic polymeric material, or may include an internal alkyne moiety such as dimethyl acetylenedicarboxylate, dimethyl acetylenedicarboxylate, diphenylacetylene and 2-butyne-1,4-diol, to form a 1,1,2-trisubstituted alkene functionalized (hetero)aromatic polymeric material. Examples of compounds with two or more internal alkyne moieties include, for example, 1,1,1,8,8,8-hexaphenyl-octa-3,5-diyne-2,7-diol and 1,1,6,6-tetrakis-(3-methoxy-phenyl)-hexa-2,4-diyne-1,6-diol.

For example, the foregoing method may employ a compound comprising at least one alkyne moiety, which may be described by the following reaction scheme to form an alkene functionalized (hetero)aromatic polymeric material, or a hybrid functionalized (hetero)aromatic polymer, or a geminal alkene functionalized (hetero)aromatic material or a vicinal alkene functionalized (hetero)aromatic material, or a 1,1,2-trisubstituted alkene functionalized (hetero)aromatic material:

(1)

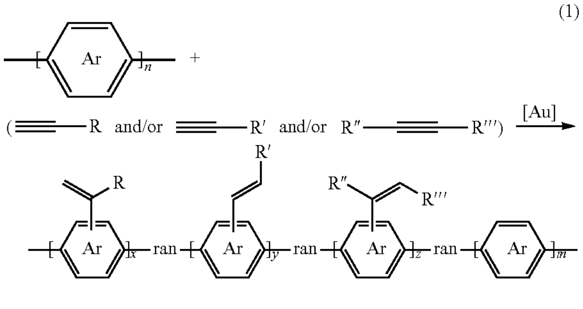

wherein

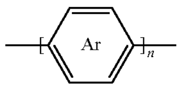

is a (hetero)aromatic polymeric substrate in which (hetero) aromatic moieties (including but not limited to monocyclic, polycyclic, and macrocyclic (hetero)aromatics, wherein the heteroatom(s) (if present) include, but are not limited to: sulfur, nitrogen, oxygen, selenium, silicon, tellurium, etc. are contained pendant to and/or within the structure of a polymeric material. Applicable polymeric structures comprise homopolymers, copolymers (random, statistical, alternating, block, graft, etc.), conjugated polymers, cyclic polymers, ladder polymers, supramolecular polymers, spiropolymers, polyelectrolytes, ionomers, vitrimers/dynamic networks, metal-organic frameworks (MOFs), covalent organic frameworks (COFs), coordination polymers, networks, composites, nanomaterials (graphene, carbon nanotubes, etc.), and any conceivable polymeric structure, or combination of structures, comprised in part, or entirely, of aromatic moieties. Wherein "ran" denotes a random composition of the polymer backbone structure varying between the moieties located on either side of the ran located within the polymer reaction scheme. Furthermore, n may be an integer greater than or equal to 1, or an integer from about 5 to about 1,000,000; x, y, z, and m are defined as an integer greater than or equal to 0, x+y+z>0, and x+y+z+m=n.

The following definition for R, R', R", and R'" may be used to describe each of the embodiments described herein. Specifically, in any one of reaction schemes shown herein, R, R', R", and R'" may each independently be selected from the group comprising an unsubstituted hydrocarbyl group comprising from 1 to 20 carbon atoms or from 1 to 10 to carbon atoms, a substituted hydrocarbyl group comprising from 1 to 20 carbon atoms, or from about 1 to 10 carbon atoms, an unsubstituted aryl group comprising from 6 to 20 carbon atoms, a substituted aryl group comprising from 6 to 20 carbon atoms, or from about 6 to 10 carbon atoms, an unsubstituted heteroaryl group comprising from 6 to 20 carbon atoms, or from about 6 to 10 carbon atoms, a substituted heteroaryl group comprising from 6 to 20 carbon atoms, or from about 6 to 10 carbon atoms, —H, —$SR^2$, —OH, —$OR^2$, —$NH_2$, —$NHR^2$, —$NR^2R^3$, —F, —Cl, —Br, —I, —CN, —$CF_3$, —$NO_2$, —COOH, —$COOR^2$, —CHO, —$COR^2$, —$CONH_2$, —$CONHR^2$, —$CONR^2R^3$, wherein $R^2$ and $R^3$ are each independently selected from a hydrocarbyl group comprising from 1 to 20 carbon atoms, or from about 1 to 10 carbon atoms. R or R' may not be —F, —Cl, —Br, I, —CN, —$CF_3$, —$NO_2$, —COOH, $COOR^2$, CHO, $COR^2$, $CONH_2$, $CONHR^2$, $CONR^2R^3$ when the R or R' group forms a geminal alkene or geminal methyl group. If R and R' are different, R may be defined as having more electron donating character than R'. R may be any electron donating functional group, R' may be any electron withdrawing functional group. If R, R', R", and R'" are different, R" is defined as having more electron donating character than R'". It is well known to skilled persons how to determine and compare electron donating character.

In the foregoing methods, the one or more alkyne moieties of the one or more compounds may be a terminal alkyne comprising an electron donating moiety to form a 1,1-disubstituted (i.e., geminal) alkene functionalized (hetero) aromatic material(s); or a terminal alkyne comprising an electron withdrawing moiety to form a 1,2-substituted (i.e., vicinal) alkene functionalized (hetero)aromatic material(s) or an internal alkyne moiety to afford 1,1,2-trisubstituted alkene functionalized (hetero)aromatic material(s).

For example, the foregoing methods may employ a compound comprising at least one alkyne moiety to form a geminal alkene functionalized (hetero)aromatic polymer material. The compound may be an electron rich terminal alkyne as depicted in reaction scheme (2):

(2)

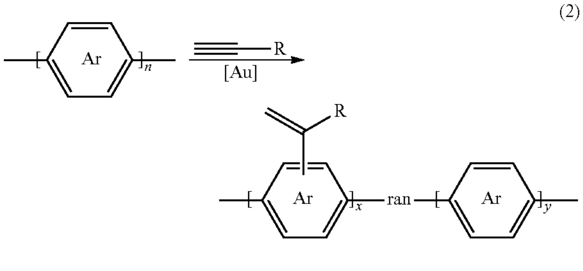

wherein

,

"ran" and R are the same as define previously and n and x are defined as an integer greater than or equal to 1; y is defined as an integer greater than or equal to 0, and x+y=n.

For example, the foregoing methods may employ a compound comprising at least one alkyne moiety to form a vicinal alkene functionalized (hetero)aromatic polymeric material. The compound may be an electron poor terminal alkyne as depicted in reaction scheme (3):

(3)

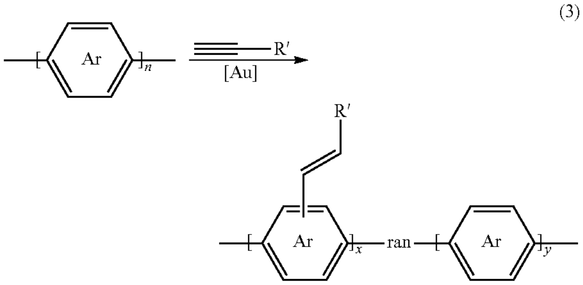

wherein

,

"ran" and R' are the same as define previously and n and x are defined as an integer greater than or equal to 1; y is defined as an integer greater than or equal to 0, and x+y=n.

For example, the foregoing methods may employ a compound comprising at least one alkyne moiety to form an alkene functionalized (hetero)aromatic polymeric material, or a 1,1,2-trisubstituted alkene functionalized (hetero)aromatic material. The compound may be an internal alkyne as depicted in reaction scheme (4):

(4)

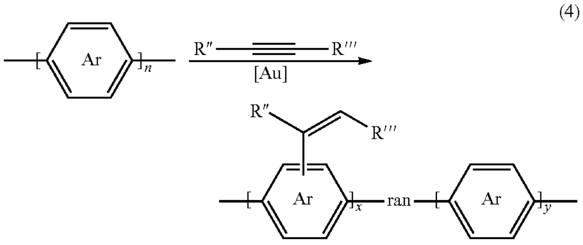

wherein

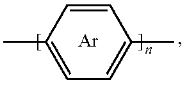,

"ran", R" and R'" are the same as define previously and n and x are defined as an integer greater than or equal to 1; y is defined as an integer greater than or equal to 0, and x+y=n.

The foregoing methods of preparing an alkene functionalized (hetero)aromatic polymeric material may comprise reacting one or more (hetero)aromatic polymeric substrates with a compound comprising at least one alkyne moiety to form double substituted branched and/or crosslinked (hetero)aromatic material(s) and/or networks. The method may comprise mixing one or more, two or more (hetero)aromatic polymeric substrate with one or more, two or more than one, compounds comprising at least one alkyne moiety to form a mixture. This mixture may be combined in the presence of am Au catalyst or initiator. In addition, the mixture may be combined further in the presence of other cocatalysts, coinitiators, or coactivators derived from silver (Ag), copper (Cu), alkali salts, at least one acid, or combinations thereof. This may yield (hetero)aromatic polymeric material(s) with the additional incorporation of alkane pendant chains and/or crosslinks with the corresponding substituents imparted from the alkyne reactant(s) onto a portion, or the entirety of, the (hetero)aromatic moieties contained within the (hetero) aromatic polymeric substrate structure.

In the foregoing methods, the two or more alkyne moieties of the one or more compounds may be a terminal alkyne comprising an electron donating moiety to form a methyl branched alkane branched and/or crosslinked (hetero)aromatic material(s) and/or networks, or a terminal alkyne comprising an electron withdrawing moiety to form a branched alkane branched and/or crosslinked (hetero) aromatic material(s) and/or networks, or an internal alkyne moiety to form 1,1,2-trisubstituted alkane branched and/or crosslinked (hetero)aromatic material(s) and/or networks.

For example, the foregoing methods may employ a compound comprising at least one alkyne moiety to form an alkene functionalized (hetero)aromatic polymeric material and/or a hybrid functionalized branched (hetero)aromatic polymers and/or functionalized (hetero)aromatic polymeric networks or a methyl branched alkane branched and/or crosslinked (hetero)aromatic material and/or networks, or a branched alkane branched and/or crosslinked (hetero)aromatic material and/or networks, or a 1,1,2-trisubstituted alkane branched and/or crosslinked (hetero)aromatic material and/or network:

(5)

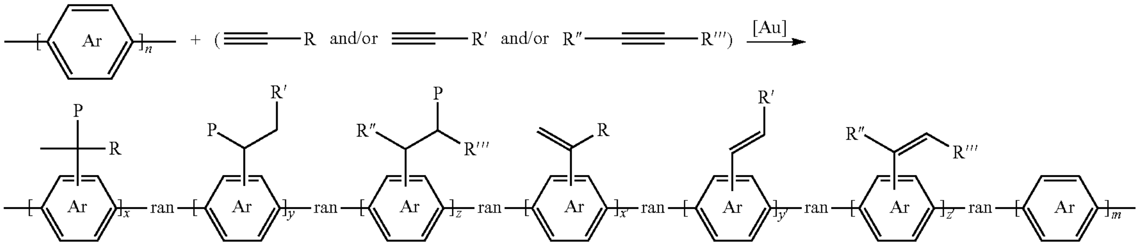

wherein "ran", R, R', R", and R"' are the same as defined previously. Furthermore, n is defined as an integer greater than or equal to 1; x, y, z, x', y', z' and m are defined as an integer greater than or equal to 0, x+y+z>0, and x+y+z+x'+y'+z'+m=n. P is defined as a as an oligomeric/polymeric chain which may form a branch stemming from the parent (hetero)aromatic polymer substrate backbone and/or a neighboring (hetero)aromatic polymer chain denoting a crosslinked network, or P may be defined as an oligomeric/polymeric chain which may form a branch stemming from the parent polymer substrate backbone and/or a neighboring polymer chain denoting a crosslinked network. P is limited to polymer chains comprising identical backbone connectivity to that of the polymers, i.e., chains based on

as defined above which are incorporated as pendant structures during the reaction.

For example, the foregoing methods may employ a compound comprising at least one alkyne moiety to form an alkene functionalized (hetero)aromatic polymeric material, and/or functionalized branched (hetero)aromatic polymers and/or functionalized (hetero)aromatic polymeric networks, or a methyl branched alkane branched and/or crosslinked (hetero)aromatic material and/or network. The compounds may be electron rich terminal alkyne as depicted in formula (6):

(6)

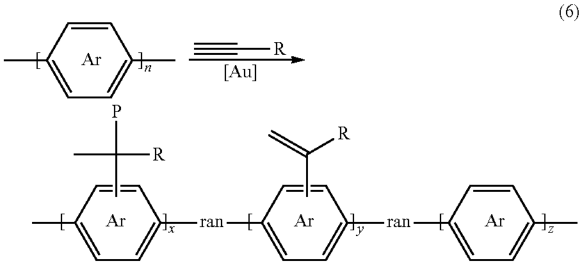

wherein "ran", R, and P are the same as defined previously. Furthermore, n and x are defined as an integer greater than or equal to 1; y and z are defined as an integer greater than or equal to 0, and x+y+z=n.

For example, the foregoing methods may employ a compound comprising at least one alkyne moiety to form an alkene functionalized (hetero)aromatic polymeric material and/or functionalized branched (hetero)aromatic polymers and/or functionalized (hetero)aromatic polymeric networks, or a branched alkane branched and/or crosslinked (hetero) aromatic material and/or networks. The compounds may be electron poor terminal alkyne as depicted in formula (7):

(7)

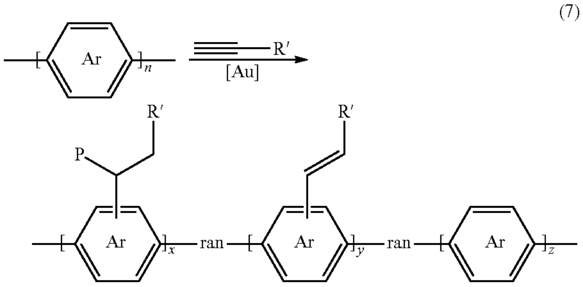

wherein "ran", R', and P are the same as previously defined. Furthermore, n and x are defined as an integer greater than or equal to 1; y and z are defined as an integer greater than or equal to 0, and x+y+z=n.

The foregoing methods may employ a compound comprising at least one alkyne moiety to form the alkene functionalized (hetero)aromatic polymeric material and/or functionalized branched (hetero)aromatic polymers and/or functionalized (hetero)aromatic polymeric networks, or a 1,1,2-trisubstituted alkane branched and/or crosslinked (hetero)aromatic material and/or networks. The compound may be an internal alkyne as depicted in reaction scheme (8):

(8)

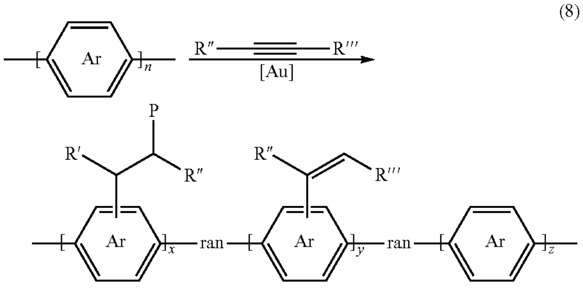

wherein "ran", R", R"', and P are the same as previously defined. Furthermore, n and x are defined as an integer greater than or equal to 1; y and z are defined as an integer greater than or equal to 0, and x+y+z=n. For example, the foregoing methods for preparing an alkene functionalized (hetero)aromatic polymeric material may include reacting one or more (hetero)aromatic polymeric substrates with a compound comprising two or more alkyne moieties to form an alkene functionalized (hetero)aromatic polymeric material networks. The method comprises mixing one or more, two or more (hetero)aromatic polymeric substrate with one or more, or two or more compounds comprising two or more alkyne moieties. This mixture may be combined in the presence of a gold (Au) catalyst or initiator. In addition, this mixture may be combined further in the presence of other cocatalysts, coinitiators, or coactivators derived from silver (Ag), copper (Cu), alkali salts, at least one acid, or combinations thereof. This may yield (hetero)aromatic polymeric networks with the additional incorporation of alkene crosslinks containing the corresponding substituents imparted from the alkyne reactant(s) onto a portion, or the entirety of, the (hetero)aromatic moieties contained within the (hetero) aromatic polymeric substrate structure.

In the foregoing methods, the two or more alkyne moieties of the one or more compounds may be two terminal alkyne moieties comprising an electron donating moiety to form a geminal alkene functionalized (hetero)aromatic networks, or two terminal alkyne moieties comprising an electron withdrawing moiety to form a vicinal alkene functionalized (hetero)aromatic networks, or two internal alkyne moieties to form 1,1,2-trisubstituted alkene crosslinked (hetero)aromatic networks.

For example, the foregoing methods for preparing an alkene functionalized (hetero)aromatic polymeric material may include a compound comprising two or more alkyne moieties to form an alkene functionalized (hetero)aromatic polymeric material and/or hybrid functionalized branched (hetero)aromatic polymers and/or functionalized (hetero) aromatic polymeric networks, or a geminal alkene functionalized (hetero)aromatic network, or a vicinal alkene functionalized (hetero)aromatic network, or a 1,1,2-trisubstituted alkene crosslinked (hetero)aromatic network:

(9)

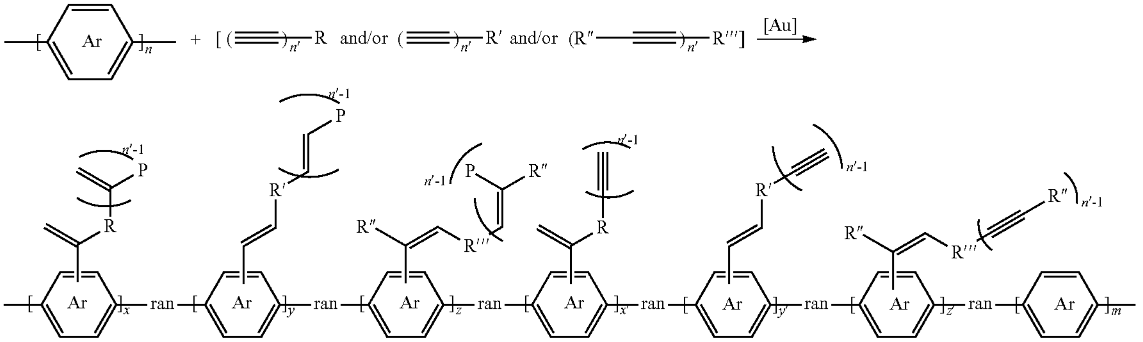

Wherein "ran", P, R, R', R", and R"' are the same as defined previously. Furthermore, n is defined as an integer greater than or equal to 1; x, y, z, x', y', z' and m are defined as an integer greater than or equal to 0, x+y+z>0, x+y+z+x'+y'+z'+m=n, and n'>1.

For example, the foregoing methods for preparing an alkene functionalized (hetero)aromatic polymeric material may include a compound comprising two or more alkyne moieties to form an alkene functionalized (hetero)aromatic polymeric material and/or a functionalized branched (hetero)aromatic polymer and/or a functionalized (hetero)aromatic polymeric network, or a geminal alkene functionalized (hetero)aromatic network. The compound may comprise two, or more, electron rich terminal alkyne as depicted in reaction scheme (10):

(10)

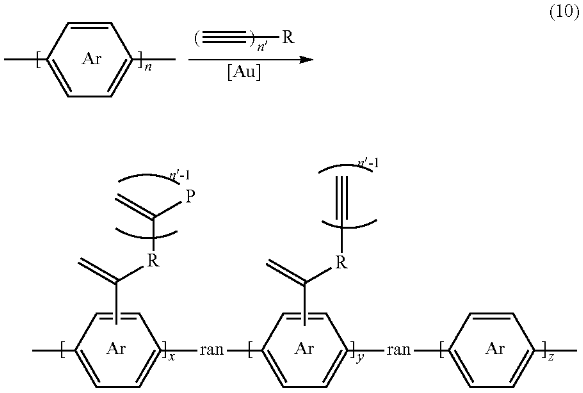

wherein "ran", P, and R are the same as defined previously. Furthermore, n and x are defined as an integer greater than or equal to 1; y and z are defined as an integer greater than or equal to 0, x+y+z=n, and n'>1.

For example, the foregoing methods for preparing an alkene functionalized (hetero)aromatic polymeric material may include a compound comprising two or more alkyne moieties to form an alkene functionalized (hetero)aromatic polymeric material and/or functionalized branched (hetero) aromatic polymers and/or functionalized (hetero)aromatic polymeric networks, or a vicinal alkene functionalized (hetero)aromatic network. The compound may comprise two, or more, electron poor terminal alkyne as depicted in reaction scheme (11):

(11)

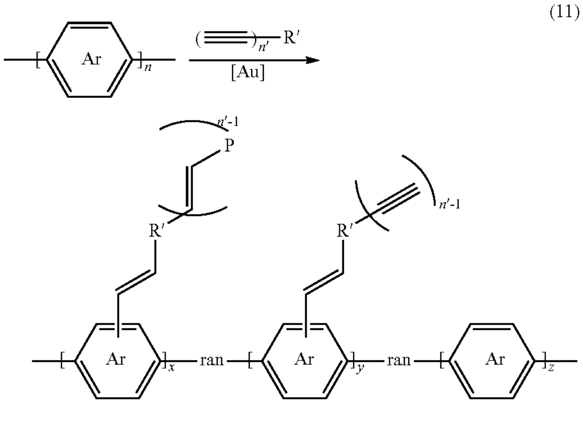

wherein “ran”, P, and R' are the same as previously defined. Furthermore, n and x are defined as an integer greater than or equal to 1; y and z are defined as an integer greater than or equal to 0, x+y+z=n, and n'>1.

For example, the foregoing methods for preparing an alkene functionalized (hetero)aromatic polymeric material may include a compound comprising two or more alkyne moieties to form an alkene functionalized (hetero)aromatic polymeric material and/or functionalized branched (hetero) aromatic polymers and/or functionalized (hetero)aromatic polymeric networks, or a 1,1,2-trisubstituted alkene cross-linked (hetero)aromatic network. The compound may comprise two or more internal alkyne moieties as depicted in reaction scheme (12):

(12)

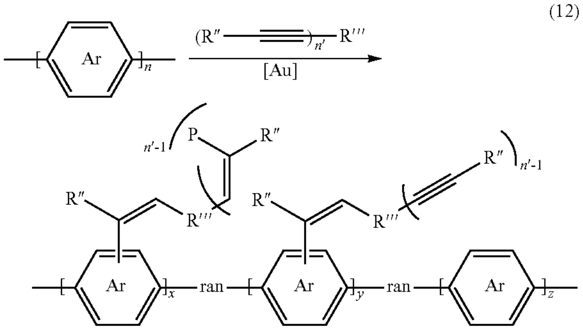

wherein “ran”, P, R'', and R''' are the same as defined previously. Furthermore, n and x are defined as an integer greater than or equal to 1; y and z are defined as an integer greater than or equal to 0, x+y+z=n, and n'>1.

For example, the foregoing methods may employ a compound comprising an alkene moiety to form an alkane functionalized (hetero)aromatic polymeric material and/or hybrid alkane functionalized polymers, or a methyl branched alkane functionalized (hetero)aromatic material, or a 1,1,2-trisubstituted alkane functionalized (hetero)aromatic material:

(13)

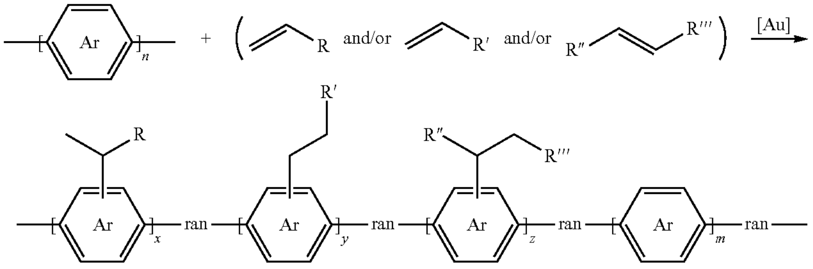

wherein “ran”, R, R', R'', and R''' are the same as previously defined. Furthermore, n is defined as an integer greater than or equal to 1; x, y, z, and m are defined as an integer greater than or equal to 0, x+y+z≥1, and x+y+z+m=n.

For example, the foregoing methods may employ a compound comprising an alkene moiety to form a methyl branched alkane functionalized (hetero)aromatic polymeric material and/or methyl branched alkane functionalized (hetero)aromatic polymers from compounds comprising electron rich terminal alkene moieties as depicted in reaction scheme (14):

(14)

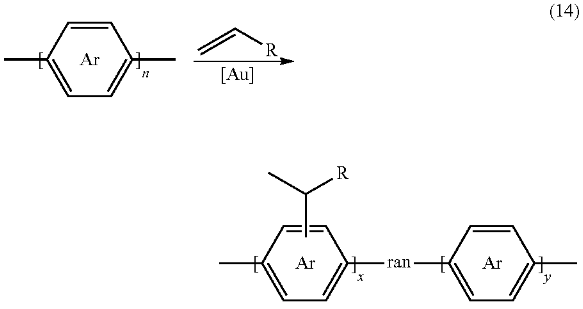

wherein “ran” and R are the same as previously defined. Furthermore, n and x are defined as an integer greater than or equal to 1; y is defined as an integer greater than or equal to 0, and x+y=n.

For example, the foregoing methods may employ a compound comprising an alkene moiety to form an alkane functionalized (hetero)aromatic polymeric material and/or linear alkane functionalized (hetero)aromatic polymers from compounds comprising electron poor terminal alkene moieties as depicted in formula (15):

(15)

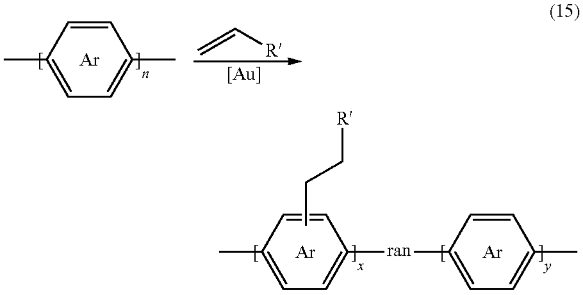

wherein “ran” and R' are the same as previously defined. Furthermore, n and x are defined as an integer greater than or equal to 1; y is defined as an integer greater than or equal to 0, and x+y=n.

For example, the foregoing methods may employ a compound comprising an alkene moiety to form an alkane functionalized (hetero)aromatic polymeric material and/or branched alkane functionalized (hetero)aromatic polymers from compounds comprising internal alkene moieties to form a 1,1,2-trisubstituted alkane functionalized (hetero) aromatic material as depicted in reaction scheme (16):

(16)

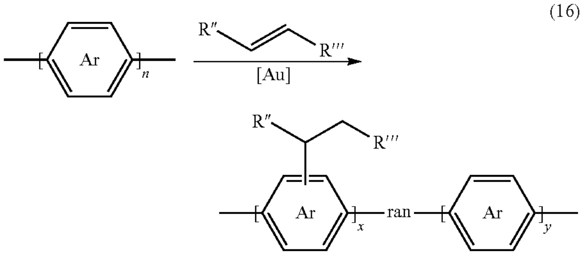

For example, the foregoing method may employ a compound comprising two or more alkene moieties, which may be described by the following reaction scheme to form alkane functionalized (hetero)aromatic polymeric materials and/or hybrid functionalized branched (hetero)aromatic polymers and/or functionalized (hetero)aromatic polymer networks, or a methyl branched alkane functionalized (hetero)aromatic network, or a branched alkane functionalized (hetero)aromatic network, or a 1,1,2-trisubstituted alkane crosslinked (hetero)aromatic network:

(17)

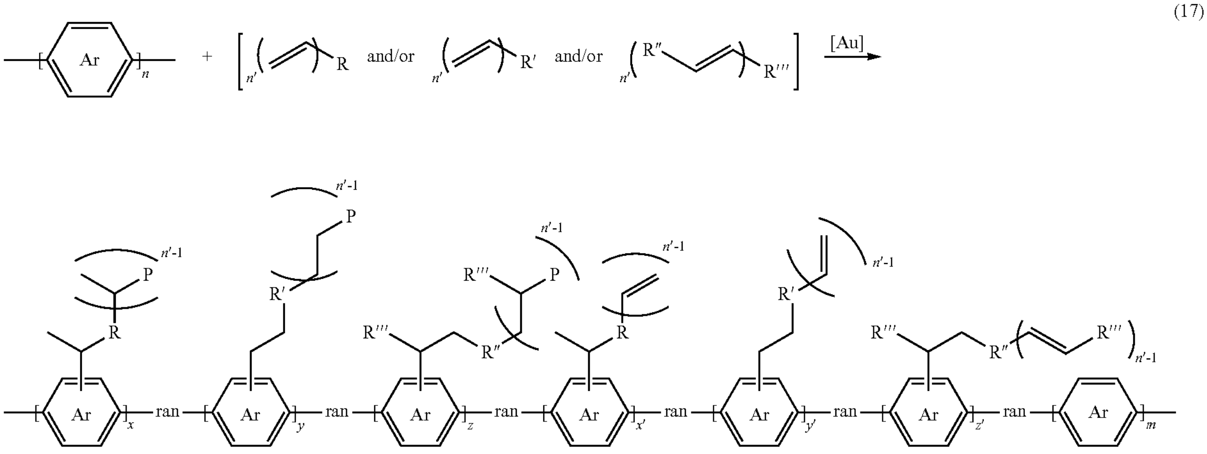

wherein "ran", R'', and R''' are the same as previously defined. Furthermore, n and x are defined as an integer greater than or equal to 1; y is defined as an integer greater than or equal to 0, and x+y=n.

For example, the foregoing methods for preparing an alkane functionalized (hetero)aromatic polymeric material may include reacting (hetero)aromatic polymeric substrates with a compound comprising two or more alkene moieties to form an alkane functionalized (hetero)aromatic polymeric materials/networks. The method comprises mixing one or more, or two or more (hetero)aromatic polymeric substrate with one or more compounds comprising two or more two alkene moieties. This mixture may be combined in the presence of a gold (Au) catalyst or initiator. In addition, the mixture may be further combined in the presence of other cocatalysts, coinitiators, or coactivators derived from silver (Ag), copper (Cu), alkali salts, at least one acid, or combinations thereof. This may yield (hetero)aromatic polymeric materials/networks with the additional incorporation of partially, or entirely, aliphatic crosslinks containing the corresponding substituents imparted from the alkene reactant(s) onto a portion, or the entirety of, the (hetero)aromatic moieties contained within the (hetero)aromatic polymeric substrate structure.

In the foregoing methods, the two or more alkene moieties of the one or more compounds may be two terminal alkene moieties comprising an electron donating moiety to form a methyl branched alkane functionalized (hetero)aromatic networks, or may be two terminal alkene moieties comprising an electron withdrawing moiety to form branched alkane functionalized (hetero)aromatic networks, or may be two internal alkene moieties to form 1,1,2-trisubstituted alkane crosslinked (hetero)aromatic networks.

wherein "ran", P, R, R', R'', and R''' are the same as previously defined. Furthermore, n is defined as an integer greater than or equal to 1; x, y, z, x', y', z' and m are defined as an integer greater than or equal to 0, x+y+z>0, x+y+z+x'+y'+z'+m=n, and n'>1.

For example, the foregoing method may employ a compound comprising two or more alkene moieties, which may be described by the following reaction scheme to form alkane functionalized (hetero)aromatic polymeric materials and/or functionalized branched (hetero)aromatic polymers and/or functionalized (hetero)aromatic polymer networks from compounds comprising two or more electron rich terminal alkene moieties to form a methyl branched alkane functionalized (hetero)aromatic network:

(18)

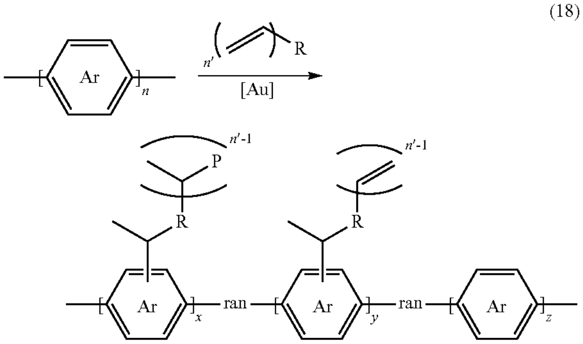

wherein "ran", P, and R are the same as previously defined. Furthermore, n and x are defined as an integer greater than or equal to 1; y and z are defined as an integer greater than or equal to 0, x+y+z=n, and n'>1.

For example, the foregoing method may employ a compound comprising two or more alkene moieties, which may be described by the following reaction scheme to form alkane functionalized (hetero)aromatic polymeric materials and/or functionalized branched (hetero)aromatic polymers and/or functionalized (hetero)aromatic polymer networks from one or more compounds comprising two or more electron poor terminal alkene moieties to form a branched alkane functionalized (hetero)aromatic network:

(19)

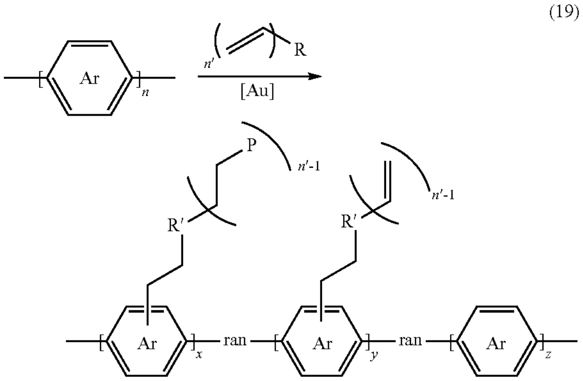

wherein "ran", P, and R' are the same as previously defined. Furthermore, n and x are defined as an integer greater than or equal to 1; y and z are defined as an integer greater than or equal to 0, x+y+z=n, and n'>1.

For example, the foregoing method may employ a compound comprising two or more alkene moieties, which may be described by the following reaction scheme to form alkane functionalized (hetero)aromatic polymeric materials and/or functionalized branched (hetero)aromatic polymers and/or functionalized (hetero)aromatic polymer networks from one or more compounds comprising two or more internal alkene moieties to form a 1,1,2-trisubstituted alkane crosslinked (hetero)aromatic network:

(20)

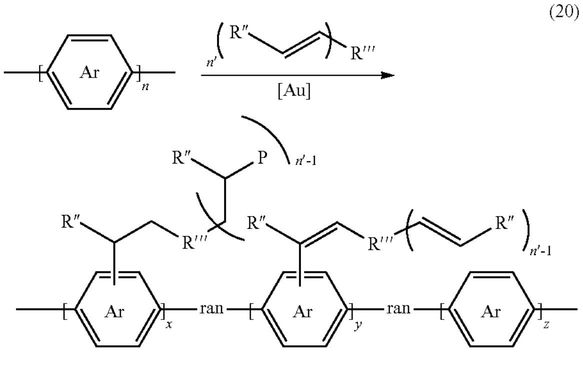

wherein "ran", R", and R'" are the same as previously defined. Furthermore, n and x are defined as an integer greater than or equal to 1; y and z are defined as an integer greater than or equal to 0, x+y+z=n, and n'>1.

In a second aspect, the present disclosure relates to an alkene functionalized (hetero)aromatic polymeric material or an alkane functionalized (hetero)aromatic polymeric material or crosslinked functionalized (hetero)aromatic polymeric materials prepared by any one of the foregoing methods, more specifically, the alkene functionalized (hetero)aromatic polymeric material or alkane functionalized (hetero)aromatic polymeric material may be prepared by any one of reaction schemes 1-20.

In a third aspect, the present disclosure relates to a complex hybrid (hetero)aromatic polymeric material prepared by a combination of two or more of the foregoing methods of preparing an alkene or alkane functionalized (hetero)aromatic polymeric material to provide a complex hybrid (hetero)aromatic polymeric material. More specifically, the complex hybrid (hetero)aromatic polymeric material may be prepared by a combination of any two or more of reaction schemes 1-20. The complex hybrid (hetero) aromatic polymeric material may comprise alkene functionalized pendants and/or alkene functionalized polymeric branches and/or alkene functionalized crosslinks and/or alkane functionalized pendants and/or alkane functionalized polymeric branches and/or alkane functionalized crosslinks stemming from the (hetero)aromatic polymer reactant structure.

In each of the foregoing embodiments, the size of the polymers may vary, depending on the properties desired. In some embodiments, p, p', n, n', m, m', x, x', y, y', z, z', a, a', b, b', c, c', c", and c'" may each individually be integer of about 10 or greater, or about 20 or greater, or about 50 or greater, or about 100 or greater. In some embodiments, p, p', n, n', m, m', x, x', y, y', z, z', a, a', b, b', c, c', c", and c'" are integers between about 5 and about 1,000,000, between about 10 and about 1,000,000, between about 10 and about 5,000, between about 10 and about 2,500, between about 10 and about 1,000, between about 10 and about 500, between about 50 and about 1,000,000, between about 50 and about 5,000, between about 50 and about 2,500, between about 50 and about 1,000, between about 50 and about 500, between about 100 and about 1,000,000, between about 100 and about 5,000, between about 100 and about 2,500, between about 100 and about 1,000, or between about 100 and about 500. Other intervals, combining any of the above parameters to form a new interval, can also be used (e.g., n or m between about 500 and 2,500). In additional embodiments, the system provides polymer(s) ten (10) units long and below, i.e., oligomer(s), wherein the oligomer(s) is(are) of size n, wherein n is an integer between 1 and 10.

Some embodiments described herein are recited as "comprising" or "comprises" with respect to their various elements. In alternative embodiments, those elements can be recited with the transitional phrase "consisting essentially of" or "consists essentially of" as applied to those elements. In further alternative embodiments, those elements can be recited with the transitional phrase "consisting of" or "consists of" as applied to those elements. Thus, for example, if a composition or method is disclosed herein as comprising A and B, the alternative embodiment for that composition or method of "consisting essentially of A and B" and the alternative embodiment for that composition or method of "consisting of A and B" are also considered to have been disclosed herein. Likewise, embodiments recited as "consisting essentially of" or "consisting of" with respect to their various elements can also be recited as "comprising" as applied to those elements.

EXAMPLES

General Comments. All manipulations of air/and or moisture-sensitive compounds were performed under an inert atmosphere using standard glovebox and Schlenk techniques. Reagents, unless otherwise specified, were purchased from Sigma-Aldrich and used without further purification. Narrow standard polystyrene (PS) was purchased from Alfa Aesar and used as received. Polysulfone (PSU) pellets were purchased from Sigma-Aldrich and used as received. Polyethylene terephthalate (PET) was sourced from a 20 fluid oz. Dr Pepper® bottle. The PET was thoroughly rinsed with deionized $H_2O$, dried in vacuo, and cut into 2×1 cm pieces prior to use. Pristine PET was synthesized according to literature procedures.[4] 1,2-dichloroethane (DCE), chloroform ($CHCl_3$), dichloromethane (DCM), and hexafluoro-2-propanol (HFIP) were degassed and dried over 4 Å molecular sieves prior to use. Chloroform-d ($CDCl_3$) and trifluoroacetic acid-d (TFA-d) were purchased from Cambridge Isotope Laboratories and used as received. [Bis(trifluoromethanesulfonyl)imidate](2-dicyclohexyl(2', 6'-dimethoxybiphenyl)phosphine)gold(I) (A), (acetonitrile)[(2-biphenyl)di-tert-butylphosphine]gold(I) hexafluoroantimonate (B), chloro[(2-biphenyl)di-tert-butylphosphine]gold(I) (C), chloro(tri-tert-butylphosphine) gold(I) (E), chloro[tris(2,3,4,5,6-penta-fluorophenyl) phosphine]gold(I) (F), chloro(triphenylphosphine)gold(I) (H), (acetonitrile)[1,3-bis(2,6-diisopropylphenyl)imidazol-2-ylidene]gold(I) tetrafluoroborate (I), chloro[1,3-bis(2,6-diisopropyl-phenyl)imidazol-2-ylidene]gold(I) (J), silver trifluoromethanesulfonate (AgOTf) and silver hexafluoroantimonate(V) ($AgSbF_6$) were purchased from Strem Chemicals and used as received. Silver bis(trifluoromethanesulfonyl) ($AgNTf_2$), chloro[tris(2,4-di-tert-butylphenyl) phosphite]gold(I) (D) and chloro[tri(ortho-tolyl)phosphine] gold(I) (G) were purchased from Sigma-Aldrich and used as received, catalysts A-J are depicted in FIG. 1. $^1H$, $^{13}C$, $^{19}F$, $^1H$-$^1H$ COSY, and $^1H$-$^{13}C$ HSQC NMR spectra were collected on a Bruker Avance III 600 MHz spectrometer and chemical shifts, δ (ppm), were referenced to the residual solvent impurity peak of the given solvent. Data reported as: s=singlet, d=doublet, t=triplet, m=multiplet, br=broad; coupling constant(s), J, are given in Hz. Fourier-transform infrared (FT-IR) spectroscopy were recorded under vacuum (~0.8 mbar) in the solid state on NaCl plates using a Bruker VERTEX 80v spectrometer and a liquid nitrogen cooled mercury-cadmium-telluride detector. The number average molecular weight ($M_n$), weight average molecular weight ($M_w$), and dispersity (Đ) were determined by gel permeation chromatography (GPC) relative to polystyrene standards at 45° C. in tetrahydrofuran (THF) using a Waters ACQUITY Advanced Polymer Chromatography system configured with ACQUITY APC™ XT 450, ACQUITY APC™ XT 125, and ACQUITY APC™ XT 45 columns in series. Polymer samples were pre-dissolved at a concentration of 1.00-2.00 mg $mL^{-1}$ in THF with stirring at 45° C. for 1 h. Differential scanning calorimetry (DSC) was conducted on a TA Instruments Q200 differential scanning calorimeter following a heat-cool-heat cycle from 0-230° C. and 0-300° C. at a ramp rate of 5° C. $min^{-1}$ for polystyrene and polysulfone respectively; the $T_g$ was taken from the final heat cycle to mitigate thermal history effects. Thermomechanical properties were investigated by conducting dynamic mechanical analysis (DMA) on a TA Instruments ARES-G2 rheometer. Samples were loaded onto 8 mm stainless steel parallel plates at 180° C. and 320° C. for polystyrene and polysulfone respectively. Samples were cooled at a rate of 3° C. $min^{-1}$ while being subjected to a 2.0% strain amplitude at a frequency of 20 rad $s^{-1}$. The strain amplitude was decreased to 0.2% and axial force compensation was activated at 130° C. and 230° C. for PS and PSU, respectively, to accommodate volumetric changes and rapid viscosity increases as the polymers transitioned from the rubbery to the glassy state through the glass transition temperature ($T_g$). Thermogravimetric analysis (TGA) was conducted using a TA Instruments Q200 TGA. Samples of 7-10 mg were heated from 30-900° C. at 20° C. $min^{-1}$ in an $N_2$ atmosphere.

Characterization of Polymer Starting Materials

Poly(1-phenylethane-1,2-diyl) (PS)

Appearance: white solid. GPC analysis (45° C., THF): $M_n$=13,135 g $mol^{-1}$ and Đ=1.03. $^1H$ NMR (600 MHz, chloroform-d, 303 K): δ 7.31-6.88 (br, 31, $C_4H_5$), 6.88-6.31 (br, 2H, $C_6H_5$), 2.38-1.70 (br, 1H, $CHCH_2$), 1.68-0.74 (br, 2H, $CHCH_2$). $^{13}C$ NMR (151 MHz, chloroform-d, 303 K): δ 145.35, 128.09, 127.79, 125.78, 125.63, 46.16, 44.06, 40.77, 40.56. IR (NaCl, thin film) $\nu_{max}$ ($cm^{-1}$): 3082, 3060, 3026, 2925, 2850, 1944, 1871, 1805, 1747, 1668, 1661, 1492, 1452, 1373, 1329, 1314, 1218, 1182, 1155, 1068, 1028, 906, 756, 700, 666, 622, 540.

Poly[oxy-1,4-phenylenesulfonyl-1,4-phenyleneoxy (dimethylmethylene)-1,4-phenylene] (PSU)

Appearance: white pellet. GPC analysis (45° C., THF): $M_n$=23,731 g $mol^{-1}$ and Đ=2.14. $^1H$ NMR (600 MHz, chloroform-d, 303 K): δ 7.84 (d, J=8.9 Hz, 4H, $C_6H_4$), 7.24 (d, J=8.7 Hz, 4H, $C_6H_4$), 7.00 (d, J=8.0 Hz, 4H, $C_6H_4$), 6.94 (d, J=8.6 Hz, 4H, $C_6H_4$), 1.69 (s, 6H, $C(CH_3)_2$). $^{13}C$ NMR (151 MHz, chloroform-d, 303 K): δ 162.08, 153.00, 147.28, 135.59, 129.82, 128.56, 119.92, 117.82, 42.55, 31.09. IR (NaCl, thin film) $\nu_{max}$ ($cm^{-1}$): 3095, 3066, 3035, 2968, 2873, 1905, 1585, 1504, 1489, 1410, 1387, 1363, 1325, 1294, 1244, 1168, 1151, 1107, 1080, 1014, 874, 854, 835, 754, 715, 692, 667, 634.

Poly(oxyethane-1,2-diyloxyterephthaloyl) (PET)

Appearance: clear solid (soda bottle) or white solid (pristine PET). $^1H$ NMR (600 MHz, TFA-d, 303 K): δ 8.30 (s, 4H, $C_6H_4$), 4.99 (s, 4H, $CH_2CH_2$). $^{13}C$ NMR (151 MHz, TFA-d, 303 K): δ 171.45, 136.23, 132.71, 71.87, 67.49, 66.82. IR (NaCl, thin film) $\nu_{max}$ ($cm^{-1}$): 3436, 2958, 2884, 1951, 1721, 1578, 1504, 1448, 1406, 1383, 1267, 1179, 1105, 1027, 971, 883, 838, 729, 686.

General Procedure for Gold Catalyzed Post-Polymerization Modification (PPM) of Aromatic Polymers A gold catalyst solution was prepared in a nitrogen ($N_2$) filled glovebox by loading a 1-dram vial with gold catalyst (0.0100 mmol, 1 equiv), $AgSbF_6$ (0.0300 mmol, 3.00 equiv), and solvent (120 μL). The gold catalyst solution was stirred at room temperature for 15 min and filtered through a small plug of glass-wool to remove precipitated silver salts. A 1-dram vial was then loaded with aromatic polymer (0.480 mmol, 1.0 equiv) and methyl propiolate (0.960 or 4.80 mmol, 2.00 or 10.0 equiv respectively). The vial was brought inside the $N_2$-filled glovebox, followed by addition of the gold catalyst solution (120 μL, 2 mol %) and solvent (447 μL). The mixture was stirred at room temperature (25° C.) for a specified amount of time. The product was precipitated into methanol, the solid precipitate was collected via centrifugation, and the product dried in vacuo.

Example 1. This example involved the modification of polystyrene (PS) with methyl propiolate to prepare ester functionalized polystyrene (P1), in the presence of chloro (triphenylphosphine)gold(I) as the catalyst, and $AgsbF_6$, as a cocatalyst.

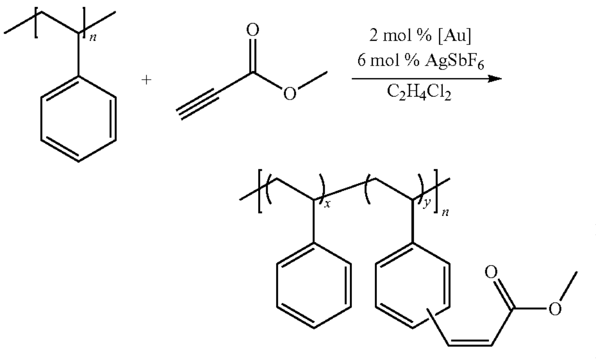

P1

Poly{[1-phenylethane-1,2-diyl]-ran-[(methylacrylate)phenylethane-1,2-diyl]} (P1)

Catalyst: H. Solvent: DCE. Appearance: off white solid. Degree of functionalization: 17.4%. GPC analysis (45° C., THF): $M_n$=14,568 g $mol^{-1}$ and Đ=1.03. $^1H$ NMR (600 MHz, chloroform-d, 303 K): δ 7.91-6.89 (br, 3H, $C_6H_5$), 6.89-6.21 (br, 2H, CHs), 6.02-5.76 (br, 1H, para-CH═CHCOOCH$_3$), 5.63-5.26 (br, 1H, ortho-CH═CHCOOCH$_3$), 5.26-5.01 (br, 1H, meta-CH═CHCOOCH$_3$), 3.98-3.28, (br, 3H, $COOCH_3$), 3.24-1.66 (br, 1H, $CHCH_2$), 1.66-0.44 (br, 2H, $CHCH_2$). $^{13}C$ NMR (151 MHz, chloroform-d, 303 K): δ 166.34, 145.35, 143.52, 132.27, 130.22, 128.09, 12779, 125.78, 125.78, 125.63, 118.06, 51.41, 51.00, 46.16, 44.98, 44.06, 42.74, 41.87, 40.77, 40.56. IR (NaCl, thin film) $v_{max}$ ($cm^{-1}$): 3082, 3060, 2925, 2852, 2058, 1944, 1871, 1803, 1724, 1630, 1603, 1493, 1452, 1313, 1271, 1240, 1196, 1169, 1068, 1028, 908, 848, 827, 756, 700, 523.

Example 2. This example involved the modification of polysulfone (PSU) with methyl propiolate to prepare ester functionalized polystyrene (P2), in the presence of chloro (triphenylphosphine)gold(I) as the catalyst, and $AgsbF_6$, as a cocatalyst.

Poly([oxy-1,4-phenylenesulfonyl-1,4-phenyleneoxy (dimethylmethylene)-1,4-phenylene]-ran-{oxy-1,4-phenylene-sulfonyl-[(methylacrylate)phenylene-1,4-diyl]oxy-1,4-phenylene-(dimethylmethylene)-[(methylacrylate)phenylene-1,4-diyl]}) (P2)

Catalyst: H. Solvent: DCE. Appearance: off white solid. Degree of functionalization: 21.6%. GPC analysis (45° C., THF): $M_n$=27,282 g $mol^{-1}$ and Đ=2.32. $^1H$ NMR (600 MHz, chloroform-d, 303 K): δ 7.85 (d, J=8.8 Hz, 4H, $C_6H_4$), 7.24 (d, J=8.7 Hz, 4H, $C_6H_4$), 7.00 (d, J=8.9 Hz, 4H, $CH_4$), 6.94 (d, J=8.6 Hz, 4H, $C_6H_4$), 6.41 (d, J=16.2 Hz, 1H, CH═CHCOOCH$_3$), 5.90 (d, J=12.4 Hz, 1H, CH═CHCOOCH$_3$), 4.02-3.37 (br, 3H, $COOCH_3$), 1.69 (s, 6H, $C(CH_3)_2$). $^{13}C$ NMR (151 MHz, chloroform-d, 303 K): δ 162.08, 153.00, 150.30, 147.28, 137.67, 135.59, 129.82, 128.56, 121.84, 119.92, 117.82, 117.41, 51.52, 42.55, 31.09. IR (NaCl, thin film) $v_{max}$ ($cm^{-1}$): 3095, 3068, 3033, 2970, 2874, 1903, 1274, 1587, 1504, 1488, 1411, 1364, 1324, 1295, 1246, 1170, 1153, 1108, 1081, 1014, 874, 855, 836, 755, 716, 691, 667, 635, 570.

Example 3. This example involved the modification of poly(ethylene terephthalate) (PET) with methyl propiolate to prepare ester functionalized poly(ethylene terephthalate) (P2), in the presence of chloro[(2-biphenyl)di-tert-butylphosphine]gold(1) as the catalyst, and $AgsbF_6$, as a cocatalyst.

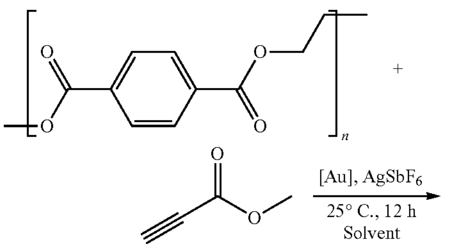

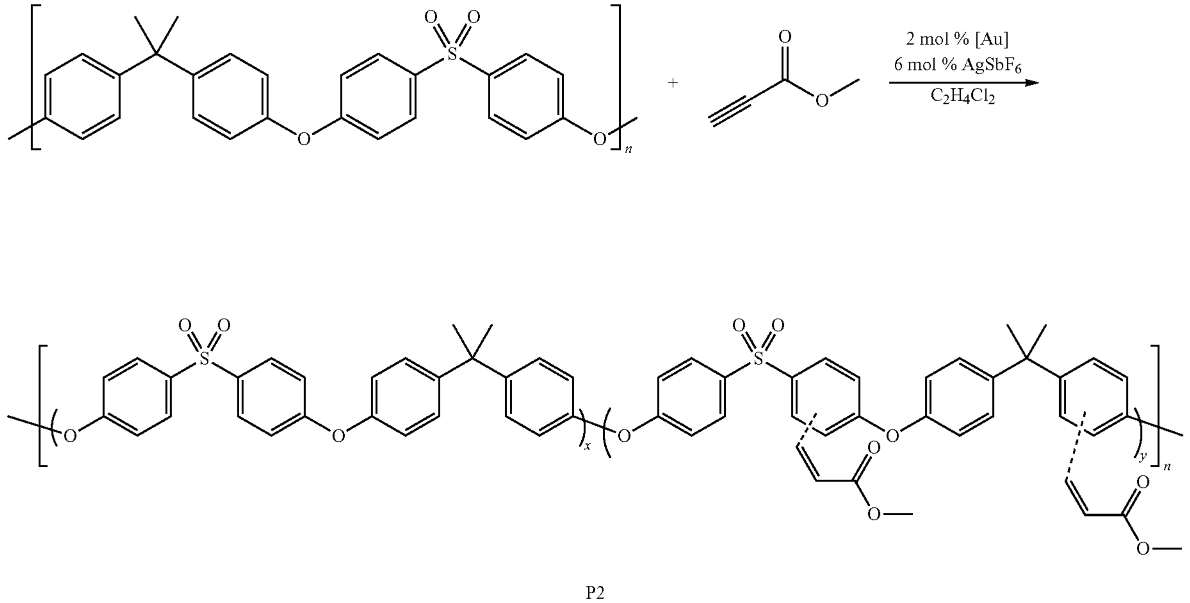

P2

-continued

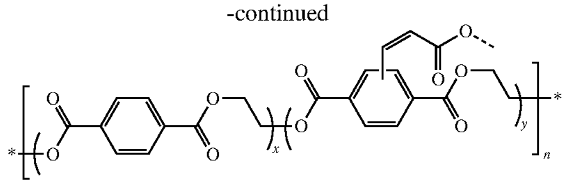

P3

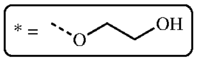

Poly{(oxyethane-1,2-diyloxyterephthaloyl)-ran-[oxyethane-1,2-diyloxy(methylacrylate)terephthaloyl]} (P3)

Catalyst: C. Solvent: HFIP/DCE (1/5). Appearance: off white solid. Degree of functionalization: 3.1%. $^1$H NMR (600 MHz, TFA-d, 303 K): δ 8.30 (s, 4H, $C_6H_4$), 6.68 (d, J=10.1 Hz, 1H), 4.99 (s, 4H, $CH_2CH_2$), 4.12-3.72 (br, 3H, $OCH_3$). $^{13}$C NMR (151 MHz, chloroform-d, 303 K): δ 171.19, 171.13, 161.06, 146.64, 145.98, 135.96, 133.67, 132.45, 66.55, 55.72, 55.60, 55.34, 55.11, 54.85. IR (NaCl, thin film) $\nu_{max}$ (cm$^{-1}$): 3436, 2958, 2884, 1951, 1721, 1578, 1504, 1448, 1406, 1383, 1267, 1179, 1105, 1027, 971, 883, 838, 729, 686.

Synthetic Details and Measurement Methods

Figure 13:
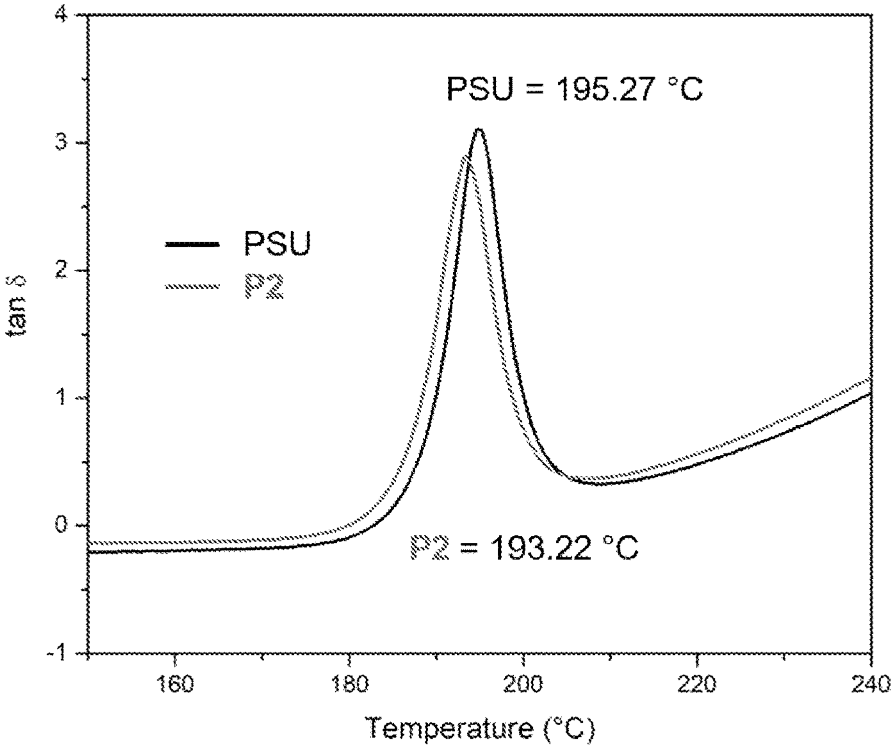
FIG. 13 shows a plot of tan S versus temperature for compound P2 (9.72% functionality) and PSU.
Figure 14:
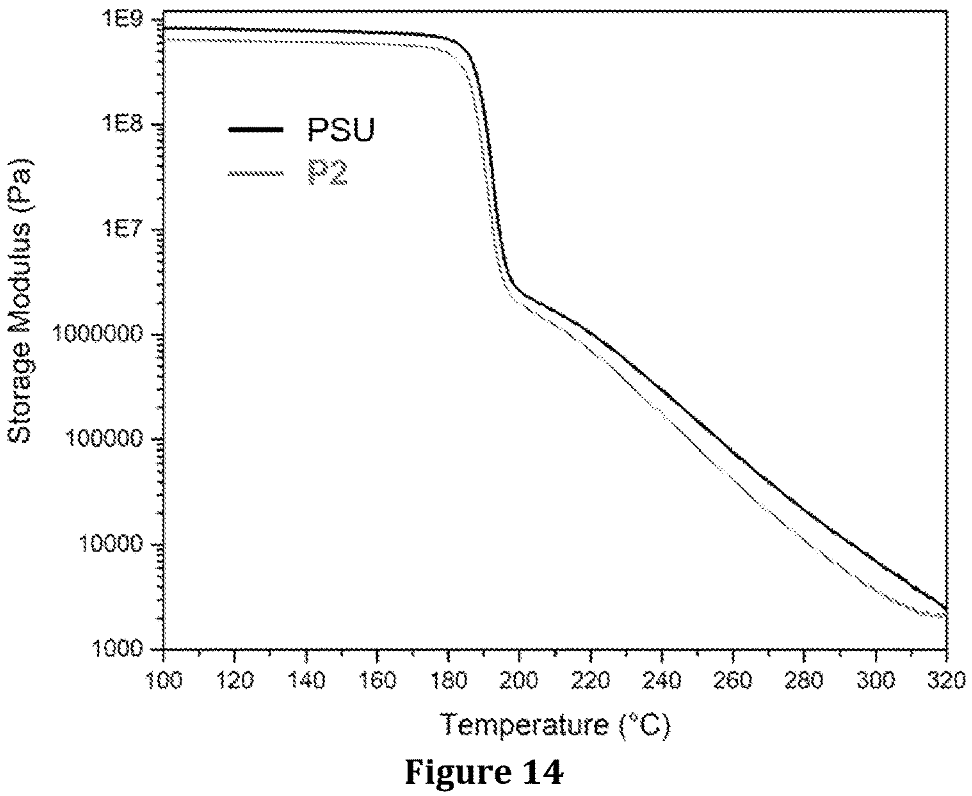
FIG. 14 shows a plot of storage modulus versus temperature for compound P2 (9.72% functionality) and the PSU.
Figure 15:
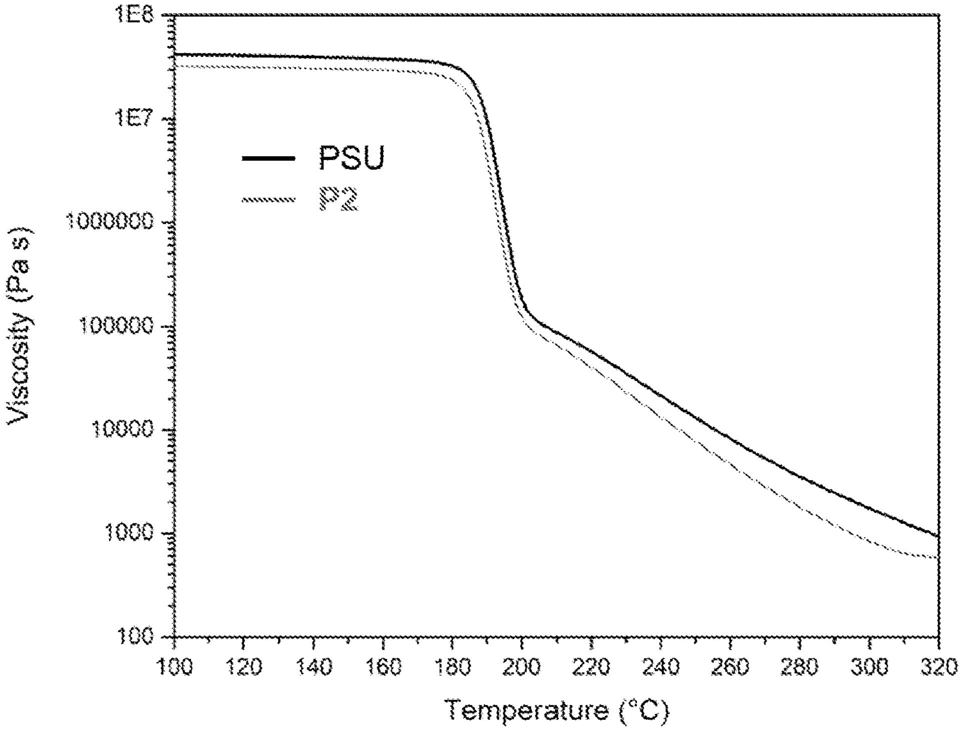
FIG. 15 shows a plot of complex viscosity versus temperature for compound P2 (9.72% functionality) and the PSU.
Figure 16:
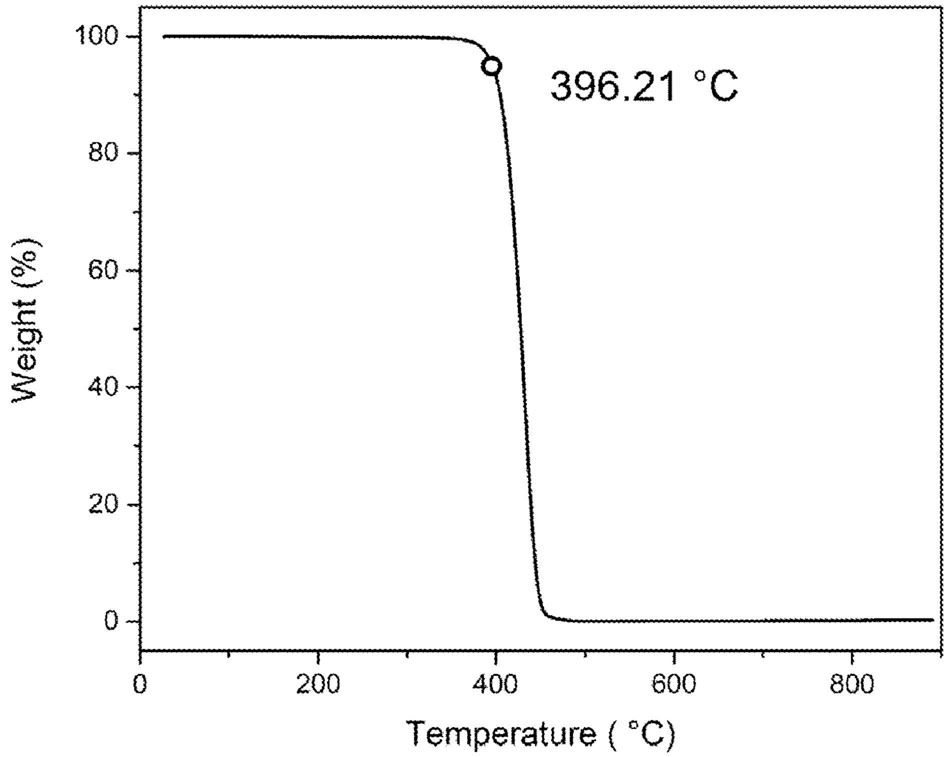
FIG. 16 shows a TGA thermogram of the PS with 5% degradation at 396.21° C.
Figure 17:
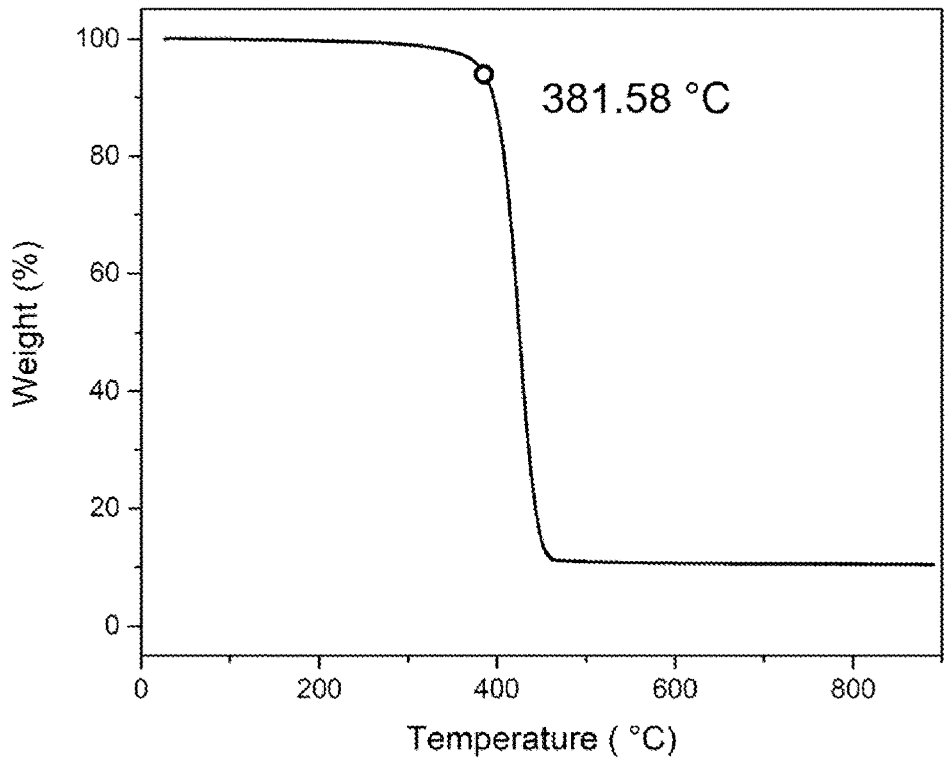
FIG. 17 shows a TGA thermogram of compound P1 (14.8% functionality) with 5% degradation at 381.58° C.
Figure 18:
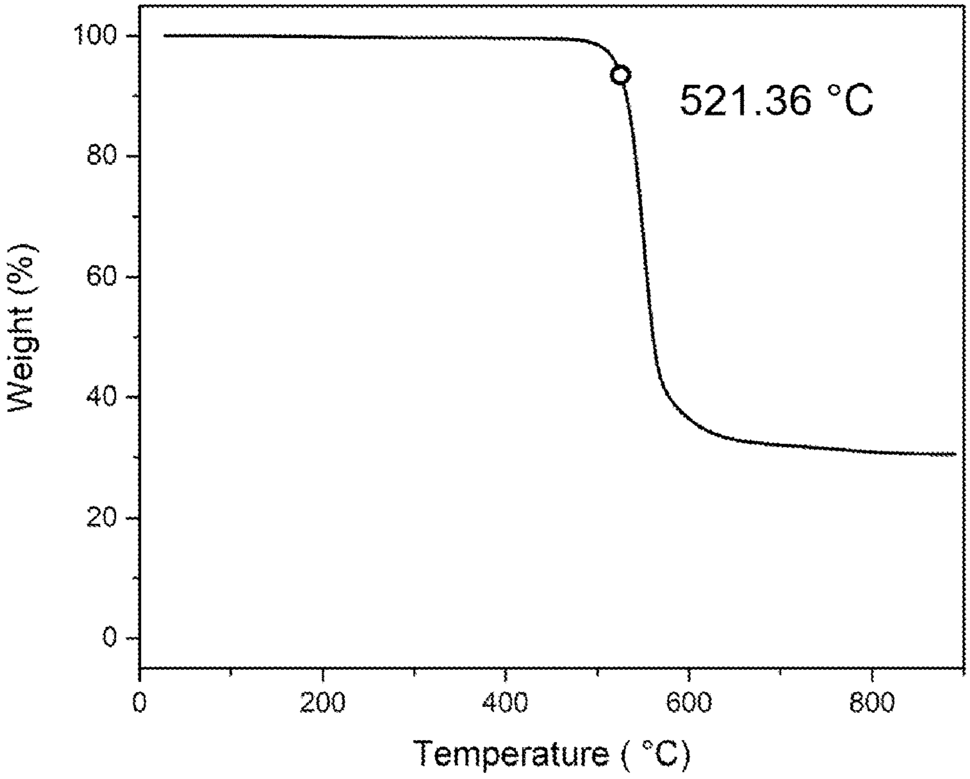
FIG. 18 shows a TGA thermogram of the PSU with 5% degradation at 521.36° C.
Figure 19:
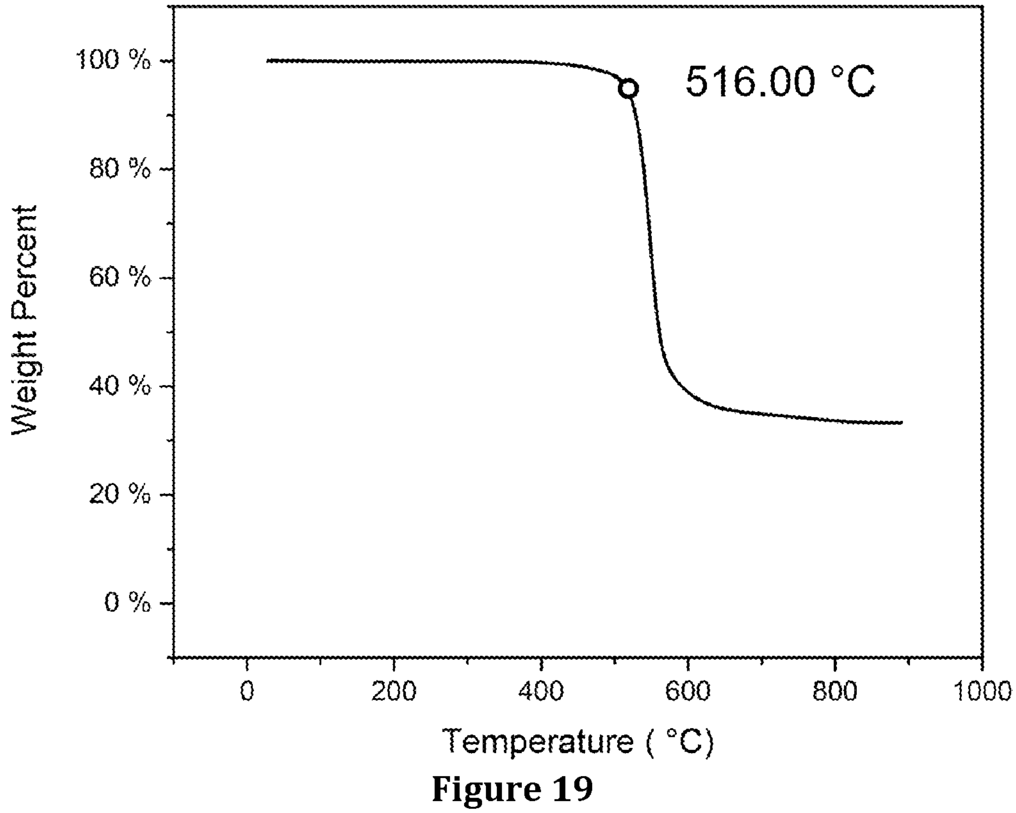
FIG. 19 shows a TGA thermogram of compound P2 (9.72% functionality) with 5% degradation at 516.00° C.
Figure 20:
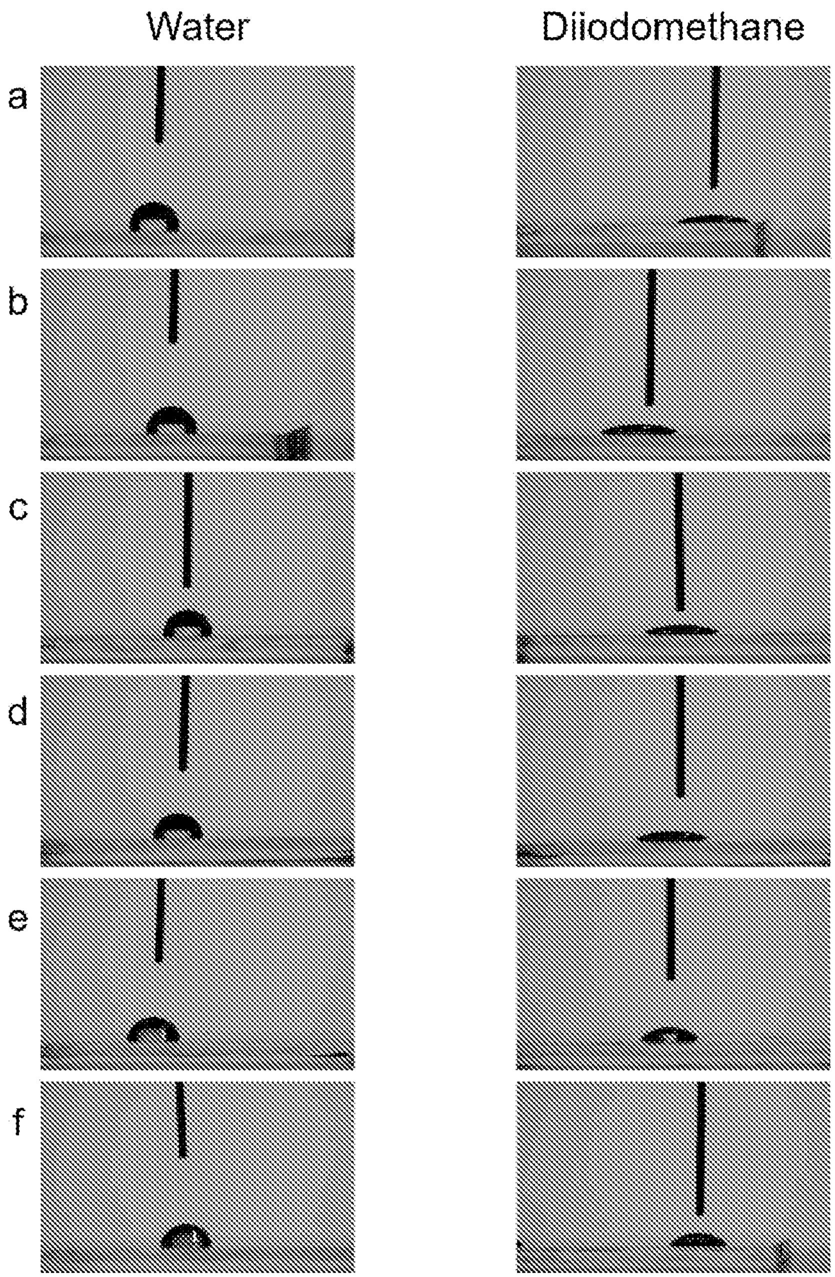
FIG. 20 shows selected images of water (left) and diiodomethane (right) droplets on (a) the PS, (b) compound P1 (14.8% functionality), (c) the PSU, (d) compound P2 (9.72% functionality), (e) polyethylene terephthalate (PET), and (f) compound P3 (2.00% functionality).
Figure 21:
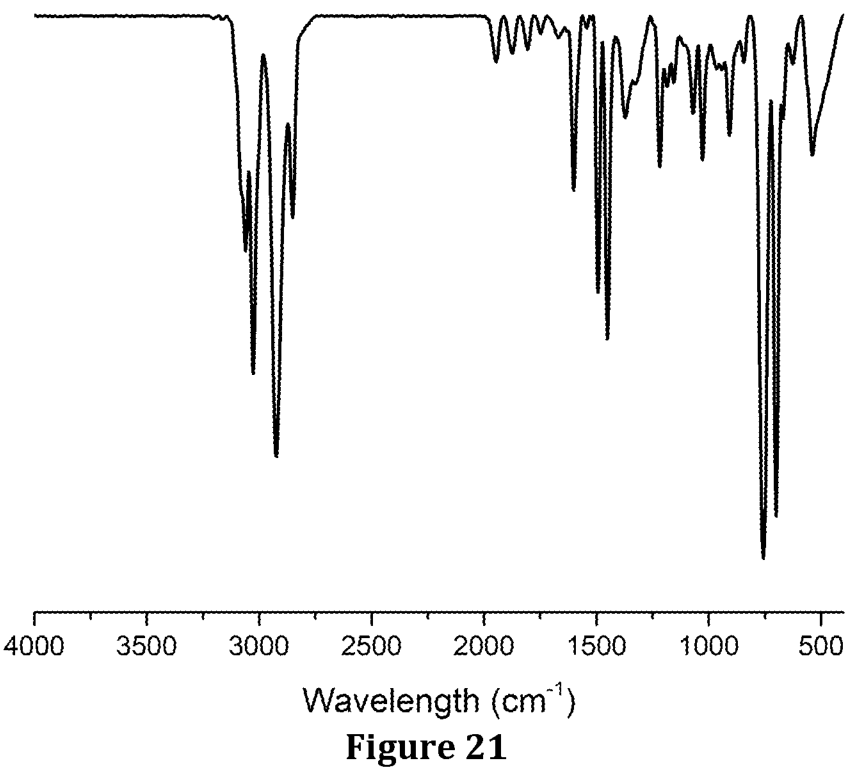
FIG. 21 shows a FT-IR spectra of the PS.
Figure 22:
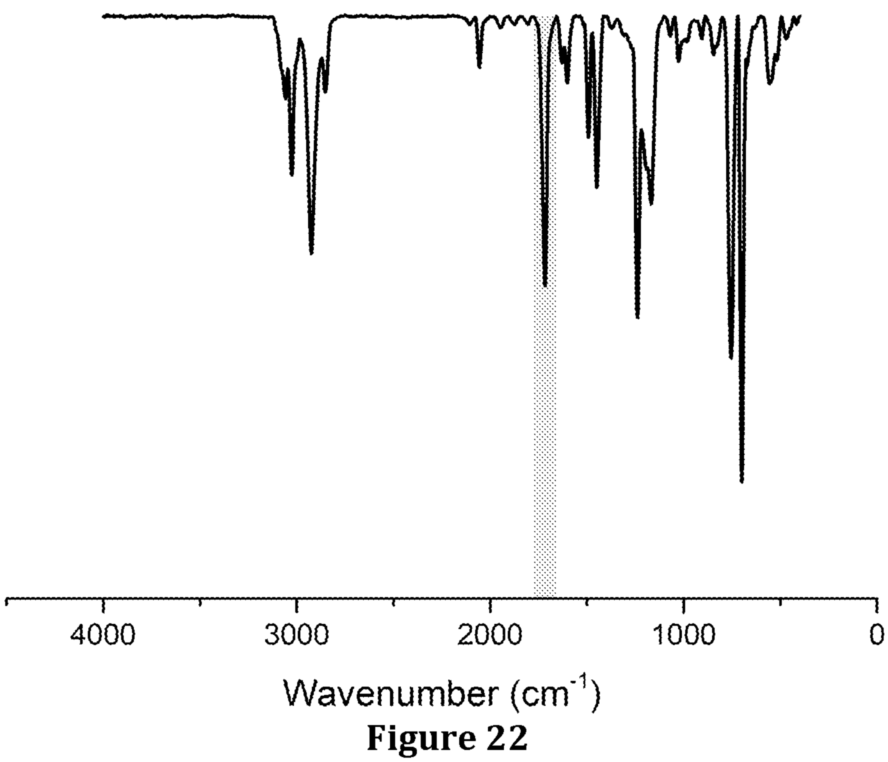
FIG. 22 shows a FT-IR spectra of compound P1 highlighting the C═O stretch at 1725 $cm^{-1}$.
Figure 23:
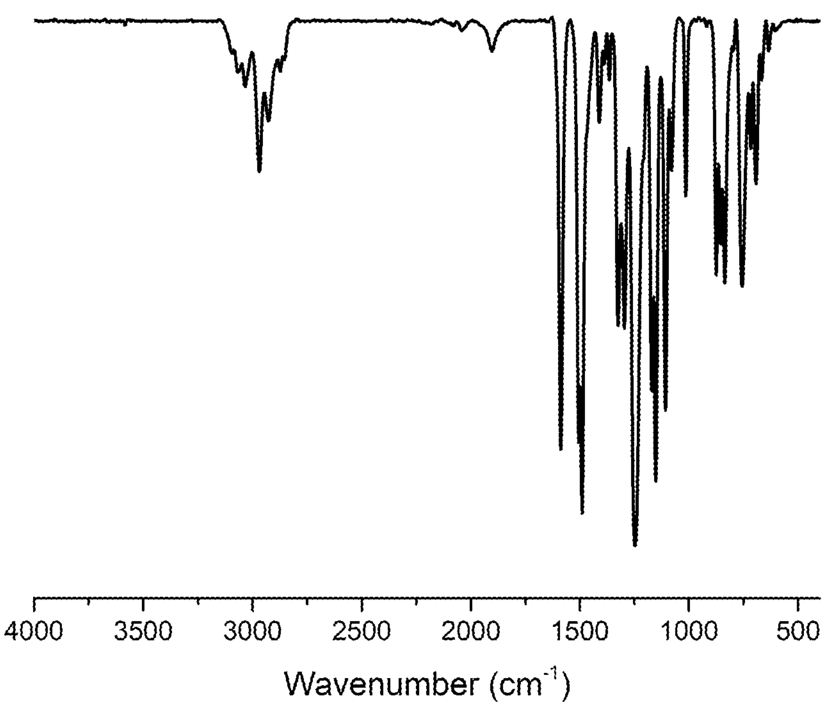
FIG. 23 shows a FT-IR spectra of the PSU.
Figure 24:
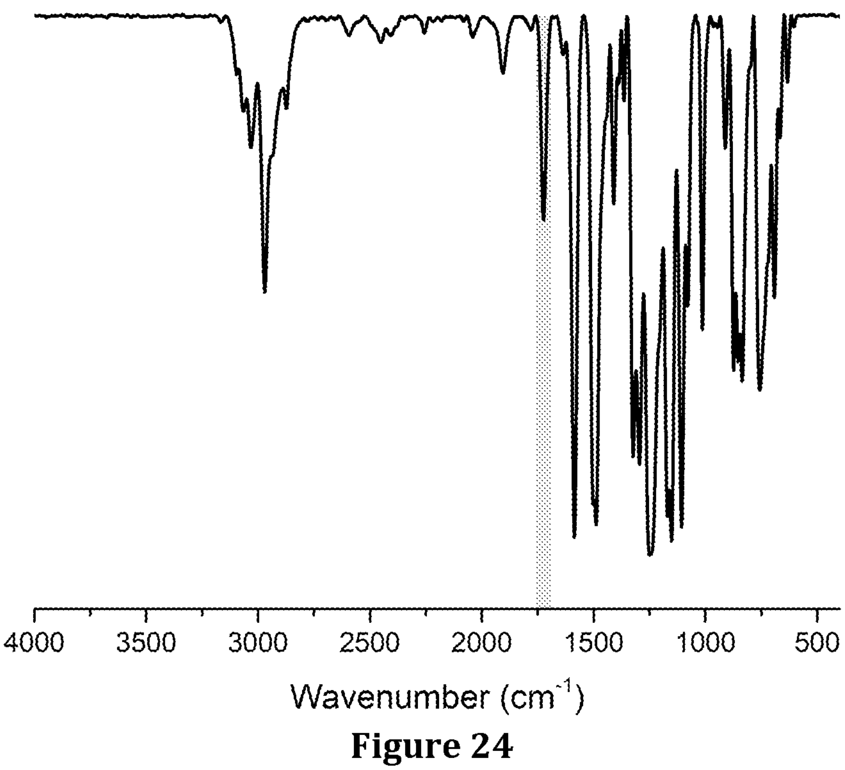
FIG. 24 shows a FT-IR spectra of compound P2 highlighting the C═O stretch at 1725 $cm^{-1}$.
Figure 25:
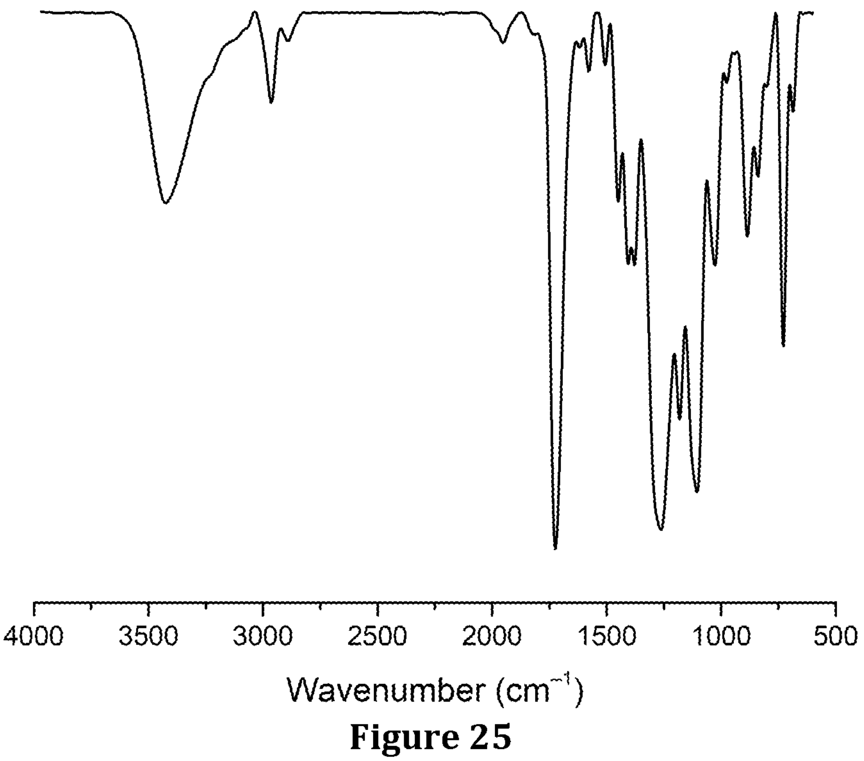
FIG. 25 shows a FT-IR spectra of a waste PET bottle.
Figure 26:
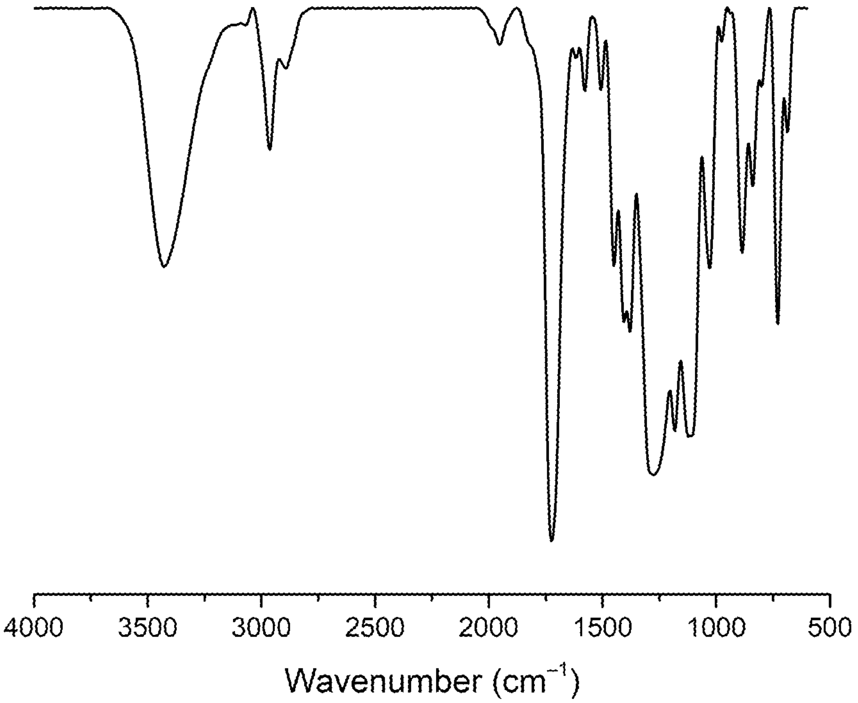
FIG. 26 shows a FT-IR spectra of compound P3, new C═O stretch occluded by backbone C═O stretch, spectra are consistent with starting material.
Figure 27:
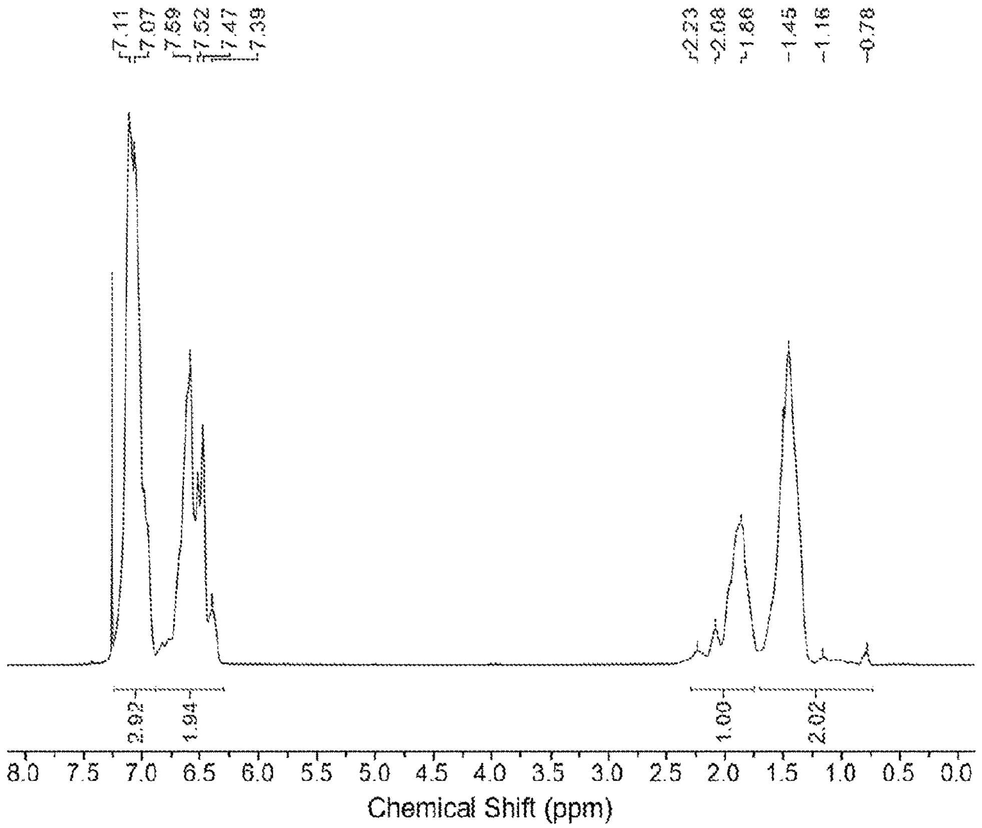
FIG. 27 shows a $^1H$ NMR (600 MHz, chloroform-d, 303K) spectrum of PS.

The general procedure for the gold-catalyzed post-polymerization modification reactions is shown in FIG. 13. Additional details regarding the measurement methods can be found in, King, Eric R. et al., "Gold-Catalyzed Post-Polymerization Modification of Commodity Aromatic Polymers," *JACS Au* 2021, 1, 1342-1347.

Calculation of Percent Functionalization

To facilitate rapid screening during initial optimization studies, the degree of functionalization was evaluated from the $M_n$ determined from GPC relative to the $M_n$ of the unfunctionalized PS. This method was implemented for comparative purposes and derived from a narrow standard GPC calibration curve using PS standards. Accordingly, the data may not be representative of the absolute degree of functionalization and is referred to as the relative degree of functionalization (i.e., relative % functionalization). Accurate values of the degree of functionalization were determined using $^1$H NMR for the products (see equation 2). The relative degree of functionalization was calculated using equation 1:

$$\text{Relative \% Functionalization} = \frac{M_n^{product} - M_n^{scaffold}}{\left(\frac{M_n^{scaffold}}{M_0^{scaffold}} \times M_0^{product}\right) - M_n^{scaffold}} \quad (1)$$

where $$M_n^{scaffold},\ M_0^{scaffold},\ \text{and}\ M_n^{product}$$

represent the $M_n$ of the unfunctionalized scaffold, formula mass of the unfunctionalized scaffold constitutional repeat unit, $M_n$ of the product, and formula mass of the product constitutional repeat unit, respectively.

Figure 28:
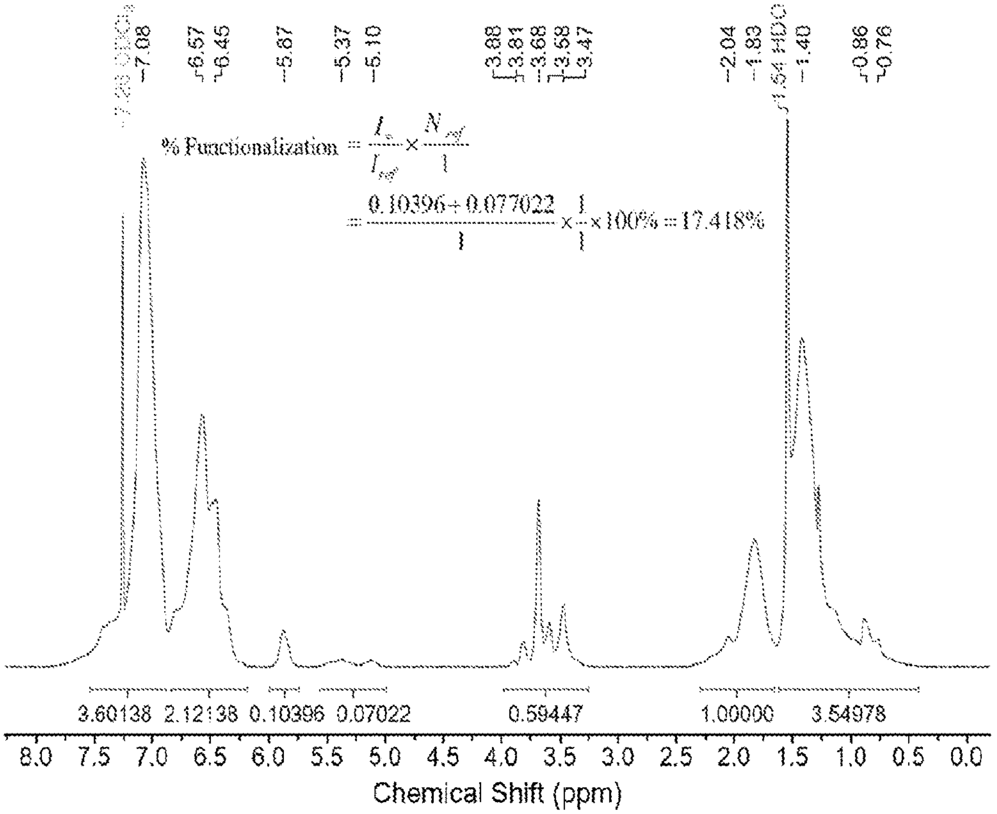
FIG. 28 shows a $^1H$ NMR (600 MHz, chloroform-d, 303K) spectrum of compound P1.
Figure 29:
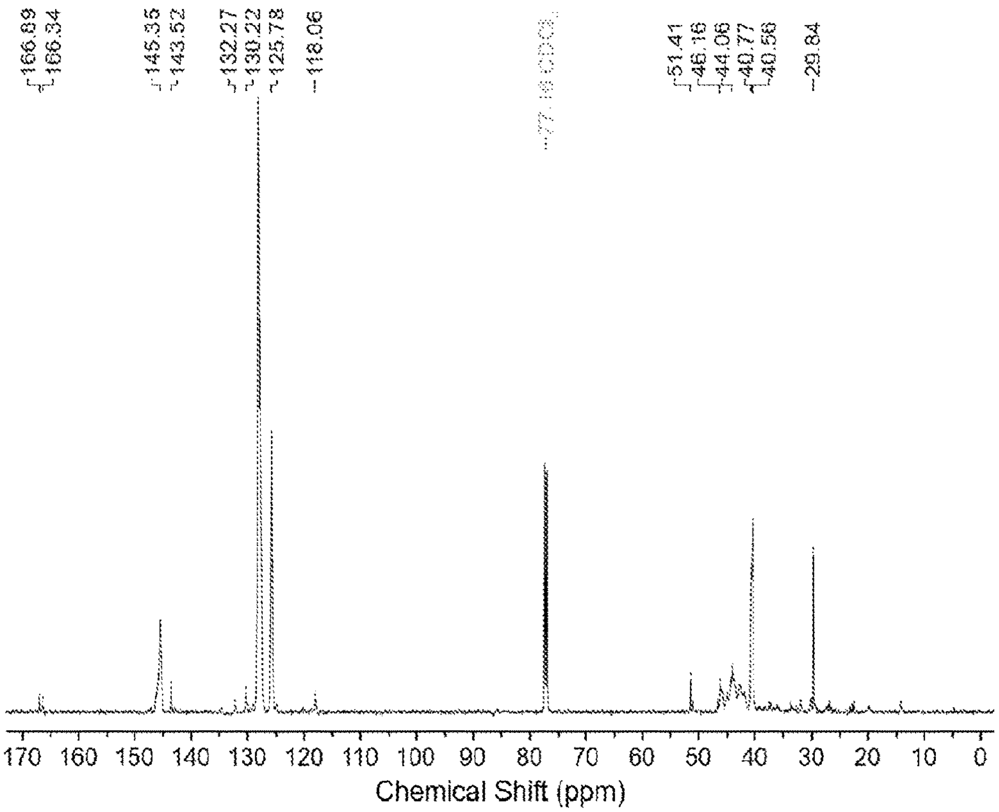
FIG. 29 shows a $^{13}C$ NMR (151 MHz, chloroform-d, 303K) spectrum of compound P1.
Figure 30:
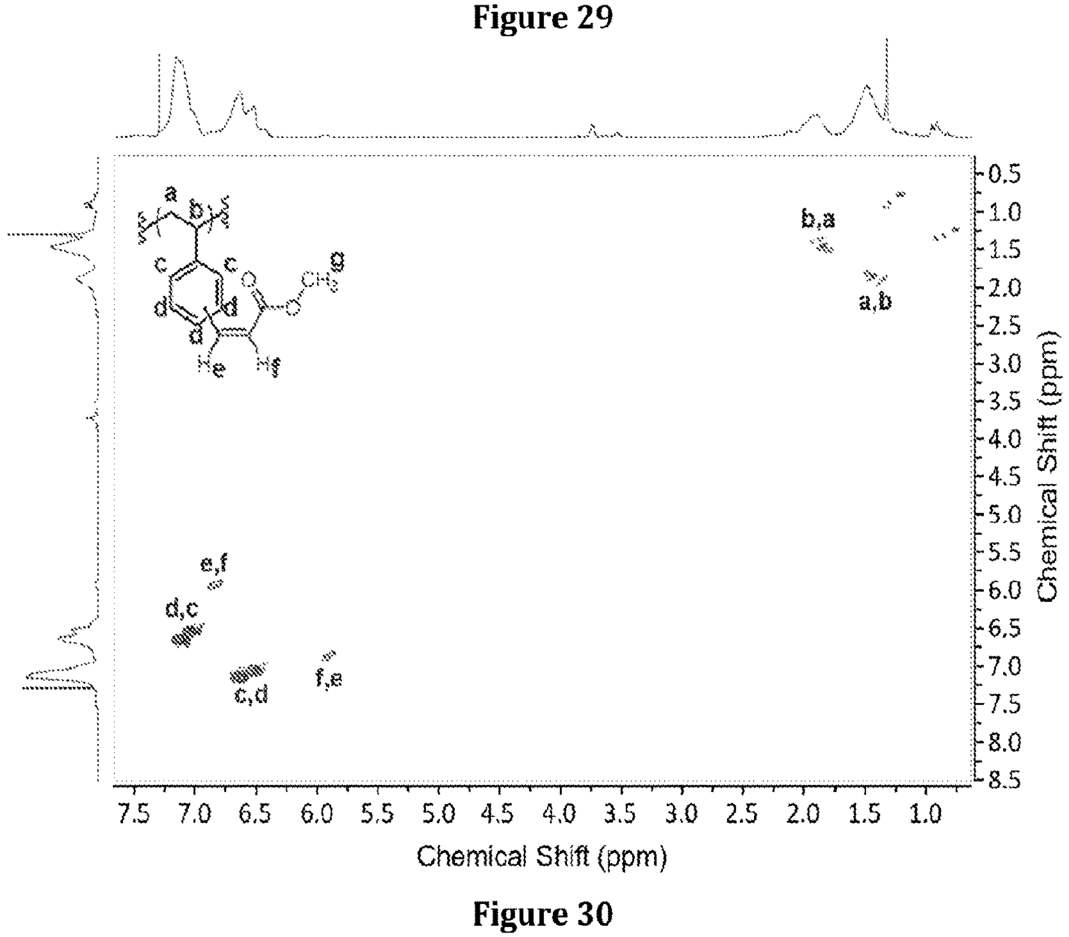
FIG. 30 shows a $^1H$-$^1H$ COSY (600 MHz, chloroform-d, 303K) spectrum of compound P1.
Figure 31:
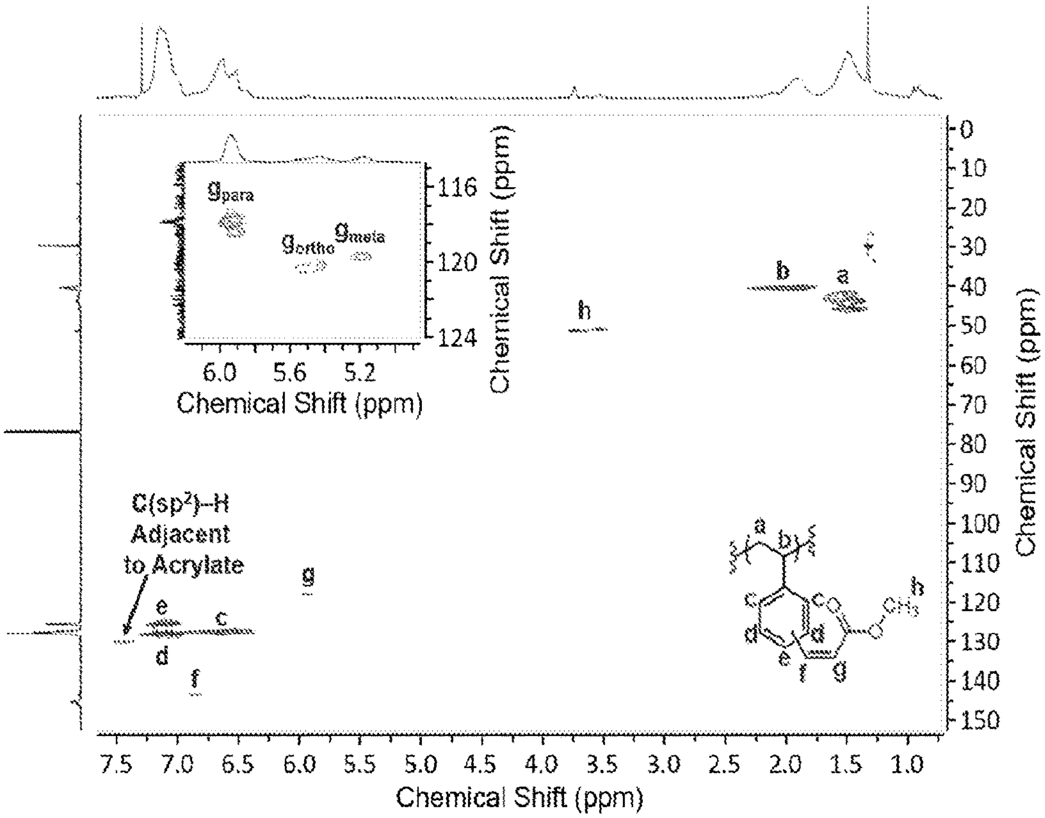
FIG. 31 shows a $^1$H-$^{13}$C HSQC (600 MHz, chloroform-d, 303K) spectrum of compound P1.
Figure 32:
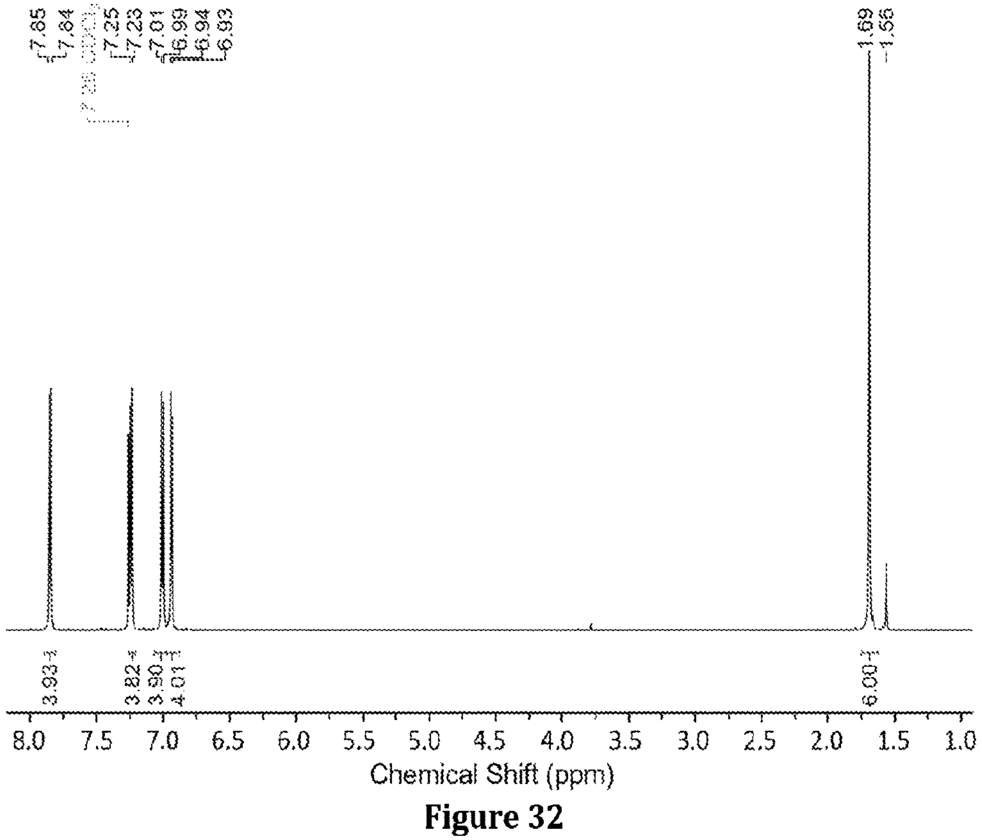
FIG. 32 shows a $^1$H NMR (600 MHz, chloroform-d, 303K) spectrum of the PSU.
Figure 33:
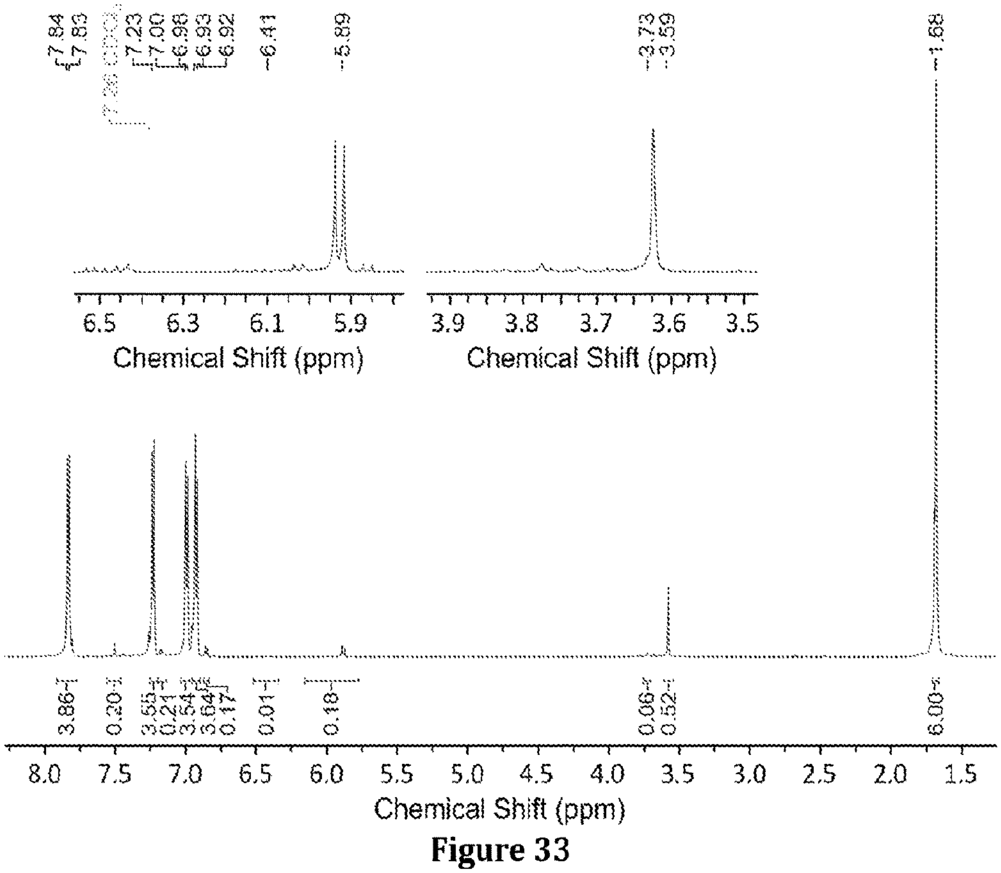
FIG. 33 shows a $^1$H NMR (600 MHz, chloroform-d, 303K) spectrum of compound P2.
Figure 34:
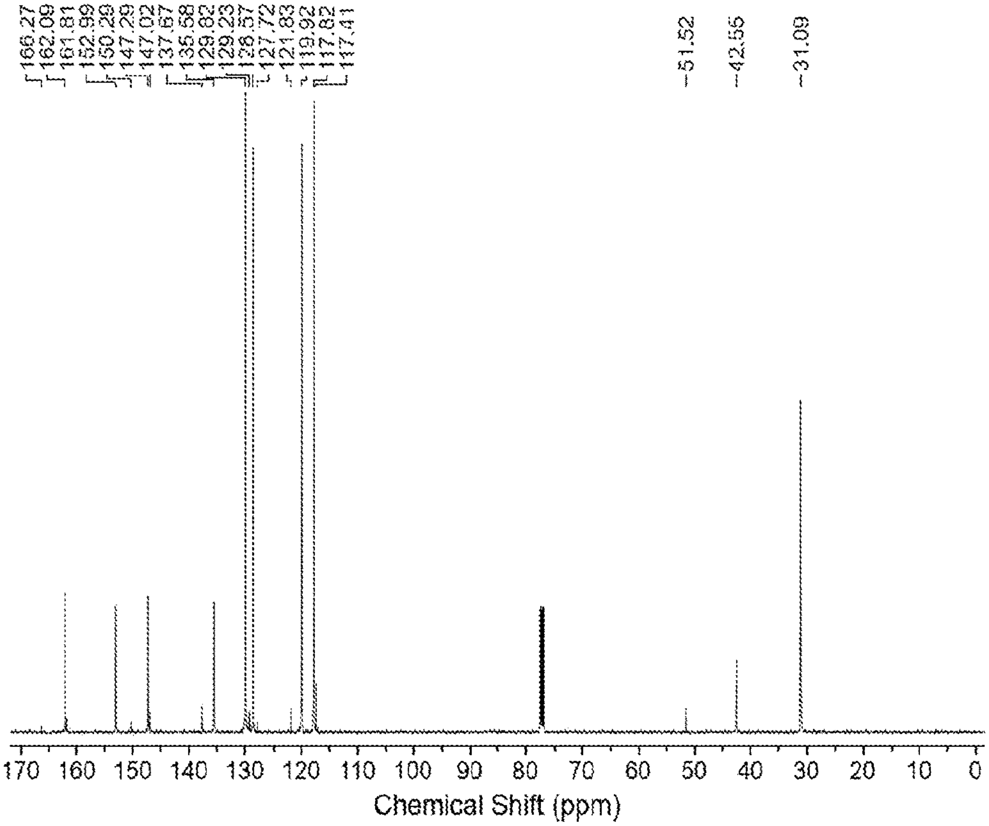
FIG. 34 shows a $^{13}$C NMR (151 MHz, chloroform-d, 303K) spectrum of compound P2.
Figure 35:
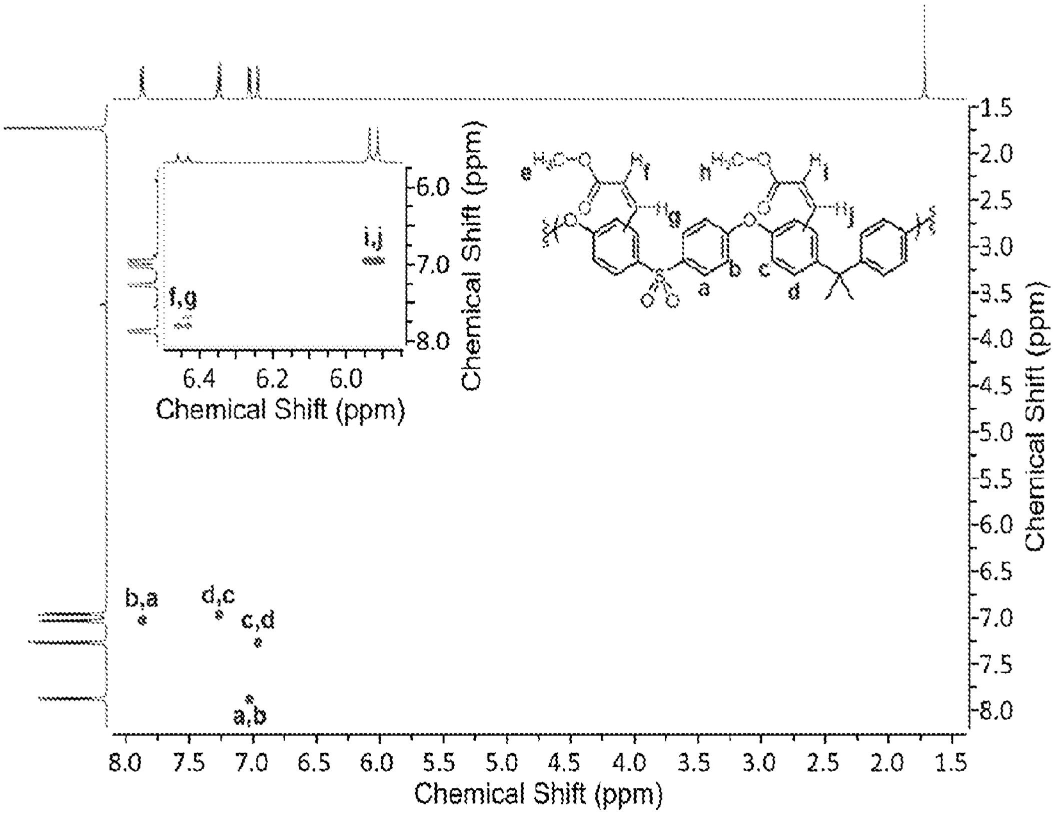
FIG. 35 shows a $^1$H-$^1$H COSY (600 MHz, chloroform-d, 303K) spectrum of compound P2.
Figure 36:
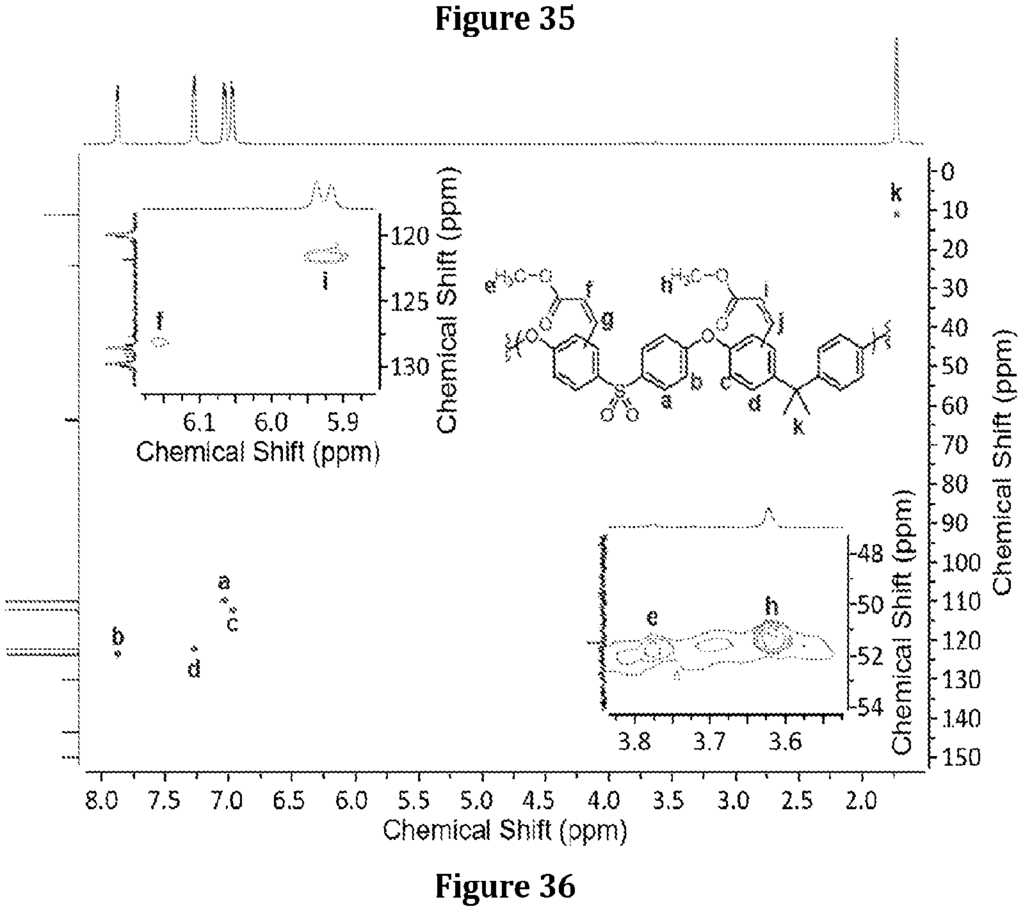
FIG. 36 shows a $^1$H-$^{11}$C HSQC (600 MHz, chloroform-d, 303K) spectrum of compound P2.
Figure 37:
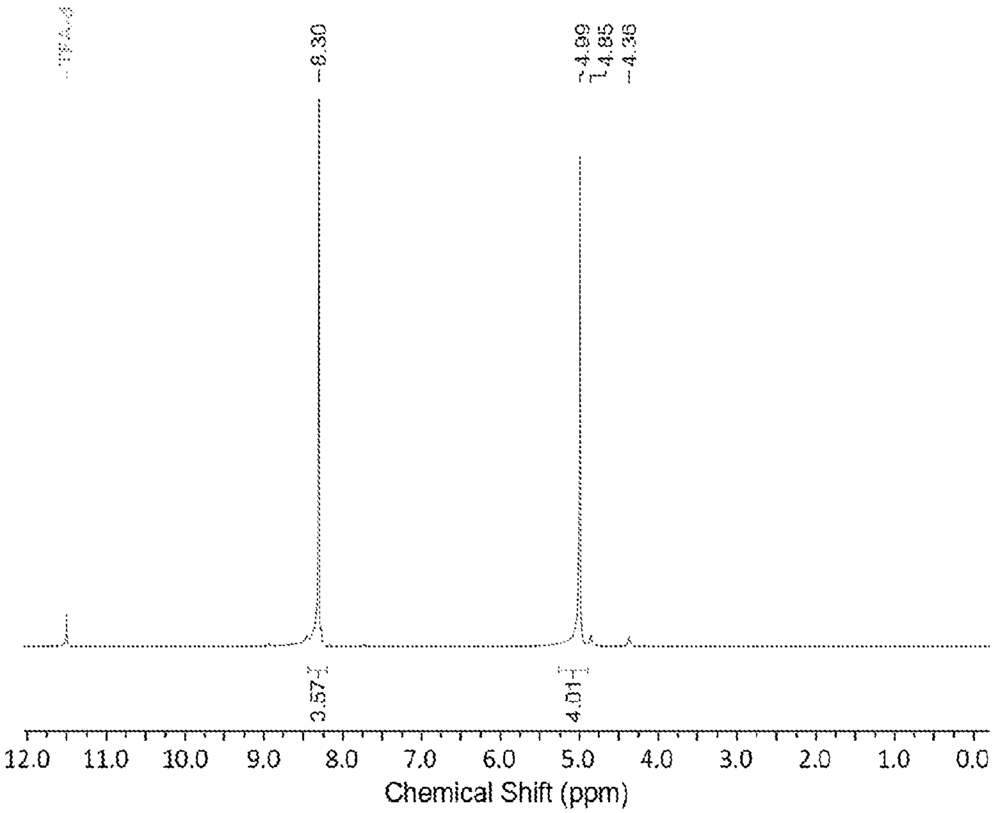
FIG. 37 shows a $^1$H NMR (600 MHz, trifluoroacetic acid-d, 303K) spectrum of a PET soda bottle.
Figure 38:
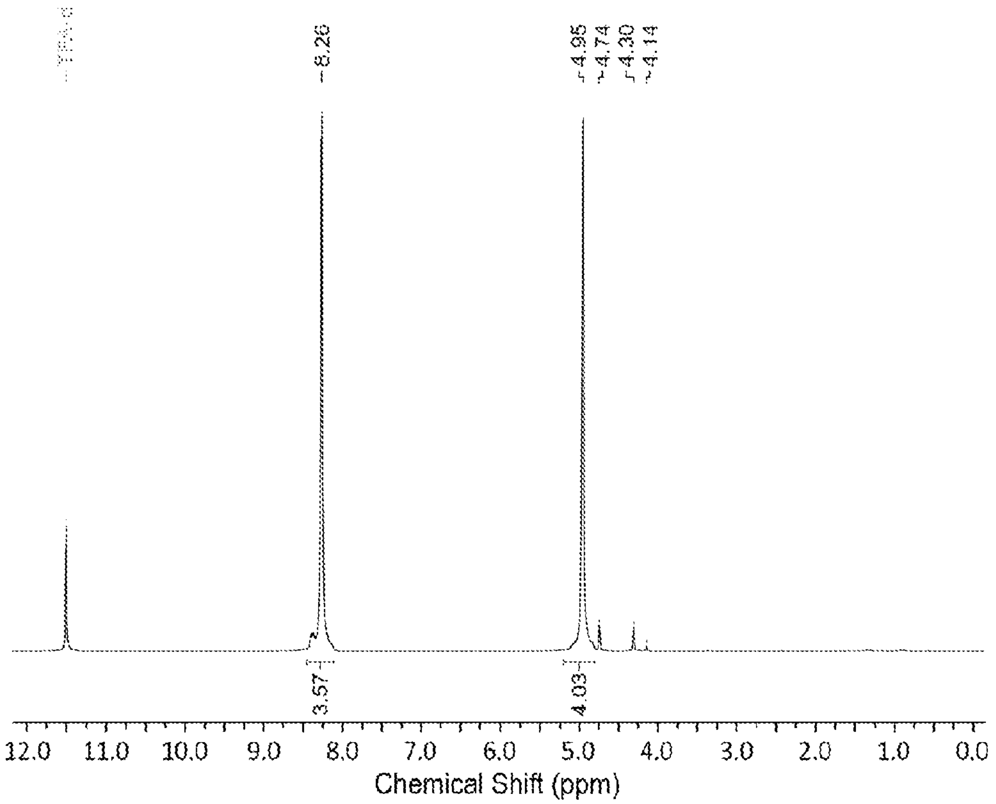
FIG. 38 shows a $^1$H NMR (600 MHz, trifluoroacetic acid-d, 303K) spectrum of pristine PET.
Figure 39:
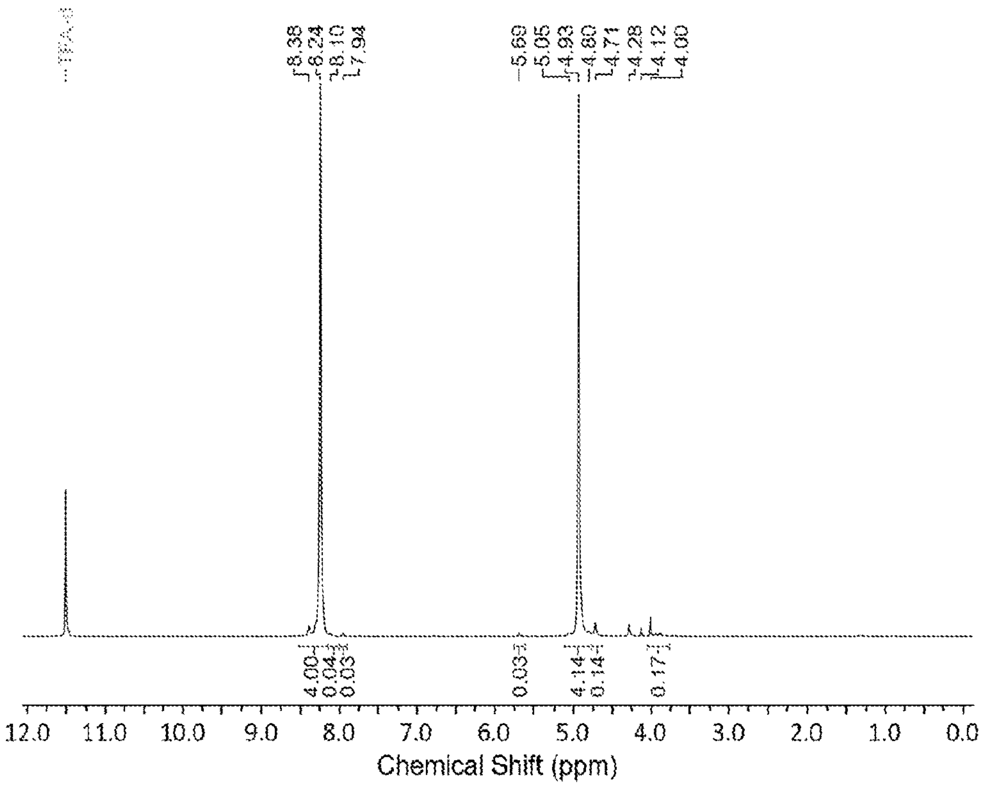
FIG. 39 shows a $^1$H NMR (600 MHz, trifluoroacetic acid-d, 303K) spectrum of compound P3.
Figure 40:
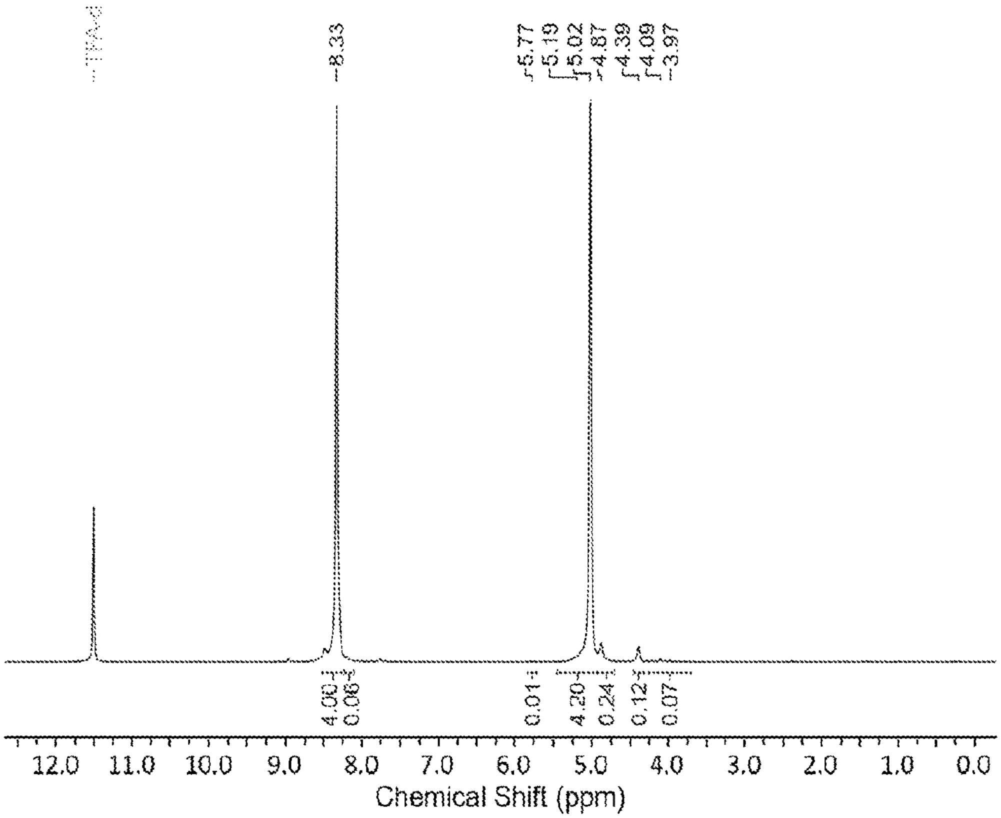
FIG. 40 shows a $^1$H NMR (600 MHz, trifluoroacetic acid-d, 303K) spectrum of compound P3 from pristine PET.
Figure 41:
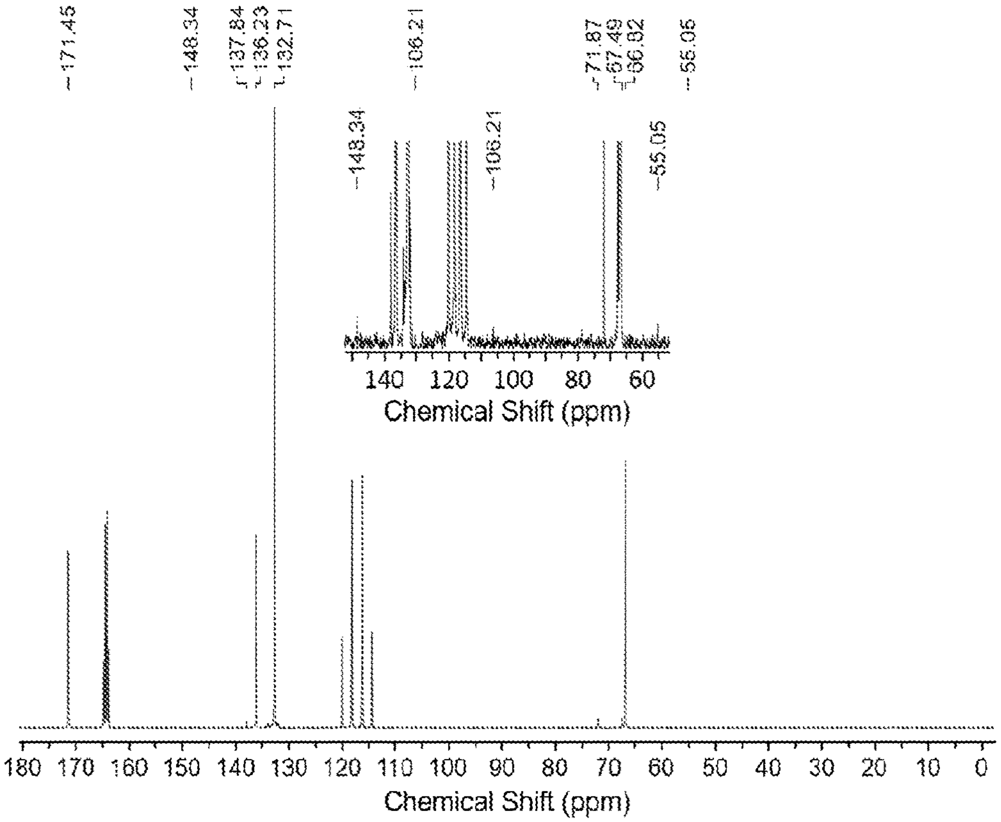
FIG. 41 shows a $^{13}$C NMR (151 MHz, chloroform-d, 303K) spectrum of compound P3.
Figure 42:
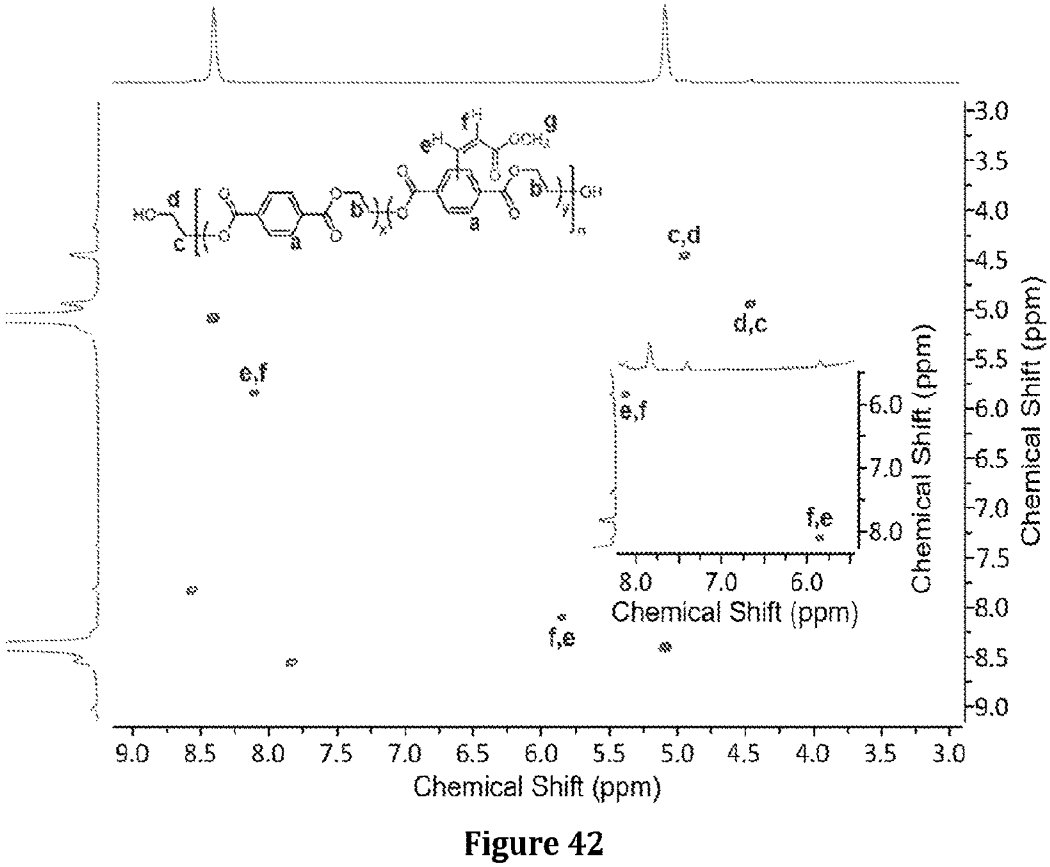
FIG. 42 shows a $^1$H-$^1$H COSY (600 MHz, chloroform-d, 303K) spectrum of compound P3.
Figure 43:
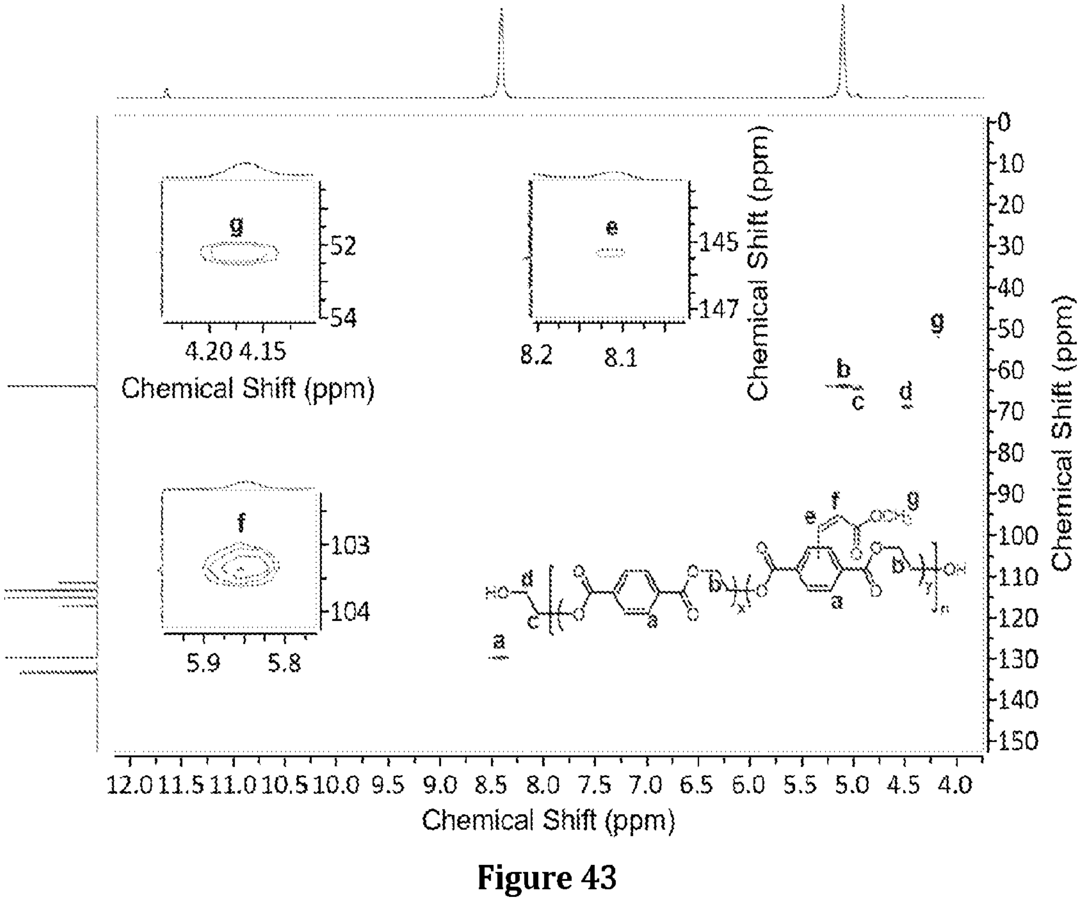
FIG. 43 shows a $^1$H-$^{13}$C HSQC (600 MHz, chloroform-d, 303K) spectrum of compound P3.

The absolute degree of functionalization (i.e., % functionalization) for P1-P3 were calculated from $^1$H NMR using equation 2:

$$\text{\% Functionalization} = \frac{I_{OCH_3}}{I_{ref}} \times \frac{N_{ref}}{3} = \frac{I_{=}}{I_{ref}} \times \frac{N_{ref}}{1} \quad (2)$$

Where $I_{OCH}$, $I_{ref}$, $N_{ref}$, and $I_{=}$ represent the integration of the $OCH_3$ proton signal, the integration of the reference peak (consistent number of protons between product and scaffold), number of protons represented by the reference peak, and integration of the α-carbonyl alkene proton, respectively. The application of this equation is illustrated as an inset in the $^1$H NMR of P1 (see FIG. 28).

Au-Mediated PPM of PS

TABLE 1

| Entry | Catalyst | AgX | Time (h) | [PS] (M) | Temp (° C.) | [1]/[PS] | $M_n$ (g mol$^{-1}$)[h] | Đ[h] | Functionalization (%) |
|---|---|---|---|---|---|---|---|---|---|
| 1 | — | — | — | — | — | — | 13,135 | 1.03 | — |
| 2[d] | A | — | 24 | 0.85 | 25 | 2 | 13,214 | 1.03 | 0.6 |
| 3[d] | A | — | 24 | 0.85 | 25 | 10 | 13,253 | 1.02 | 0.9 |
| 4[d] | A | — | 24 | 0.85 | 80 | 2 | 13,306 | 1.02 | 1.3 |
| 5[d] | A | — | 24 | 0.85 | 80 | 10 | 13,214 | 1.02 | 0.6 |
| 6[d] | A | — | 24 | 0.85 | 80 | 10 | 13,293 | 10.2 | 1.2 |
| 7[d] | A | — | 24 | 0.85 | 60 | 10 | 13,135 | 1.03 | 0.0 |
| 8[d] | A | — | 24 | 0.85 | 40 | 10 | 13,135 | 1.02 | 0.0 |
| 9[d] | B | — | 24 | 0.85 | 25 | 10 | 13,293 | 1.03 | 1.2 |
| 10[d] | B | — | 24 | 0.85 | 80 | 10 | 13,319 | 1.03 | 1.4 |
| 11[d] | B | — | 24 | 0.85 | 40 | 10 | 13,188 | 1.02 | 0.4 |
| 12 | C | AgOTf | 24 | 0.85 | 25 | 2 | 13,279 | 1.03 | 1.1 |
| 13 | C | AgOTf | 24 | 0.85 | 25 | 10 | 13,188 | 1.03 | 0.4 |
| 14 | C | AgOTf | 24 | 0.85 | 80 | 2 | 13,148 | 1.03 | 0.1 |
| 15 | C | AgOTf | 24 | 0.85 | 80 | 10 | 13,227 | 1.03 | 0.7 |
| 16 | C | $AgSbF_6$ | 24 | 0.85 | 25 | 10 | 13,831 | 1.03 | 5.3 |
| 17 | D | $AgSbF_6$ | 24 | 0.85 | 25 | 10 | 13,923 | 1.03 | 6.0 |
| 18 | D | $AgSbF_6$ | 24 | 0.85 | 25 | 10 | 14,540 | 1.04 | 10.7 |
| 19 | D | $AgSbF_6$ | 1 | 0.85 | 25 | 10 | 13,805 | 1.03 | 5.1 |
| 20 | D | $AgSbF_6$ | 3 | 0.85 | 25 | 10 | 13,857 | 1.03 | 5.5 |
| 21 | D | $AgSbF_6$ | 1 | 0.85 | 80 | 10 | 14,527 | 1.03 | 10.6 |
| 22 | E | $AgSbF_6$ | 24 | 0.85 | 25 | 10 | 14,028 | 1.03 | 6.8 |
| 23 | F | $AgSbF_6$ | 24 | 0.85 | 25 | 10 | 13,595 | 1.03 | 3.5 |
| 24 | F | $AgSbF_6$ | 24 | 0.85 | 80 | 10 | 13,936 | 1.05 | 6.1 |
| 25 | G | $AgSbF_6$ | 24 | 0.85 | 80 | 10 | 13,687 | 1.11 | 4.2 |

TABLE 1-continued

| Entry | Catalyst | AgX | Time (h) | [PS] (M) | Temp (° C.) | [1]/[PS] | $M_n$ (g $mol^{-1}$)[b] | Đ[b] | Function-alization (%) |
|---|---|---|---|---|---|---|---|---|---|
| 26 | G | $AgSbF_6$ | 1 | 0.85 | 25 | 10 | 13,713 | 1.03 | 4.4 |
| 27 | G | $AgSbF_6$ | 3 | 0.85 | 25 | 10 | 14,120 | 1.03 | 7.5 |
| 28 | G | $AgSbF_6$ | 6 | 0.85 | 25 | 10 | 14,265 | 1.03 | 8.6 |
| 29 | H | AgOTf | 24 | 0.85 | 25 | 2 | 13,529 | 1.05 | 3.0 |
| 30 | H | AgOTf | 24 | 0.85 | 25 | 10 | 13,293 | 1.03 | 1.2 |
| 31 | H | AgOTf | 24 | 0.85 | 80 | 2 | 13,293 | 1.03 | 1.2 |
| 32 | H | AgOTf | 24 | 0.85 | 80 | 10 | 13,266 | 1.03 | 1.0 |
| 33 | H | $AgSbF_6$ | 24 | 0.50 | 80 | 10 | 14,068 | 1.16 | 7.1 |
| 34 | H | $AgSbF_6$ | 24 | 0.10 | 80 | 2 | 13,831 | 1.04 | 5.3 |
| 35 | H | $AgSbF_6$ | 24 | 0.10 | 80 | 10 | 14,212 | 1.06 | 8.2 |
| 36[d] | I | — | 24 | 0.85 | 25 | 10 | 13,306 | 1.03 | 1.3 |
| 37[d] | I | — | 24 | 0.85 | 80 | 10 | 13,398 | 1.03 | 2.0 |
| 38 | J | $AgSbF_6$ | 6 | 0.85 | 25 | 10 | 13,805 | 1.03 | 5.1 |
| 39 | J | $AgSbF_6$ | 6 | 0.85 | 80 | 10 | 14,186 | 1.04 | 8.0 |
| 40 | J | $AgSbF_6$ | 24 | 0.85 | 60 | 10 | 13,871 | 1.04 | 5.6 |
| 41 | J | $AgSbF_6$ | 24 | 0.85 | 40 | 10 | 13,765 | 1.03 | 4.8 |
| 42 | J | $AgSbF_6$ | 24 | 0.85 | 25 | 10 | 13,437 | 1.02 | 2.3 |
| 43 | H | — | 12 | 0.85 | 25 | 2 | 13,135 | 1.03 | — |
| 44 | — | $AgSbF_6$ | 12 | 0.85 | 25 | 2 | 13,135 | 1.03 | — |
| 45 | — | $AgNTf_2$ | 12 | 0.85 | 25 | 2 | 13,135 | 1.03 | — |
| 46 | — | AgOTf | 12 | 0.85 | 25 | 2 | 13,135 | 1.03 | — |
| 47[e] | H | $AgSbF_6$ | 12 | 0.85 | 25 | 10 | 13,257 | 1.03 | 0.9 |
| 48[e] | H | $AgSbF_6$ | 12 | 0.85 | 25 | 2 | 13,471 | 1.03 | 2.6 |
| 49[e] | H | $AgSbF_6$ | 12 | 0.85 | 25 | 1 | 13,872 | 1.05 | 5.6 |
| 50[e] | H | $AgSbF_6$ | 12 | 0.85 | 25 | 0.5 | 13,906 | 1.03 | 5.9 |
| 51[e] | H | $AgSbF_6$ | 12 | 0.85 | 25 | 0.25 | 13,911 | 1.03 | 5.9 |
| 52[f] | H | $AgSbF_6$ | 12 | 0.85 | 25 | 10 | 13,380 | 1.04 | 1.9 |
| 53[f] | H | $AgSbF_6$ | 12 | 0.85 | 25 | 2 | 14,214 | 1.05 | 8.2 |
| 54[f] | H | $AgSbF_6$ | 12 | 0.85 | 25 | 1 | 14,274 | 1.05 | 8.7 |
| 55[f] | H | $AgSbF_6$ | 12 | 0.85 | 25 | 0.5 | 14,620 | 1.06 | 11.3 |
| 56[f] | H | $AgSbF_6$ | 12 | 0.85 | 25 | 0.25 | 13,940 | 1.03 | 6.1 |

[a]Reaction conditions: PS (0.480 mmol), 1 (4.80, 0.960, 0.480, 0.240, or 0.120 mmol), Au catalyst (2 mol %), AgX (6 mol %), 1-2-dichloroethane (DCE, 0.85M).
[b]Determinated by gel permeation chromatography (GPC) at 45° C. in tetrahydrofuran (THF).
[c]Calculated from $M_n$, see equation 1.
[d]No AgX was utilizied.
[e]340 ppm Au catalyst used.
[f]2000 ppm Au catalyst used.
See FIGS. 3-6 for the results of the experiments.

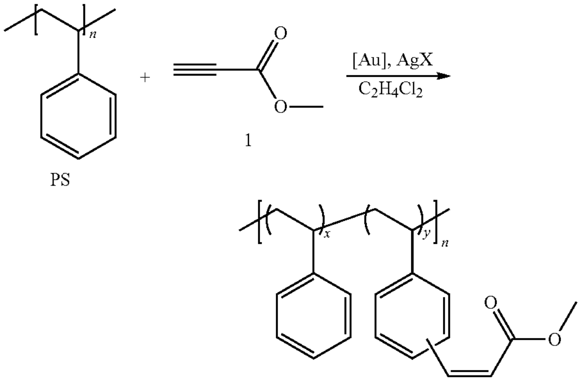

PS

1

P1

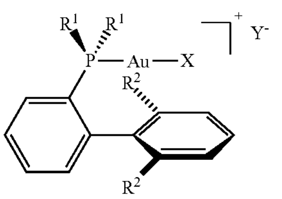

A: $R^1$ = Cy, $R^2$ = OMe, X = $NTf_2$, Y = N/A
B: $R^1$ = tBu, $R^2$ = H, X = NCMe, Y = $SbF_6^-$
C: $R^1$ = tBu, $R^2$ = H, X = Cl, Y = N/A

-continued $R_3P$—Au—Cl

E: R = $tBu_3$
F: R = $C_6F_5$
G: T = oTolyl
H: R = $PPh_3$

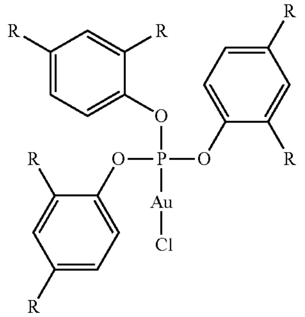

D: R = tBu

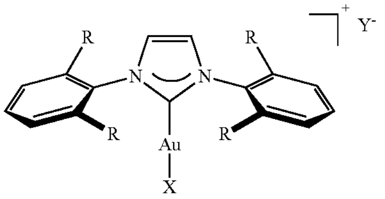

I: R = iPr, X = NCMe, Y = $BF_4^-$
J: R = iPr, X = Cl, Y = N/A

Effect of Solvent Dielectric Constant (ε) on PPM Reactions.

TABLE 2

| Entry | Catalyst | AgX | Solvent | Dielectric (ε) | Temp (° C.) | [1]/[PS] | $M_n$ (g $mol^{-1}$)[b] | Đ[b] | Functionalization (%)[c] |
|---|---|---|---|---|---|---|---|---|---|
| 1 | C | $AgSbF_6$ | DCE | 10.36 | 25 | 10 | 13,532 | 1.03 | 3.1 |
| 2 | C | $AgSbF_6$ | DCM | 8.93 | 40 | 10 | 13,886 | 1.04 | 5.8 |
| 3 | C | $AgSbF_6$ | $CHCl_3$ | 4.81 | 25 | 10 | 13,125 | 1.03 | 0.0 |
| 4 | D | $AgSbF_6$ | DCE | 10.36 | 25 | 10 | 14,529 | 1.04 | 10.7 |
| 5 | D | $AgSbF_6$ | DCM | 8.93 | 25 | 10 | 13,611 | 1.03 | 3.7 |
| 6 | D | AgOTf | DCM | 8.93 | 40 | 10 | 13,230 | 1.03 | 0.8 |
| 7 | D | $AgSbF_6$ | $CHCl_3$ | 4.81 | 60 | 10 | 13,125 | 1.07 | 0.0 |
| 8 | D | AgOTf | $CHCl_3$ | 4.81 | 25 | 10 | 13,493 | 1.01 | 2.8 |
| 9 | H | $AgSbF_6$ | DCE | 10.36 | 80 | 10 | 14,201 | 1.06 | 8.2 |
| 10 | H | $AgSbF_6$ | DCM | 8.93 | 25 | 10 | 13,808 | 1.03 | 5.2 |
| 11 | H | $AgSbF_6$ | $CHCl_3$ | 4.81 | 60 | 10 | 13,125 | 1.03 | 0.0 |
| 12 | H | AgOTf | $CHCl_3$ | 4.81 | 60 | 2 | 13,296 | 1.02 | 1.3 |
| 13 | J | $AgSbF_6$ | DCE | 10.36 | 80 | 10 | 14,149 | 1.04 | 7.8 |
| 14 | J | $AgSbF_6$ | DCM | 8.93 | 25 | 2 | 13,283 | 1.03 | 1.2 |
| 15 | J | $AgSbF_6$ | DCM | 8.93 | 40 | 2 | 13,374 | 1.03 | 1.9 |
| 16 | J | AgOTf | DCM | 8.93 | 40 | 1 | 13,204 | 1.03 | 0.6 |
| 17 | J | $AgSbF_6$ | $CHCl_3$ | 4.81 | 60 | 10 | 13,125 | 1.04 | 0.0 |
| 18 | Good | AgOTf | $CHCl_3$ | 4.81 | 60 | 10 | 13,191 | 1.03 | 0.5 |

[a]Reaction conditions: PS (0.480 mmol), 1 (0.960 or 4.80 mmol, Au catalyst (2 mol %), AgX (6 mol %).
[b]Determined by gel permeation chromatography (GPC) at 45° C. in tetrahydrofuran (THF).
[c]Calculated from $M_n$, see equation 1.

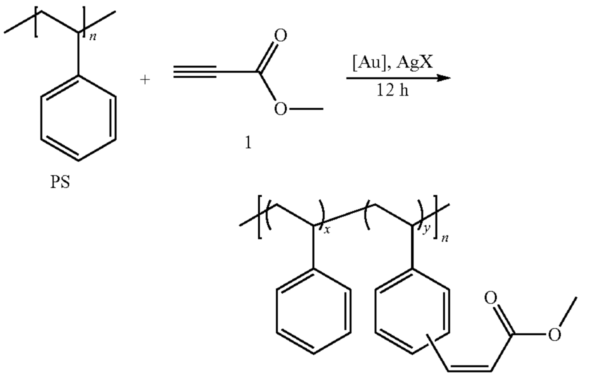

PS 1 P1

Branching of Au-Mediated PPM of PS at Low [1]/[PS] Ratios.

TABLE 3

| Entry | Catalyst | Temp (° C.) | Solvent | $M_n$ (g $mol^{-1}$)[b] | $M_w$ (g $mol^{-1}$)[b] | Đ[b] |
|---|---|---|---|---|---|---|
| 1 | — | — | — | 13,135 | 13,519 | 1.03 |
| 2[c] | B | 25 | DCE | 16,789 | 17,293 | 1.03 |
| 3[c] | B | 80 | DCE | 20,033 | 27,380 | 1.37 |
| 4 | C | 25 | DCE | 20,851 | 27,895 | 1.34 |
| 5 | C | 80 | DCE | 28,252 | 41,126 | 1.46 |
| 6 | C | 25 | DCM | 17,905 | 20,559 | 1.15 |
| 7 | F | 25 | DCE | 17,103 | 17,902 | 1.05 |
| 8 | G | 25 | DCE | 14,834 | 15,195 | 1.03 |
| 9 | G | 80 | DCE | 107,900 | 457,759 | 4.24 |
| 10 | H | 25 | DCM | 20,523 | 21,052 | 1.03 |
| 11 | H | 25 | DCE | 25,054 | 49,968 | 1.99 |
| 12[d] | H | 25 | DCE | 14,282 | 14,846 | 1.05 |
| 13[e] | H | 25 | DCE | 14,933 | 15,905 | 1.08 |

[a]Reaction conditions: PS (0.480 mmol), 1 (0.960 mmol), Au catalyst (2 mol %), $AgSbF_6$ (6 mol %), 1,2-dicloroethane (DCE, 0.85M), 25° C.
[b]Determined by gel permeation chromatography (GPC) at 45° C. in tetrahydrofuran (THF).
[c]No $AgSbF_6$ was utilized.
[d]Reaction time reduced to 1 h.
[e]Reaction time reduced to 3 hours.

Regioselectivity of Au-mediated PPM of PS.

TABLE 4

| Entry | Catalyst | Average para (%)[b] | Average meta (%)[b] | Average ortho (%)[b] |
|---|---|---|---|---|
| 1[c] | B | 61.5 ± 9.2 | 15.4 ± 4.4 | 23.2 ± 5.4 |
| 2 | C | 64.7 ± 5.2 | 13.1 ± 2.3 | 22.2 ± 3.5 |
| 3 | D | 64.7 ± 6.1 | 12.8 ± 2.8 | 22.4 ± 3.4 |
| 4 | F | 55.0 ± 8.5 | 17.1 ± 0.8 | 27.9 ± 7.6 |
| 5 | G | 56.4 ± 14.6 | 17.5 ± 5.9 | 26.1 ± 8.7 |
| 6 | H | 64.5 ± 3.7 | 12.4 ± 1.5 | 23.1 ± 2.6 |
| 7[c] | I | 69.0 ± 0.7 | 13.8 ± 2.8 | 17.3 ± 2.1 |
| 8 | J | 60.0 ± 2.7 | 15.4 ± 0.5 | 24.7 ± 2.2 |

[a]Reaction conditions: PS (0.48 mmol), 1 (4.80 mmol), Au catalyst (2 mol %), $AgSbF_6$ (6 mol %), 1,2-dichloroethane (DCE, 0.85M), 25° C.
[b]Determined from $^1H$ NMR relative peak integrations, standard deviation calculated from 10 iterative reactions.
[c]No $AgSbF_6$ was utilized.

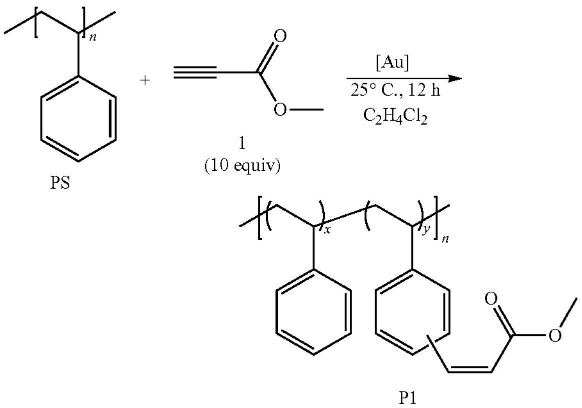

PS 1 (10 equiv) P1

Optimization of PPM Conditions Using PSU.

TABLE 5

| Entry | Catalyst | Solvent | Temp (° C.) | [1]/[PSU] | Functionalization (%)[b] |
|---|---|---|---|---|---|
| 1 | C | DCE | 25 | 2 | 7.3 |
| 2 | C | DCE | 80 | 2 | 9.3 |
| 3 | C | DCM | 25 | 2 | 12.7 |
| 4 | C | DCM | 40 | 2 | 6.7 |
| 5 | C | DCE | 80 | 10 | 9.5 |
| 6 | C | DCE | 25 | 10 | 6.3 |
| 7 | C | DCM | 40 | 10 | 5.7 |
| 8 | G | DCE | 25 | 10 | 12.2 |

TABLE 5-continued

| Entry | Catalyst | Solvent | Temp (° C.) | [1]/[PSU] | Functionalization (%)[b] |
|---|---|---|---|---|---|
| 9 | G | DCE | 25 | 2 | 20.2 |
| 10 | H | DCE | 25 | 2 | 21.6 |
| 11 | H | DCE | 25 | 10 | 5.9 |
| 12 | J | DCE | 25 | 2 | 18.2 |
| 13 | J | DCE | 25 | 10 | 4.1 |
| 14 | J | DCE | 25 | 2 | 3.3 |
| 15 | J | DCE | 80 | 2 | 3.7 |

[a]Reaction conditions: PSU (0.480 mmol), 1 (4.80 mmol), Au catalyst (2 mol %), AgX (6 mol %), 1,2-dichloroethane (DCE, 0.50M), 25° C.
[b]Determined from $^{1}$H NMR, see equation 2.

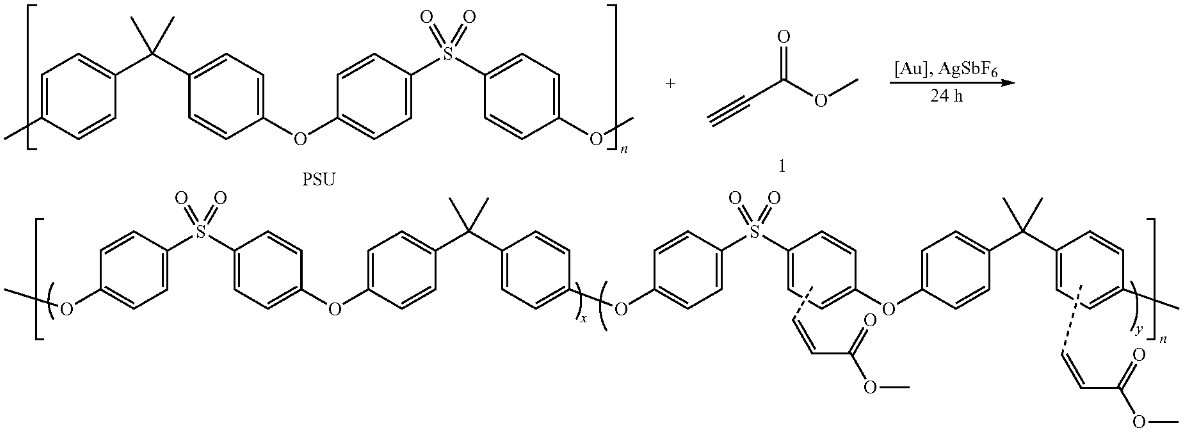

PSU
1
P2

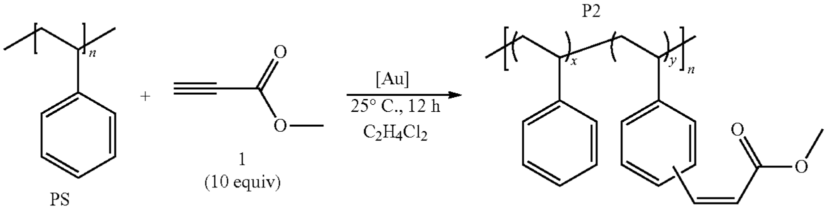

PS
1
(10 equiv)
P1

Optimization of PPM Conditions Using PET.

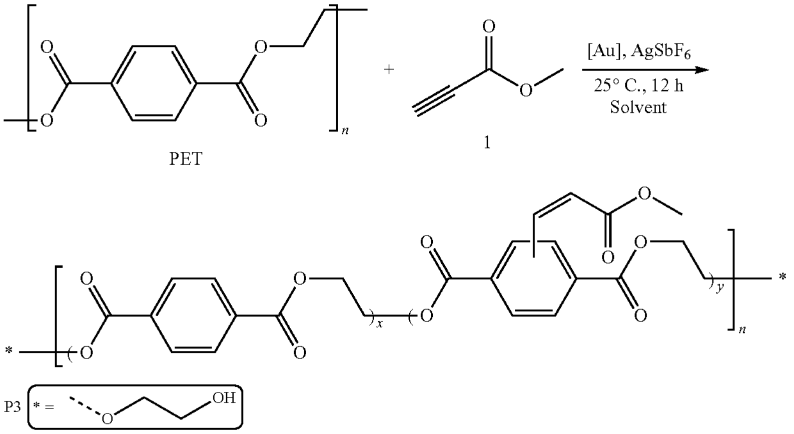

PET
1
P3

TABLE 6

| Entry | Catalyst | Solvent | [PET] | Temp (° C.) | [1]/[PET] | Functionalization (%)[b] |
|---|---|---|---|---|---|---|
| 1 | C | TFA/DCE (1/2) | 0.30 | 25 | 10 | 1.3 |
| 2 | C | TFA/DCE (1/2) | 0.85 | 25 | 2 | 2.0 |
| 3 | G | TFA/DCE (1/2) | 0.85 | 25 | 2 | 1.5 |
| 4 | G | TFA/DCE (1/2) | 0.30 | 25 | 10 | 1.0 |
| 5 | H | TFA/DCE (1/2) | 0.30 | 25 | 10 | 1.4 |
| 6 | H | TFA/DCE (1/2) | 0.85 | 70 | 2 | 1.0 |
| 7 | H | TFA/DCE (1/2) | 0.85 | 25 | 2 | 1.5 |
| 8 | J | TFA/DCE (1/2) | 0.85 | 25 | 2 | 1.4 |
| 9 | H | TFA/DCE (1/5) | 0.3 | 25 | 2 | 2.2 |
| 10 | H | TFA/DCE (1/5) | 0.3 | 55 | 2 | 1.3 |
| 11 | H | HFIP/DCE (1/5) | 0.3 | 25 | 2 | 3.1 |
| 12 | H | HFIP/DCE (1/5) | 0.3 | 55 | 2 | 2.2 |

[a]Reaction condiiton: PET (0.260 mmol, 1 (0.520 or 2.60 mmol), Au catalyst (2 mol %), $AgSbF_6$ (6 mol %).

[b]Calculated from $^1H$ NMR, see equation 2.

Contact Angle Measurements

Contact angle measurements were obtained using an Ossila Contact Angle Goniometer. Polymer films were probed with DI water and diiodomethane ($CH_2I_2$) to investigate the non-dispersive (polar) and dispersive (non-polar) components of surface free energy ($\sigma_s$) in accordance with the Owens, Wendt, Rabel, and Kaelble (OWRK) method.[1-2] Droplets of ~4 μL were dispensed onto the substrates with a 25 μL micropipette. Droplets were allowed to stabilize for 10 s before images were captured for contact angle measurement. Three replicates were conducted for each probing solvent on each substrate. The free surface energy for each surface was calculated according to Young's equation (3), which describes the relationship between the contact angle, θ, and $\sigma_l$, $\sigma_{sl}$, $\sigma_s$ which correspond to surface tension of the liquid, the interfacial tension between liquid and solid, and the surface free energy of the solid respectively. As postulated by Fowkes[3], the interfacial tension $\sigma_{sl}$ can be expressed as the sum of the two surface tensions ($\sigma_s$ and $\sigma_l$) and the interactions between the phases interpreted as the disperse part $\sigma^D$, and the polar part $\sigma^P$ calculated via equations 4.

$$\sigma_s = \sigma_{sl} + \sigma_l \cdot \cos\theta \tag{3}$$

$$\sigma_{sl} = \sigma_s + \sigma_l - 2\left(\sqrt{\sigma_s^D \cdot \sigma_l^D} + \sqrt{\sigma_s^P \cdot \sigma_l^P}\right) \tag{4}$$

TABLE 7

Contact angle measurements and Surface Energies.

| Substrate | DI Water (θ) | $CH_2I_2$ (θ) | $\sigma_s^D$ (mN $M^{-1}$) | $\sigma_s^P$ (mN $M^{-1}$) | $\sigma_s$ (mN $M^{-1}$) |
|---|---|---|---|---|---|
| PS | 95.5 ± 0.1 | 26.2 ± 0.8 | 45.7 ± 0.3 | 0.04 ± 0.0 | 45.7 ± 0.3 |
| PSU | 88.5 ± 0.4 | 24.6 ± 1.3 | 46.3 ± 0.4 | 0.62 ± 0.1 | 46.9 ± 0.5 |
| PET | 73.7 ± 1.6 | 36.1 ± 0.8 | 41.5 ± 0.4 | 5.35 ± 0.6 | 46.9 ± 0.9 |
| P1 | 90.7 ± 1.4 | 25.8 ± 0.6 | 45.9 ± 0.2 | 0.37 ± 0.1 | 46.3 ± 0.3 |
| P2 | 89.6 ± 0.4 | 21.3 ± 0.5 | 47.4 ± 0.2 | 0.40 ± 0.0 | 47.8 ± 0.2 |
| P3 | 65.0 ± 1.1 | 46.5 ± 1.7 | 36.2 ± 0.9 | 11.0 ± 0.6 | 47.2 ± 1.5 |

± denotes calculated standard deviation.

What is claimed is:

1. A polymeric material comprising a polymer selected from the group consisting of polymers of the following formulae:

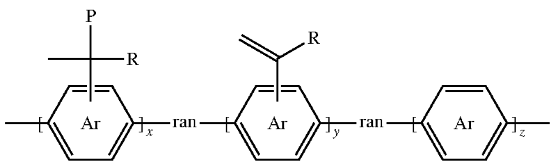

wherein x is an integer greater than or equal to 1, y and z are each independently an integer greater than or equal to 0, and x+y+z=n, wherein n is an integer greater than or equal to 1;

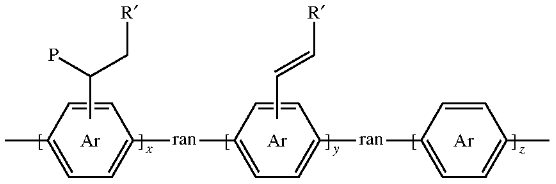

wherein x is an integer greater than or equal to 1, y and z are each independently an integer greater than or equal to 0, and x+y+z=n, wherein n is an integer greater than or equal to 1;

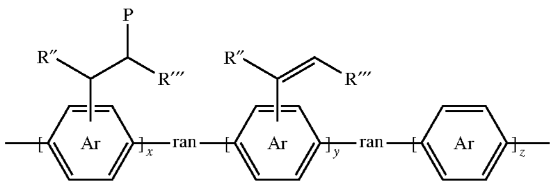

wherein x is an integer greater than or equal to 1, y and z are each independently an integer greater than or equal to 0, and x+y+z=n, wherein n is an integer greater than or equal to 1;

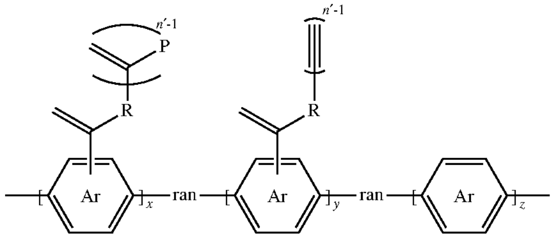

wherein x is an integer greater than or equal to 1, y and z are each independently an integer greater than or equal to 0, and x+y+z=n, wherein n is an integer greater than or equal to 1, and n'>1;

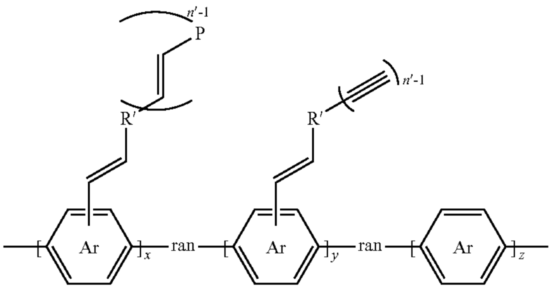

wherein x is an integer greater than or equal to 1, y and z are each independently an integer greater than or equal to 0, and x+y+z=n, wherein n is an integer greater than or equal to 1, and n'>1;

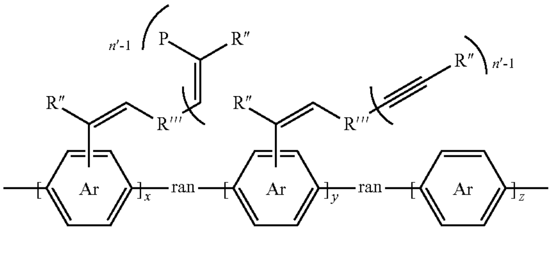

wherein x is an integer greater than or equal to 1, y and z are each independently an integer greater than or equal to 0, and x+y+z=n, wherein n is an integer greater than or equal to 1, and n'>1;

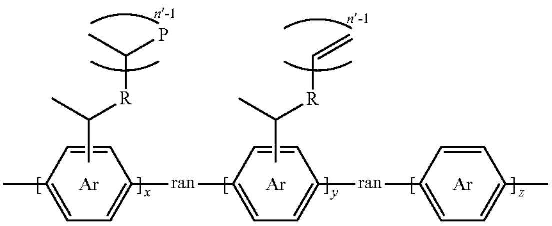

wherein x is an integer greater than or equal to 1, y and z are each independently an integer greater than or equal to 0, and x+y+z=n, wherein n is an integer greater than or equal to 1, and n'>1;

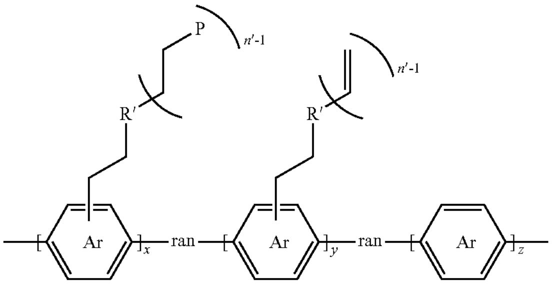

wherein x is an integer greater than or equal to 1, y and z are each independently an integer greater than or equal to 0, and x+y+z=n, wherein n is an integer greater than or equal to 1, and n'>1; and

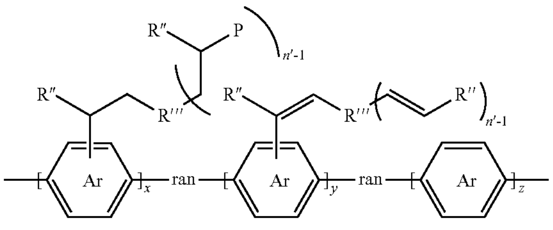

wherein x is an integer greater than or equal to 1, y and z are each independently an integer greater than or equal to 0, and x+y+z=n, wherein n is an integer greater than or equal to 1, and n'>1; and

is a (hetero)aromatic, repeating unit, R, R', R", and R''' are each independently selected from the group consisting of a substituted or unsubstituted hydrocarbyl group comprising from 1 to 20 carbon atoms, or a substituted or unsubstituted aryl group comprising from 6 to 20 carbon atoms, or a substituted or unsubstituted heteroaryl group comprising from 6 to 20 carbon atoms —H, —$SR^2$, —OH, —$OR^2$, —$NH_2$, —$NHR^2$, —$NR^2R^3$, —F, —Cl, —Br, —I, —CN, —$CF_3$, —$NO_2$, —COOH, —$COOR^2$, —CHO, —$COR^2$, —$CONH_2$, —$CONHR^2$, and —$CONR^2R^3$, wherein $R^2$ and $R^3$ are each independently selected from a hydrocarbyl group comprising from 1 to 20 carbon atoms; and P is selected from an oligomeric or polymer chain which forms a branch from a backbone of the functionalized (hetero)aromatic polymeric material or a neighboring functionalized (hetero)aromatic polymeric material to form a crosslinked network, wherein P is limited to polymer chains comprising identical backbone connectivity to that of the polymers, namely, chains based on

as defined above, which are incorporated as pendant structures during the reaction.

2. The polymeric material of claim 1, wherein the polymeric material comprises a material selected from the group consisting of an alkene functionalized (hetero)aromatic polymeric material, a hybrid functionalized (hetero)aromatic polymer, a geminal alkene functionalized (hetero) aromatic material, a vicinal alkene functionalized (hetero) aromatic material, and a 1,1,2-trisubstituted alkene functionalized (hetero)aromatic material.

3. The polymeric material of claim 1, wherein the polymeric material is selected from the group consisting of 1,1-disubstituted (geminal) alkene functionalized (hetero) aromatic polymeric material, a 1,2-substituted (vicinal) alkene functionalized (hetero)aromatic polymeric material, and a 1,1,2-trisubstituted alkene functionalized (hetero)aromatic polymeric material.

4. The polymeric material of claim 1, wherein the polymeric material is an alkane functionalized (hetero)aromatic polymeric material.

5. The polymeric material of claim 1, wherein the (hetero) aromatic repeating unit comprises a heteroatom selected from the group consisting of sulfur, nitrogen, oxygen, selenium, silicon and tellurium.

6. The polymeric material of claim 1, wherein the polymeric material comprises a polymer derived from a terminal alkyne.

7. The polymeric material of claim 6, wherein the terminal alkyne comprises a propargylic moiety.

8. The polymeric material of claim 1, wherein the polymer has the formula:

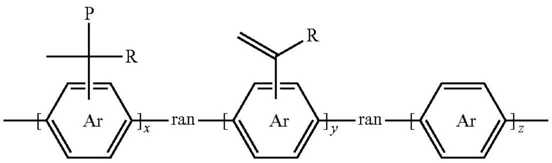

wherein x is an integer greater than or equal to 1 and x+y+Z=n.

9. The polymeric material of claim 1, wherein the polymer has the formula:

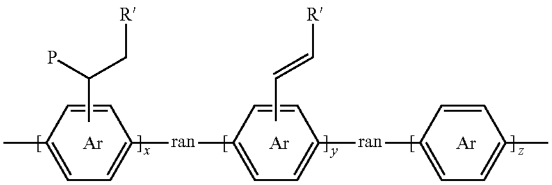

wherein x is an integer greater than or equal to 1 and x+y+Z=n.

10. The polymeric material of claim 1, wherein the polymer has the formula:

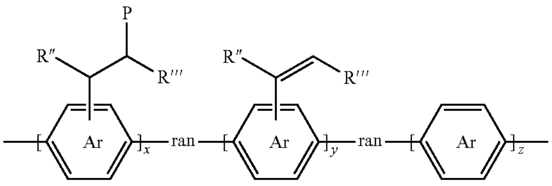

wherein x is an integer greater than or equal to 1 and x+y+Z=n.

11. The polymeric material of claim 1, wherein the polymer has the formula:

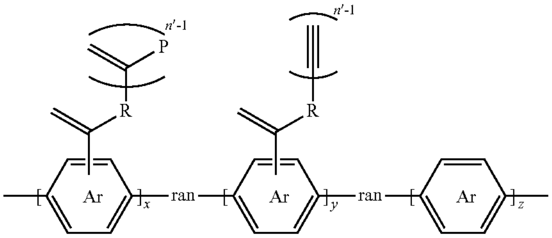

wherein x is an integer greater than or equal to 1, x+y+z=n and n'>1.

12. The polymeric material of claim 1, wherein the polymer has the formula:

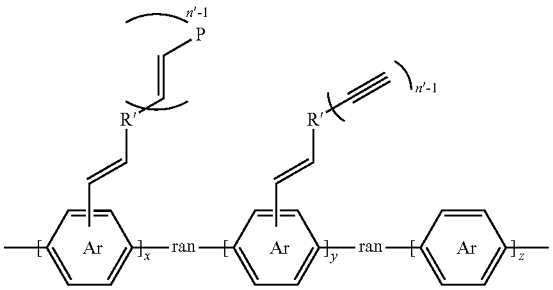

wherein x is an integer greater than or equal to 1, x+y+z=n and n'>1.

13. The polymeric material of claim 1, wherein the polymer has the formula:

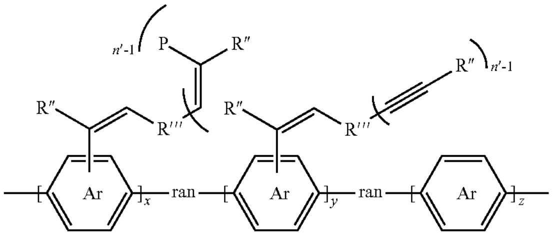

wherein x is an integer greater than or equal to 1, x+y+z=n and n'>1.

14. The polymeric material of claim 1, wherein the polymer has the formula:

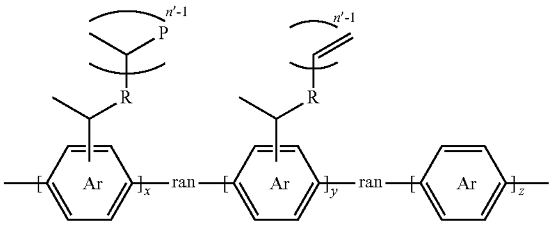

wherein x is an integer greater than or equal to 1, x+y+z=n, and n'>1.

15. The polymeric material of claim 1, wherein the polymer has the formula:

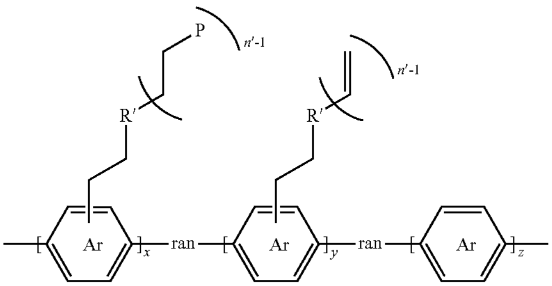

wherein x is an integer greater than or equal to 1, x+y+z=n, and n'>1.

16. The polymeric material of claim 1, wherein the polymer has the formula:

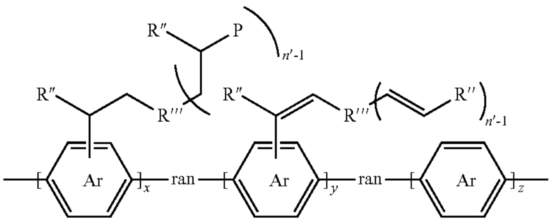

wherein x is an integer greater than or equal to 1, x+y+z=n, and n'>1.

17. A method of preparing a functionalized (hetero) aromatic polymeric material as claimed in claim 1, comprising a step of reacting one or more (hetero)aromatic repeating unit with:

a) one or more compounds comprising one or more alkyne moieties; or b) one or more compounds comprising one or more alkene moieties;

in the presence of one or more catalysts or initiators comprising gold, and the one or more catalysts or initiators are homogenous or heterogenous, to form a functionalized (hetero)aromatic polymeric material.

18. A functionalized (hetero)aromatic polymeric material prepared by the method of claim 17.

19. A hybrid functionalized (hetero)aromatic polymeric material prepared by a combination of two or more reactions of claim 17.

20. The polymeric material of claim 1, wherein n is an integer from about 5 to about 1,000,000.

21. The polymeric material of claim 1, wherein the polymeric material comprises one of:

poly{[1-phenylethane-1,2-diyl]-ran-[(methylacrylate) phenylethane-1,2-diyl]};

poly([oxy-1,4-phenylenesulfonyl-1,4-phenyleneoxy(dimethylmethylene)-1,4-phenylene]-ran-{oxy-1,4-phenylene-sulfonyl-[(methylacrylate)phenylene-1,4-diyl] oxy-1,4-phenylene-(dimethylmethylene)-[(methylacrylate)phenylene-1,4-diyl]}); or (poly{(oxyethane-1,2-diyloxyterephthaloyl)-ran-[oxyethane-1,2-diyloxy(methylacrylate)terephthal-oyl]}.

22. The polymeric material of claim 1, wherein the (hetero)aromatic repeating unit represented by

in the formulae is a phenyl or naphthyl group.

23. The polymeric material of claim 1, wherein the (hetero)aromatic repeating unit represented by

in the formulae is a phenyl group.

* * * * *